(12) United States Patent
Kewitsch

(10) Patent No.: US 9,411,108 B2
(45) Date of Patent: Aug. 9, 2016

(54) SCALABLE AND MODULAR AUTOMATED FIBER OPTIC CROSS-CONNECT SYSTEMS

(71) Applicant: Anthony Stephen Kewitsch, Santa Monica, CA (US)

(72) Inventor: Anthony Stephen Kewitsch, Santa Monica, CA (US)

(73) Assignee: TELESCENT INC., Marina del Rey, CA (US)

( * ) Notice: Subject to any disclaimer, the term of this patent is extended or adjusted under 35 U.S.C. 154(b) by 0 days.

(21) Appl. No.: 14/324,120

(22) Filed: Jul. 4, 2014

(65) Prior Publication Data

US 2015/0331199 A1    Nov. 19, 2015

Related U.S. Application Data

(62) Division of application No. 13/279,304, filed on Oct. 23, 2011, now Pat. No. 8,805,155.

(51) Int. Cl.
| | |
|---|---|
| G02B 6/00 | (2006.01) |
| G02B 6/35 | (2006.01) |
| H04Q 11/00 | (2006.01) |
| G02B 6/38 | (2006.01) |
| G02B 6/44 | (2006.01) |
| H04Q 1/14 | (2006.01) |

(52) U.S. Cl.
CPC .............. G02B 6/356 (2013.01); G02B 6/3502 (2013.01); G02B 6/3556 (2013.01); G02B 6/3564 (2013.01); G02B 6/3897 (2013.01); G02B 6/4452 (2013.01); H04Q 1/145 (2013.01); H04Q 11/0005 (2013.01); *H04Q 2011/0058* (2013.01)

(58) Field of Classification Search
CPC .............................. G02B 6/356; G02B 6/3502
See application file for complete search history.

(56) References Cited

U.S. PATENT DOCUMENTS 5,613,021 A * 3/1997 Saito .................... G02B 6/3502
                                                          385/135

* cited by examiner

*Primary Examiner* — Omar R Rojas

(57) ABSTRACT

This invention discloses patch-panel systems for organized configuration management of large numbers of fiber optic interconnection strands, wherein each strand transmits high bandwidth signals between devices. In particular, a system for the programmable interconnection of large numbers of optical fiber strands is provided, whereby strands connecting a two-dimensional array of connectors are mapped in an ordered and rule based fashion into a one-dimensional array with substantially straight lines strands there between. The braid of fiber optic strands is partitioned into multiple independent, non-interfering zones or subbraids. The separation into subbraids provides spatial clearance for one or more robotic grippers to enter the free volume substantially adjacent to the two-dimensional array of connectors and to mechanically reconfigure one or more optical fiber strands without interrupting or entangling other fiber optic strands.

10 Claims, 37 Drawing Sheets

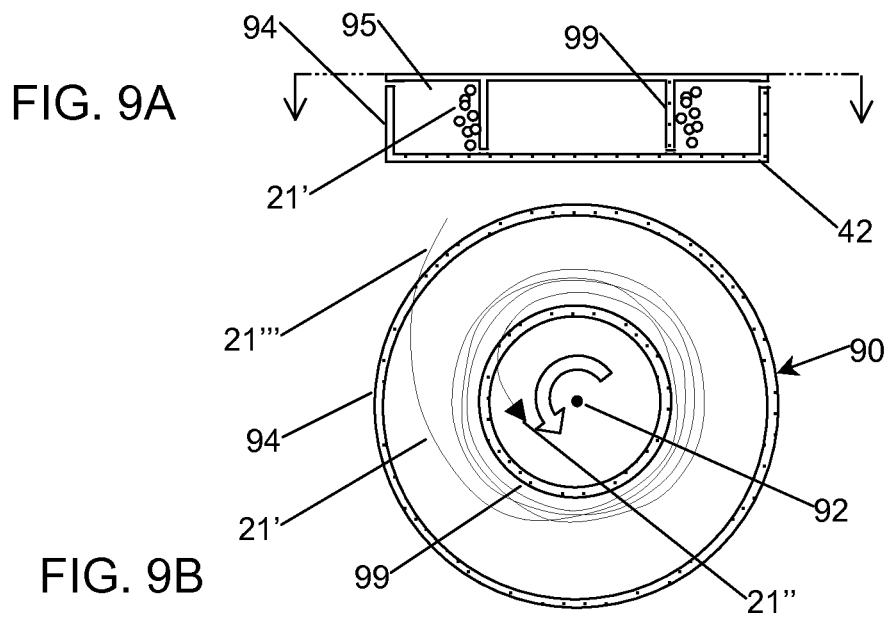
FIG. 9A
FIG. 9B
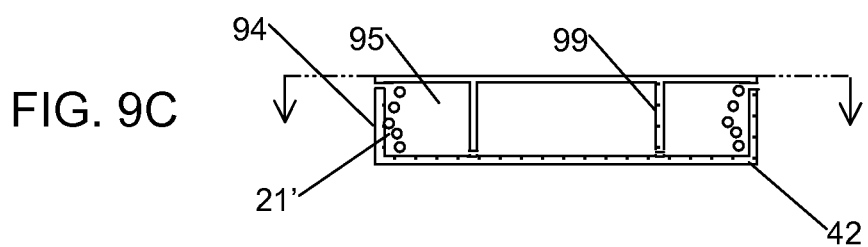
FIG. 9C
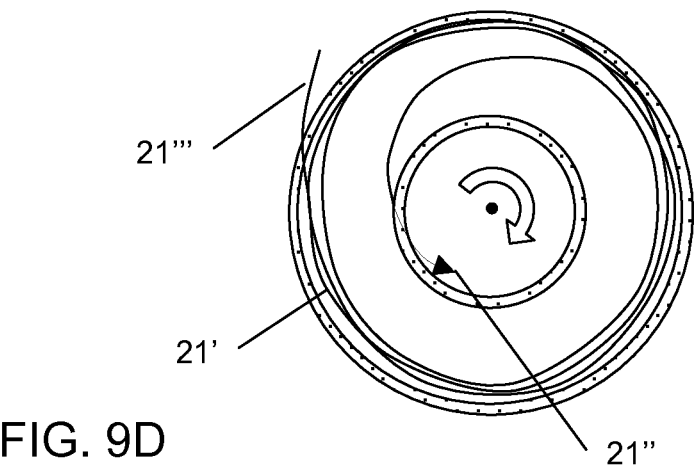
FIG. 9D

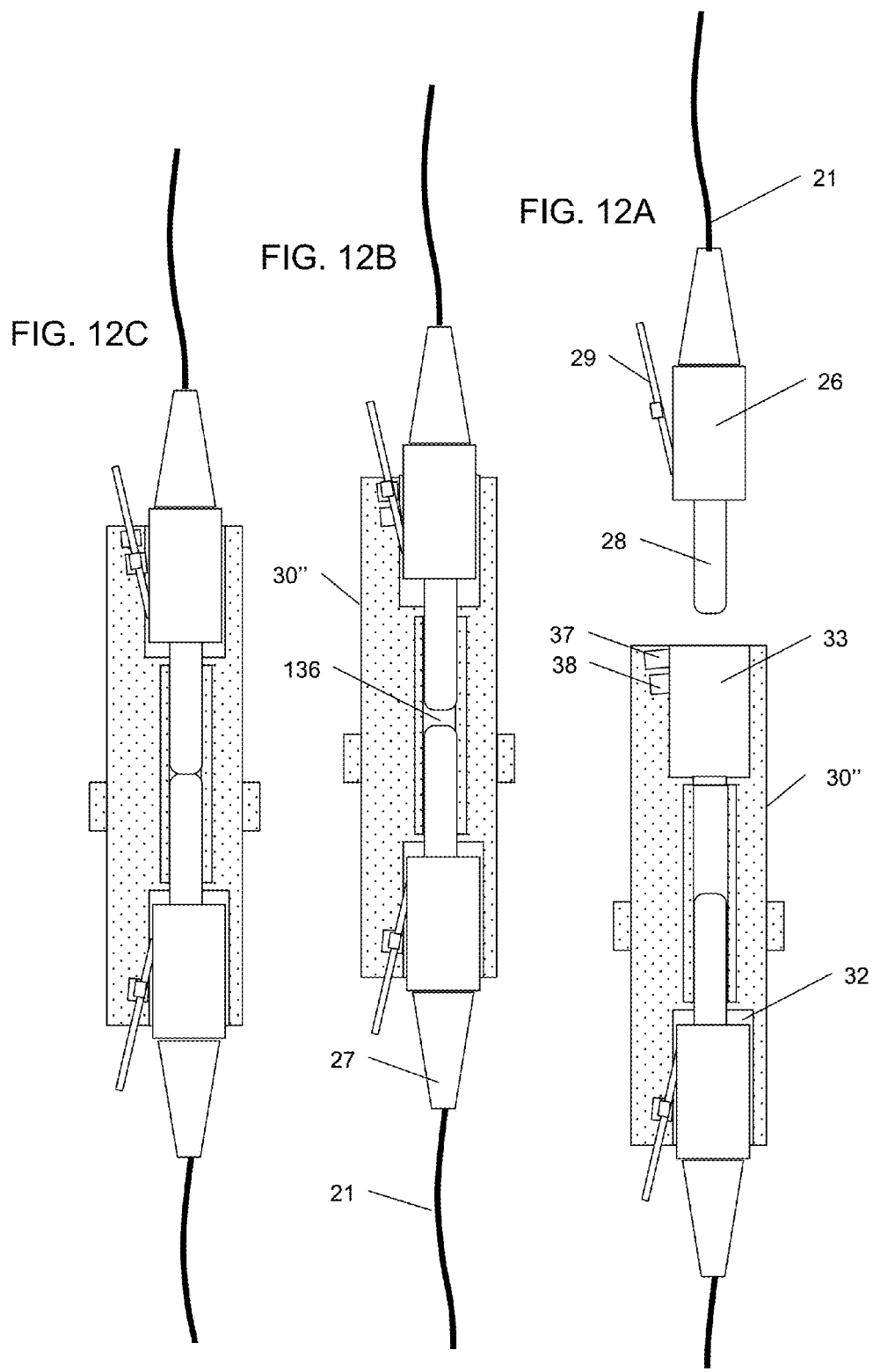

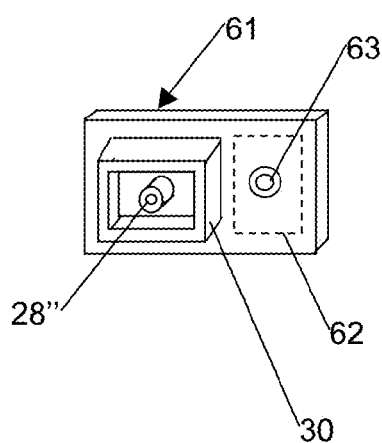
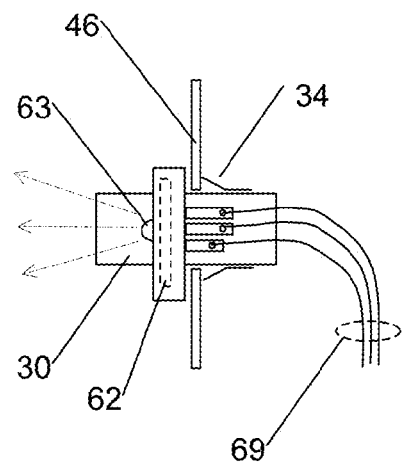
FIG. 13A          FIG. 13B
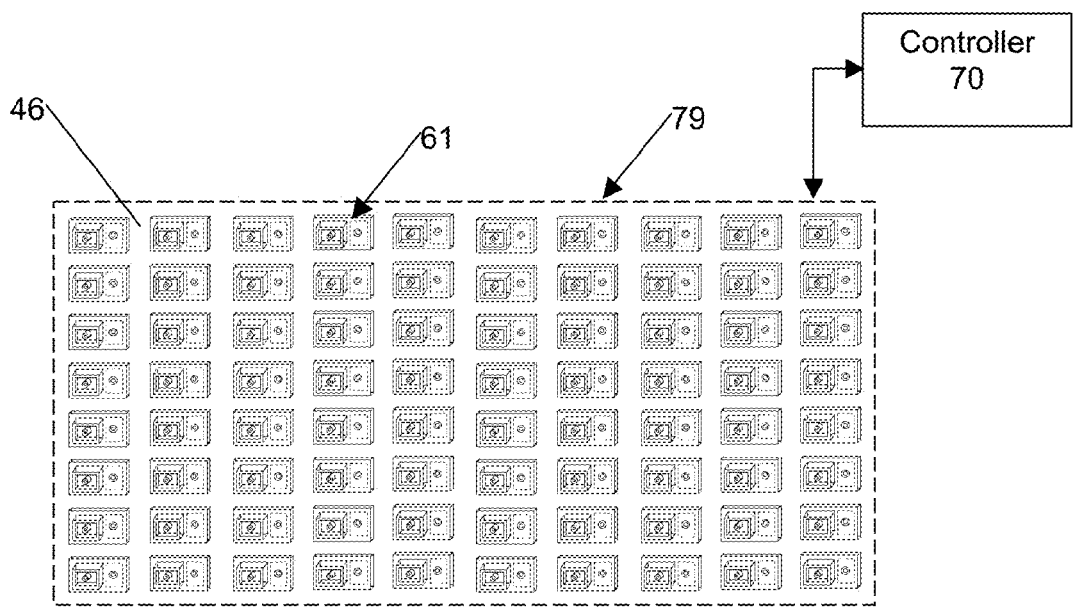
FIG. 13C

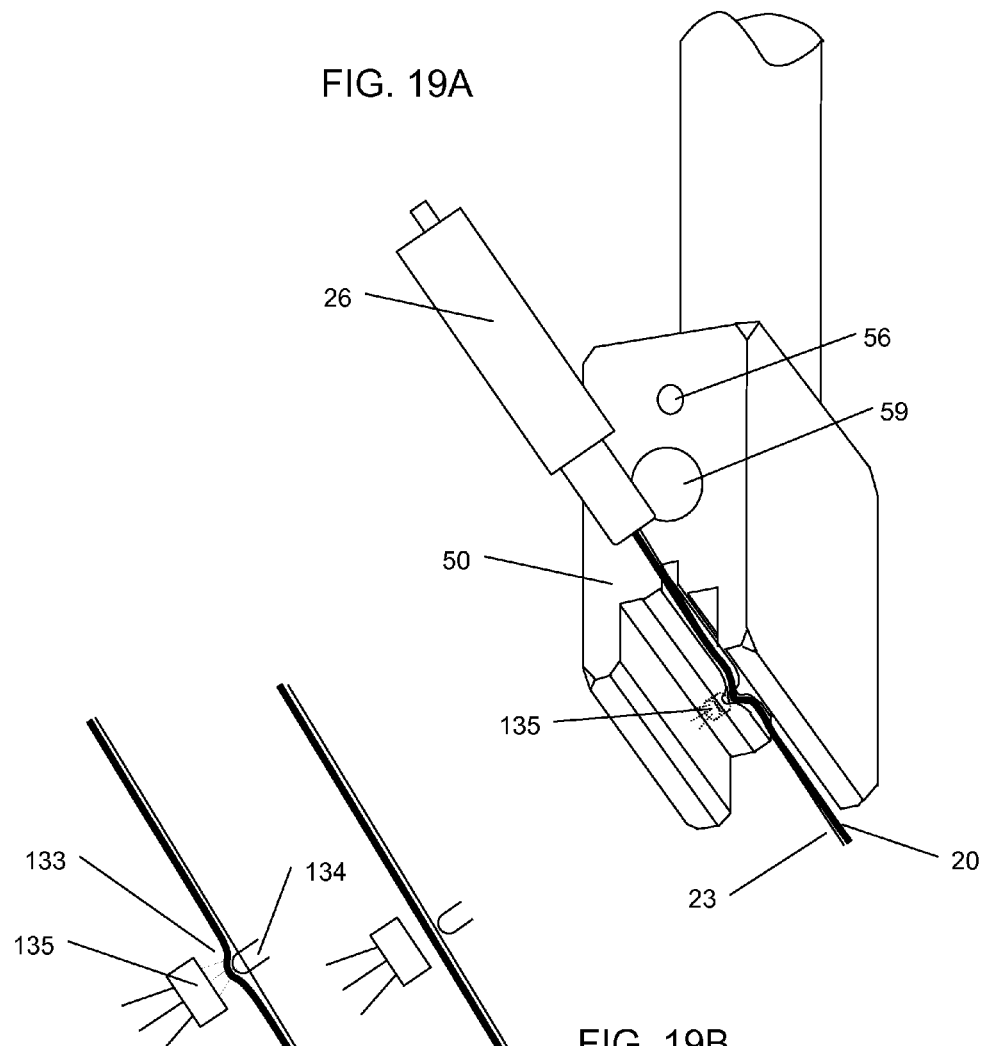
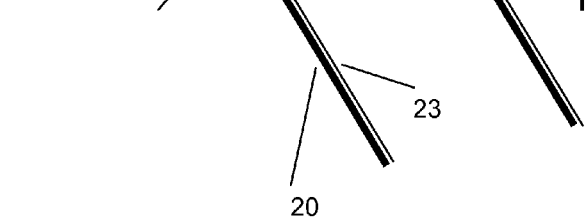

SCALABLE AND MODULAR AUTOMATED FIBER OPTIC CROSS-CONNECT SYSTEMS

FIELD OF THE INVENTION

This invention relates to optical systems using fiber optic cables to transmit illumination and/or signals, and more particularly, to high port count, scalable, modular and automated optical cross-connect devices enabling reconfigurable and programmable connections between fiber optic cables.

BACKGROUND OF THE INVENTION

Fiber optic patch-panels are used to terminate large numbers of optical fibers in an array of connectors mounted on modular plates, thereby providing a location to manually interconnect patch cords for their routing to adjacent circuits. Splice trays within the panel retain slack fiber and the splices joining connector pigtails to the individual fiber elements originating from one or more cables. Typical patch-panel systems interconnect 100 to 10,000 fibers. Connection to various types of transmission equipment, such as transceivers, amplifiers, switches and to outside plant cables destined for other exchanges, local offices, central offices, optical line terminations and points-of-presence are configured manually at the patch-panel.

As the reach of fiber optic systems extends to FTTH (Fiber-to-the-Home), access and enterprise networks, the locations of patch-panels are becoming geographically more dispersed and the sheer numbers of ports are increasing dramatically. Consequently, the tasks of allocating, reconfiguring and testing a fiber circuit within the network becomes increasingly challenging because of the potential for errors or damage resulting from manual intervention. Remotely reconfigurable patch-panels reduce the operational and maintenance costs of the network, improve the delivery of new services to customers and leverage costly test and diagnostic equipment by switching or sharing it across the entire network. Therefore, it is appealing from a cost, accuracy and response-time perspective to configure the patch-panel automatically from a remote network management center. The key building block of an automated patch-panel system is a scalable, high port count, all-optical cross-connect switch.

A wide range of technologies has been developed to provide optical cross-connect functionality with several hundred ports. These include arrays of steerable micro-electromechanical (MEMS) mirrors to deflect beams, piezoelectric steerable collimators that direct free space beams between any pair of fibers, and complex robotic cross-connects utilizing actuators that reconfigure fiber optic connections. For the purpose of comparison the first two approaches as categorized as "non-robotic" and the latter approach as "robotic".

Non-robotic cross-connect switches, while offering the potential for relatively high speed (10 ms), do so at the expense of limited optical performance and scalability. The coupling of light into and out-of fiber and free-space introduces substantial alignment complexity and significantly increases insertion loss, back reflection and crosstalk. These approaches also require power to maintain active alignment and introduce micro-modulation of the transmitted signal as a result of the need to actively maintain mirror alignment. As a consequence, MEMS switches do not provide an optically transparent, plug-and-play replacement for manual fiber optic patch-panels.

Robotic cross-connect approaches perform substantially better from the standpoint of optical performance and their ability to maintain signal transmission even in the absence of power. However, the scalability of such approaches has been limited. The footprint of prior art robotic switch designs scales as $N^2$, where N is the number of circuits. The size of the switch matrix is typically N columns by N rows wide with $N^2$ possible interconnection points. Considering that the central offices of today's telecommunications service providers already utilize 1000 to 10,000 port patch panels, scalability is of prime importance. Therefore, an approach scaling linearly in N would enable the cross-connect to achieve a substantially higher port density commensurate with manual patch-panels.

Moreover, typical network installations are performed in an incremental fashion, whereby fiber circuits are added to the system as needed. Robotic and non-robotic approaches have not been modular and as such, they do not offer an upgrade path from 200 ports to 1000 ports, for example. To achieve port counts above several hundred, a three-stage Clos network interconnection scheme must be implemented [C. Clos, "A study of non-blocking switching networks" Bell System Technical Journal 32 (5) pp. 406-424 (1953)], leading to a substantial increase in cost, complexity and a reduction in optical performance by virtue of the need to transmit through a series of three rather than one switch element.

In addition, the optical performance of robotic cross-connects, while improving on non-robotic approaches, is still inferior to manual patch-panels because they introduce an additional reconfigurable fiber optic connection in series with each fiber circuit. A manual patch-panel requires only one connector per circuit and offers a typical loss of <0.25 dB, while the equivalent robotic patch-panel incorporates at least two connectors per circuit. This increases the loss by a factor of 2.

Furthermore, robotic approaches have required significant numbers of precision, miniature translation stages (2N) and at least 4 precision robotic actuators to align large numbers of input and output fiber end faces to one another. These fiber end-faces physically contact one another and can exhibit wear-out for switch cycles in excess of 1000, or can become damaged at the high optical power levels transmitted through fiber in Raman amplified systems. The performance of frequently reconfigured test ports is therefore susceptible to degradation.

The prior art describes various mechanized approaches to interconnecting a number of fibers. U.S. Pat. No. 5,699,463 by Yang et al. discloses a mechanical optical switch for coupling 1 input into N outputs by translating an input fiber and lens to align to a particular output fiber. For patch-panel applications, the required number of input and output ports are near-symmetrical and both equal to N.

A series of patents and patent applications to Lucent, NTT and Sumitomo disclose various implementations of large port count optical cross-connects in which fiber optic connections are reconfigured by a robotic fiber handler. For example, Goossen describes a switch utilizing a circular fiber bundle and a circular ferrule loader ring in U.S. Pat. No. 6,307,983. Also, U.S. Pat. No. 5,613,021, entitled "Optical Fiber Switching Device Having One Of A Robot Mechanism And An Optical Fiber Length Adjustment Unit" by Saito et al., describes the use of a robotic fiber handler to mechanically reconfigure connectors on a coupling board. U.S. Pat. No. 5,784,515, entitled "Optical Fiber Cross Connection Apparatus and Method" by Tamaru et al. describes a switch in which connectorized optical fibers are exchanged between an "arrangement board" and a "connection board" by a mechanized fiber handler. A motorized means of fiber payout is further described. Related approaches are described in a series of patents including JP7333530, JP2003139967, JP2005346003, JP11142674, JP11142674, JP10051815 and JP7104201.

To overcome the prior art's susceptibility to fiber entanglement, Sjolinder describes an approach to independently translate fiber connectors along separate, linear paths in two spaced-apart planes on opposite sides of an honeycomb interface plate ["Mechanical Optical Fibre Cross Connect" (Proc. Photon. Switching, PFA4, Salt Lake City, Utah, March 1995]. In the first active switch plane, N linearly translating connectors are driven along spaced-apart rows by actuators and in the second active switch plane, an additional N linearly translating connectors are driven along spaced-apart columns. Row and column actuators are configured perpendicular to one another. Connections are made between fiber pairs located in any row and in any column by mating connectors at any of the $N^2$ common insertion points within the interface plate. This approach requires at least 2N actuators to arbitrarily connect N inputs with N outputs.

An extension of this cross-connect approach is disclosed in U.S. Pat. No. 6,859,575 by Arol et al., U.S. Pat. No. 6,961,486 by Lemoff et al. and WO2006054279A1 by J. Arol et al. They describe robotic cross-connect switches comprised of N input optical fibers supported by N translation stages and M output fibers supported by M translation stages in a substantially similar geometry. Each input fiber requires a shared or dedicated mechanical actuator to linearly translate both parallel to (x,y) and perpendicular to (z) the switch active planes. The connectors require individual z translation to physically contact the opposing facets of aligned input and output fibers.

The robotic cross-connect approaches described in the prior art have limited scalability and optical performance. The application of robotic optical switches to fiber optic patch panels demands true optical transparency, scalability to port counts in excess of 1000 within the footprint of a manual patch panel, and the ability to incrementally add circuits on an as-needed basis. In light of these limitations, we disclose unique all-fiber cross-connect systems with superior attributes of optical transparency (low insertion loss and backreflection), scalability to large port counts (>100 to 1000's and proportional to N, the number of ports, rather than $N^2$), high density, modularity, compact form factor, high reliability and low cost.

SUMMARY OF THE INVENTION

To meet these and other objectives we disclose in this application an automated, remotely controllable, optical cross-connect switch system that exhibits near zero insertion loss, high reliability and compact size. Further, the physical dimensions of these systems scale linearly, not geometrically (as n rather than $n^2$) so they can readily be expanded to have capacity for thousands of fiber optic circuits. These features and advantages derive from a combination of unique dynamic elements and array geometries, and also from employment of non-blocking switch algorithms. They enable the unique optical cross-connect switch geometries to interconnect different optical networks in an automatic, remotely accessible fashion.

In a general example of a system in accordance with the invention, programmable and robotically changeable interconnections of large numbers (hundreds to thousands) of optical fibers, or in general any type of flexible transmission line, are achieved by employing a two-dimensional input array of connector terminals coupled externally to a first network. Latching optical connections can utilize long-wearing but replaceable connector-terminal interfaces that maintain the highest level of optical performance and modularity. Internally the terminals are joined by multiple interconnections within an intervening volume to a one-dimensional second array spaced apart from the first. Optical fiber lines from the second array are coupled through buffer modules, to a second network. The multiple lines between the two arrays are mapped to follow multiple interconnecting vectors in an ordered and rule-based fashion. Within the interconnection volume, the fibers are maintained in substantially straight lines by modular variable length buffers subsequent to the second array, each buffer confining a number of optical fiber lines and maintaining an adequate bend radius on the fibers but with capacity to retain excess fiber lengths. The buffers are scalable simply by incremental addition (typically stacking) and the output lines from the buffers can be connected through splice tray modules, again stackable so that more lines can be added. The arrays can also be arranged to divide the switch volume into multiple independent, non-interfering zones, which retain their independence for arbitrary and unlimited numbers of reconfigurations. The geometries of the terminals in the input array provide clearance for one or more robotic actuators to move within the interconnection volume substantially adjacent to the two-dimensional input array, and to be commanded by external signals to mechanically reconfigure the positions of connectors.

To reconfigure these interconnections at the first array, a non-interfering switch algorithm is disclosed, the algorithm based in part on knowledge of the existing line vectors of the optical lines between the input array and the intermediate array. The algorithm can employ either or both measurement of existing vector configurations or (more usually) stored data providing a data map of the existing connection paths. From such stored data the system controller generates a deterministic path dependent on and calculated from the changeable mapping of the vectorial patterns. In a particular example of a system, in accordance with the invention, motion along the path between a source address and a target address for a selected optical line is achieved both by following vertical columnar spaces within the input array, and laterally translating in the row direction in a manner to avoid entanglement with existing lines. In conjunction, docking ports or terminals are provided in the input array in positions which enable temporary storage or shifting of elements so as to preclude entanglement.

The system includes an electronic processor having access to a database of the existing interconnection vectors, and a software program for providing commands for the positioner to follow a deterministic path through the vectors of the lines in the interconnection volume. Upon receiving a signal command for the transfer of a connector from a chosen terminal to a target terminal, the processor conducts a sequence of coordinated motions relative to the input array to move the connector, and its attached optical fiber line, along the two-dimensional path of columns and rows, ultimately terminating at the target terminal. The compliance of the buffer element associated with the line being transferred enables variations in line length to be automatically compensated, without introduction of undue slackness, tensioning or bending of the optical fibers.

In a particular example of a positioner, it is mounted so as to move along any columnar axis, fitting within the interstices of the input array. The positioner includes a terminal gripper at one end and a three-axis actuator at the other, so that the connector can be placed anywhere desired in the two-dimensional input array plane. In a typical two-dimensional array, although other examples exist, the input array is subdivided into incrementally movable rows, each shifted by a separate actuator under commands from the controller. This allows the positioner mechanism, in following deterministic rules, to shift over or under a pre-existing line, by operating in a timed sequence with vertical motion of the positioner.

In a particular example in accordance with the invention, an automatic fiber optic patch-panel system comprises a two-dimensional input array of reconfigurable ports in a first plane, adjacent the interconnection volume through which optical fibers from the input array are mapped to a substantially linear array of optical lines converging along a backbone axis in a second plane spaced apart from the first plane. The backbone is defined by a plurality of low friction guides which converge the optical fibers into separate paths into an adjacent buffer module, for each set of optical lines, and the buffer module maintains the substantially straight path needed in the interconnection volume and controlled tension without excessive bending. The optical fibers exiting the buffers can be spliced to an optical fiber cable or terminate in an output connector array. In one example, all buffer modules comprise low-height containers, each including a number of circular chambers for receiving individual optical lines together with suitable stiffening elements. In another example, the buffer may comprise a row-height container with a sufficient internal capacity for receiving a length of optical fiber secured at spaced apart points in a manner which allows for a pre-determined length of fiber to be extracted and returned under tension control.

The system incorporates numerous other features derived from its versatility and flexibility. For example, the capability of responding automatically to signal commands carries with it the capability of remote control and essentially unattended operation. Significant in this respect, the system includes a mini-camera mounted on the terminal end of the positioner in conjunction with the multi-functional gripper, providing a video image for both control and inspection purposes. This signal may be fed back to a central station to verify electronic readouts. The video image provides a useful adjunct to the positioning system, in cooperation with surface indicia on the input array. Because position information from the indicia can now be read by the camera, image analysis software can instruct the positioner to servo the gripper into a precise location after the positioner has selected a coarse address. The gripper itself can be a spring-loaded but passive element that engages along a selected axis transverse to the connector, to enable it to be engaged or disengaged. Another feature in accordance with the invention is the use of the capabilities of the system and controller to function as a power monitoring system with an optical sensor integrated into the gripper, and also to monitor the interconnection inventory. Detection of electrical conductivity between the gripper and the conductive spring element coextensive with the optical fiber is used to identify the particular fiber connector engaged by the gripper. Alternatively, ID tags are employed at connectors or terminal locations, and return signals derived from acoustic tones or electronic readouts can thus uniquely identify the existing configuration of the panel.

Low loss fiber optic connections to the input plane array of connector terminals are achieved by use of physical contact connectors inserted into precision alignment sleeves. With replaceable, sacrificial stub elements incorporated into the alignment sleeves at the front panel, the design enables the extension of service life. Since near zero overall insertion loss is desirable, the present application discloses the use of flexible fiber optic circuit structures with integral rigid spring elements that oppose excessive bending. Such structures are further designed to simultaneously maintain tension along the circuit and retain slack fiber length within separate cavities.

An additional feature of this invention derives from the existence of status and health-monitoring capability. In accordance with this feature, the system measures the optical power propagating through each circuit, monitors the interconnection map and confirms proper operational characteristics. Furthermore, reliable connections are achieved with single or double latching physical contact connectors, such that optical signals remain within waveguides and do not propagate in free space. The all-fiber design achieves an insertion loss of less than 0.5 dB and return loss greater than 50 dB for single mode fiber connections.

BRIEF DESCRIPTION OF THE DRAWINGS

In accordance with the invention, the system and elements comprising the optical cross-connect switch and their various combinations are described in reference to the following drawings.

FIG. 9A, details in partial cutaway view, a spiraled substantially wound flexible fiber circuit forming a rotary coupling interface interior to tensioning spool, FIG. 9B illustrates the same in top view, FIG. 9C details a spiraled substantially unwound flexible fiber circuit forming a rotary coupling interface interior to tensioning spool, and FIG. 9D illustrates the same in top view;

FIGS. 12A through 12C illustrate partial cutaway views of a double latching connector providing both optically transmissive and non-transmissive operation;

FIGS. 13A and 13B illustrate the combination of union adapters with integrated transmissive optical tap detectors, electronics and LED for use in patch-panels having visible indicators of live traffic carrying fibers, while FIG. 13C illustrates such a patch-panel including an array of adapter/transmissive optical tap detector subassemblies;

FIG. 19A depicts an optical power monitoring element integrated into gripper head in which the fiber in unperturbed in FIG. 19B with no light outcoupling and subjected to microbend in FIG. 19C such that a fraction of light is outcoupled onto a detector;

DETAILED DESCRIPTION OF THE INVENTION

Figure 1:
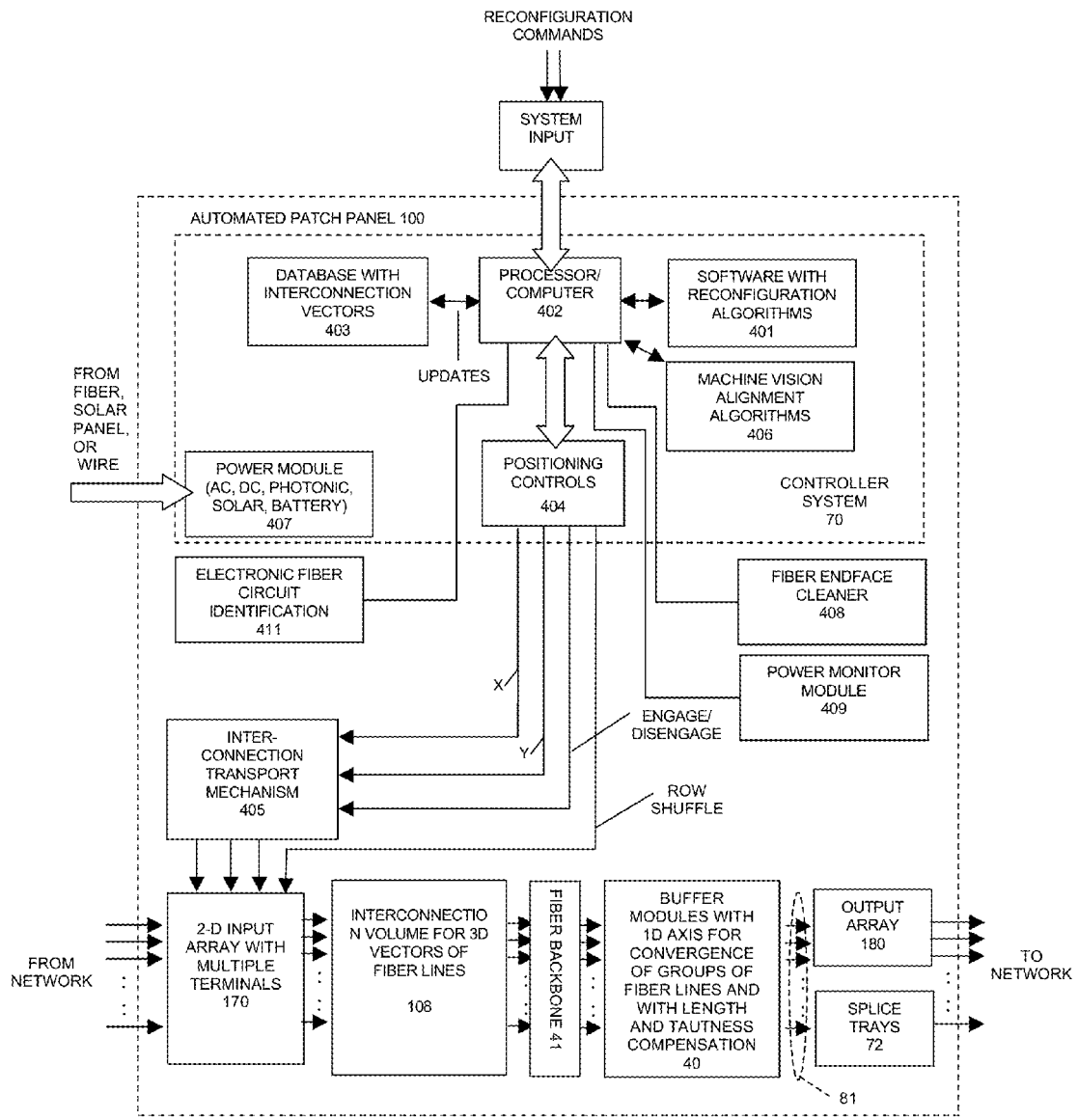
FIG. 1 is a block diagram of the large scale cross-connect system in accordance with the invention.

In this invention, we disclose all-fiber cross-connect systems 100 that enable reconfigurable, non-blocking and optically transparent physical connections between fiber optic lines joining a first network to a second network. A block diagram of the functional elements comprising this cross-connect system and the inter-relationships between elements is illustrated in FIG. 1. Reconfiguration of flexible, yet taught, fiber lines are made internal to interconnect volume 108 by disengaging, translating and re-engaging fiber line connectors adjacent the internal surface of the two-dimensional input array 170 of terminals under the control of the interconnection transport mechanism 405. The interconnect volume is bounded on the input side by the array of terminals 170 and on the opposite side by a substantially one-dimensional array of fiber through-ports forming a fiber backbone 41 lying at an intermediate plane within the cross-connect system.

The interconnect volume therebetween is populated with the intermixed, linear fiber lines. The fiber lines are suspended between arrays of terminals 170 and ports 41 and define a three-dimensional arrangement of vectors directed towards the one-dimensional port array 41. Behind this intermediate port array 41, the fiber lines are individually directed to a modular arrangement of substantially identical, distributed and spaced-apart buffer elements 40. Buffer elements provide slight tensioning adequate to maintain taut fiber lines in addition to retaining excess slack in the fiber lines. The tension force produced by buffer modules 40 on each fiber line lies substantially parallel to the vector defining the three dimensional orientation of each fiber line.

Non-interference of fiber lines within interconnect volume 108 during arbitrary reconfiguration of any fiber line within the multiplicity of surrounding fiber lines is achieved when the processor 402 directs positioning controls 404 to drive the interconnection transport mechanism 405 and translate the origin of a vector associated with a fiber line through the region of interconnect volume 108 immediately adjacent to the two dimensional input array of terminals 170. Motion proceeds in a sequential, column by column fashion such that the moveable vector endpoint weaves through the surrounding space of vectors in a non-interfering fashion. Translation of the particular fiber line endpoint across, up and down columns of the input array is achieved by engaging the fiber line connector body within a gripper element of the interconnection transport mechanism 405. Carriage of fiber line connector is a manner which prevents entanglement of the fiber line attached thereto is directed by electronic positioning controls 404 that respond to instructions generated by controller 402. The controller executes multiple processes including reconfiguration algorithms 401, machine vision alignment 406, optical power measurement 409, fiber endface cleaning 408, electronic fiber circuit identification 411, and management of the database of interconnections 403 in real time to accomplish a timed sequence of elementary reconfiguration steps.

Electrical power is provided to the system through the power module 407. The cross-connect system consumes about 50 W of power primarily during the ~1 minute reconfiguration time and negligible power otherwise by entering a "sleep" mode. The cross-connect apparatus can be powered not only with traditional ac or dc power, but for remote applications, an alternative is to utilize solar power or photonic power transmitted within fiber and with electrical storage means such as an internal battery.

In a particular example, reconfiguration is initiated by a user or external software client by entering a starting point and destination point for a particular fiber strand at the input terminal array which is input to processor 402. The processor communicates with the multiple components comprising the controller system 70 to direct the required multi-step reconfiguration process, based in part on reading the current database of interconnection vectors 400.

In a particular interconnection transport implementation, the motion of the gripper while disengaging, engaging and moving the particular fiber line is synchronized with programmed individual translations of each row comprising the two-dimensional array of terminals 170, enabling the vector undergoing reconfiguration to maintain the proper orientation relative to surrounding vectors such that entanglement is avoided at all times and for all potential reconfigurations.

Figure 2:
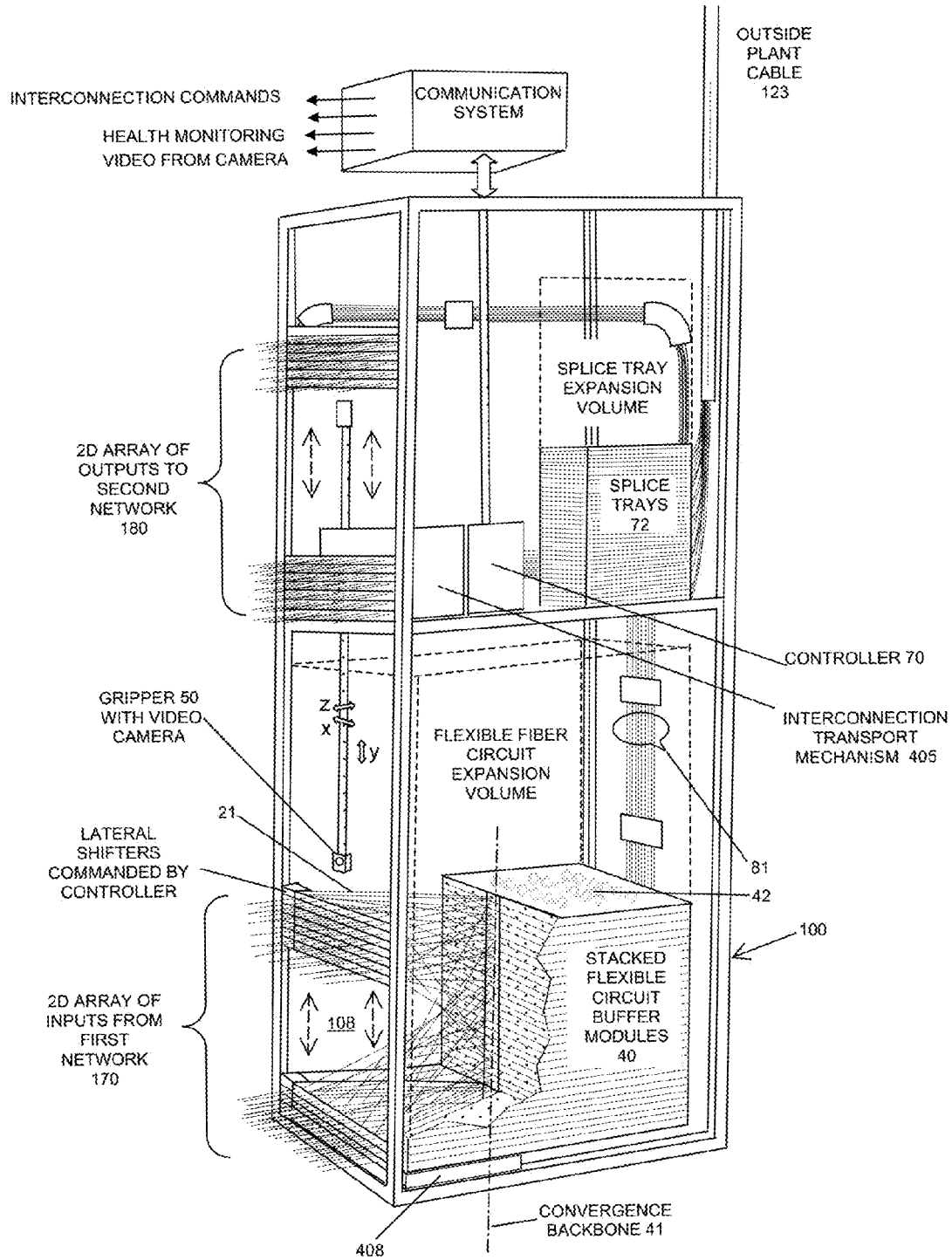
FIG. 2 is a side, partial cutaway view of the large-scale optical cross-connect system.

A perspective view of the cross-connect system incorporating these and additional elements is illustrated in FIG. 2, with only a subset of fiber lines 21 and buffer modules 40 shown for clarity. Physically non-blocking automated and software-driven reconfiguration in a volume which scales as N, the number of fiber ports, is accomplished by linking the two-dimensional array of input terminals 170 with taut flexible fiber optic circuits 21 spanning the switch's crossconnect volume 108 and extending from a one-dimensional array of ports at the intermediate optical switch backbone, 41. Contiguous fiber lines 21 pass through ordered guides at backbone 41 to self-tensioning, flexible fiber optic spools elements 42 providing automatic bend radius control and slack cable retention within stacked and modular circuits 40.

Any of the fiber circuits 21 are arbitrarily reconfigurable by engaging circuit a selected circuit with a programmably moveable gripper 50 that repositions connectorized fiber optic circuits 21 within interstitial regions at the interior surface of the array of switch terminals 170. Non-interfering reconfiguration is accomplished by following a non-blocking path computed by the switch control system 70 and based on knowledge of the configuration of all intermediate lines 21 intermixed within the common interconnect volume 108.

This cross-connect system 100 is comprised of a combination of independent and separable modules to enable modularity, scalability and customization, including a multiplicity of stacked flexible fiber optic circuit modules 40, an interconnection transport mechanism 405, gripper 50, controller 70 and optionally a fiber end-face cleaner module 408. A typical optical cross-connect system in accordance with this example occupies a 7-foot tall, 19 or 23-inch wide rack with in excess of 1000 by 1000 ports. Switch terminals 170 can be added in fixed increments ranging between 12 to 36 (depending on the number of ports per row) by installing additional flexible circuit modules 40 above those previously installed modules. The output fibers 81 from modules 40 may be spliced to one or more multi-fiber cables 123 and arranged in splice trays 72, or terminated directly at the array of front panel terminals 180.

In the particular example of FIG. 2, the lower section of the switch volume includes a reconfiguration volume 108 and the upper section includes a combination of fiber splice trays 72 as well as fibers terminated in an array 180 of connectors. In general, the reconfiguration volume 108 may lie at the top, bottom, side or central section of the system. A central portion of the upper section is clear of obstructions to enable the robotic actuator to move, extend and park within this section while being unencumbered by fibers or other elements. The bottom-most section beneath the input terminal array 170 includes a row of translatable docking ports 57 and a fixed row of docking ports 57'. The polished fiber endface of a connector in the vicinity of docking ports can be cleaned prior to insertion at terminal array 170 by use of an integrated fiber endface cleaning module 408, comprising a fiber cleaning fabric ribbon in spooled form and a motorized drive unit which automatically moves the fabric relative to the endface, thereby cleaning the fiber endfaces in a non-wearing fashion.

In accordance with this invention, the reconfigurable fiber optic connections at the terminals of input array 170 are achieved by using fiber optic union adapter elements which, upon insertion of opposing internal and external fiber connectors 26, concentrically align the connectors' polished ferrules within a precision alignment sleeve. These latching connectors maintain the highest level of optical performance, repeatability and reliability for a reconfigurable connection and are available as standard components. Low loss (<0.25 dB) and high return loss (>55 dB) optical connections are readily achieved between single mode fibers with cores 9 micron in diameter.

By utilizing proven interconnection elements, this cross-connect system achieves the high possible performance. Moreover, the unique design introduces only a single physical contact connection between any fiber of a first network and any substantially similar fiber of a second network. A wide range of standard connector styles can be incorporated into the switch, including standard UPC, APC, PC (simplex, duplex, multi-fiber) polish types and connector bodies based on MU, LC, SC, MT, FC, ST, Losch MD11 or expanded beam connectors. The type of latching union adapters 30 utilized in the input array is selected based on the particular requirements of the application (e.g., low backreflection, highest connector density, etc.).

In a particular example, programmable switch reconfiguration is achieved with an embedded processor 402 and software based reconfiguration and control algorithms 401. This switch electronic processor may interface with an LCD display and keypad at the location of the cross-connect system to enable local push-button control and status reporting. Remote switch control can be accomplished by TL1, SNMP, TMF814, Corba, Ethernet, UART, RS-232, RS-485, USB, i2c and/or wireless control, for example.

These control and communication elements interface with the interconnection transport mechanism 405 to affect the non-entangling reconfiguration of a particular fiber line. An example robotic mechanism is illustrated in partial cutaway view in FIG. 3, detailing the central portion of the cross-connect. The array of input terminals 170 includes multiple rows of mating receptacles, each row containing fourteen receptacles. The number of rows is dependent upon the height of the unit and additional rows may reside outside of the mid-section detailed in FIG. 2. The output fibers are not visible here, but they typically exit the buffer modules 40 along one of its sides. There is additionally one or more bottom-most rows 57 comprised of docking terminals, to which temporary connection of fiber lines is accomplished without connection to the first network. Docking ports facilitate reconfiguration when surrounding terminals are occupied.

Figure 3:
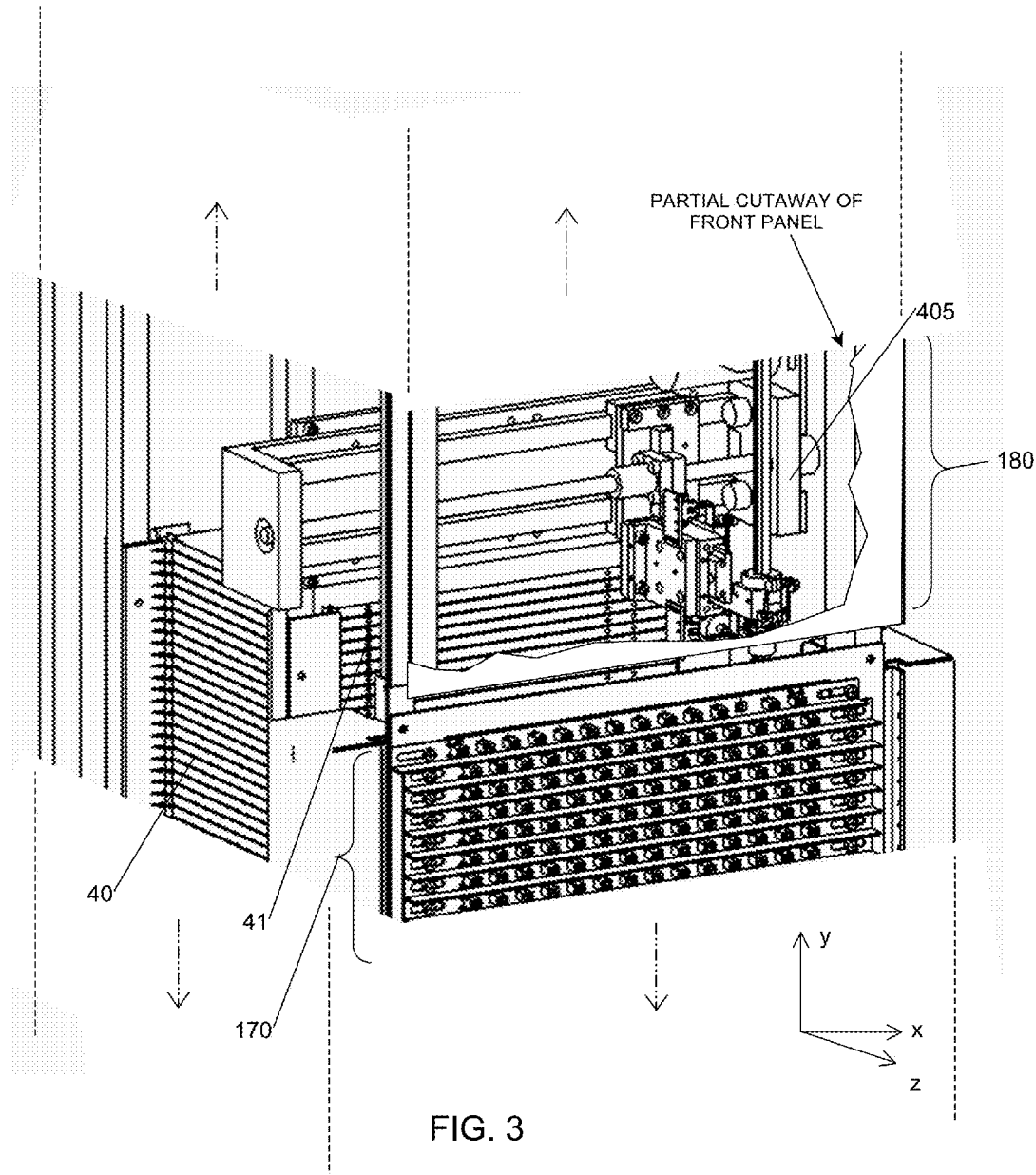
FIG. 3 illustrates a partial cutaway, perspective view detailing the robotic connector transport elements of an automated cross-connect unit.

The interconnection transport mechanism 405 as illustrated in FIG. 3 is a three-axis pick-and-place actuator with a spring-loaded gripper or end-effecter 50 that interlocks a connector 26 prepared at the end of a fiber line 21. Each axis of the pick-and-place unit is, for example, driven by a stepper motor for translation along a linear slide, such as a cross-roller or ball-bearing slide. Positional and end-of-travel limits are provided mechanical flags which block a phototransister light path and an interface which reads out the position of each axis.

Figures 4A, 4B:
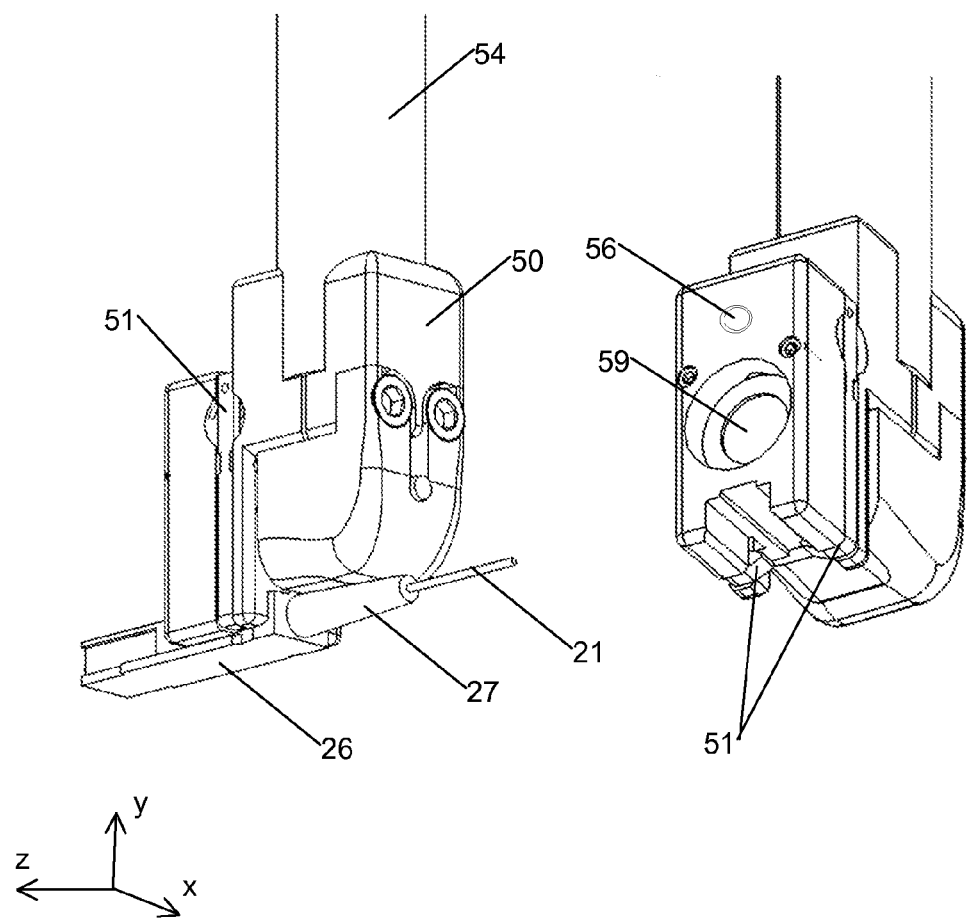
FIG. 4A illustrates rear perspective view of a robotic gripper for engaging a fiber optic circuit connector and including an integrated camera for precision alignment and FIG. 4B is a corresponding front perspective view.

FIG. 4 details an example of a multifunctional gripper 50 for transporting a fiber line. Such a gripper may include functions such as machine vision alignment and inspection, electrical monitoring and power monitoring. The gripper is attached to the end of the y axis linear actuator 54 and includes a mini-camera 59 and light source 56 to capture and relay video data to processor 70 for active alignment. This video data is processed in real time by pattern matching algorithms residing in the processor system to determine the center of mass of indicia associated with each connector terminal on the interior side of front panel and align the gripper in x and y with a selected fiber strand connector on a frame-by-frame basis.

This gripper example utilizes metallic spring-loaded clips 51 that engage mating cavities or depressions in the connector body 26 to retain this connector and make electrical contact with the metallic element of the fiber circuit. The gripper is connected to electrical ground, for example, so that when a fiber circuit is attached to gripper, an electrical circuit is completed and used to trigger subsequent moves. Alternatively, the connector may be held within a formed or stamped-metal retaining clip, the clip including locking features to rigidly hold connector, including attachment feature(s) to which the gripper engages and conductive features to make electrical contact with connector. The gripper body is provided with radiused exterior surfaces to prevent excessive bending of surrounding fiber strands, which may come in contact with the gripper during reconfiguration.

The gripper 50 engages a particular connector by lowering itself onto the connector body 26. Subsequent translation of the gripper along the longitudinal axis of the connector is adequate to extract or insert the connector 26 from or into its mating receptacle at the interior side of the front panel terminal array 170. Conversely, the fiber connector is disengaged from the gripper by raising gripper (in y) after the connector is translated along the longitudinal axis (z) of connector to mechanically latch within the mating terminal on the front panel array 170.

Figure 5A:
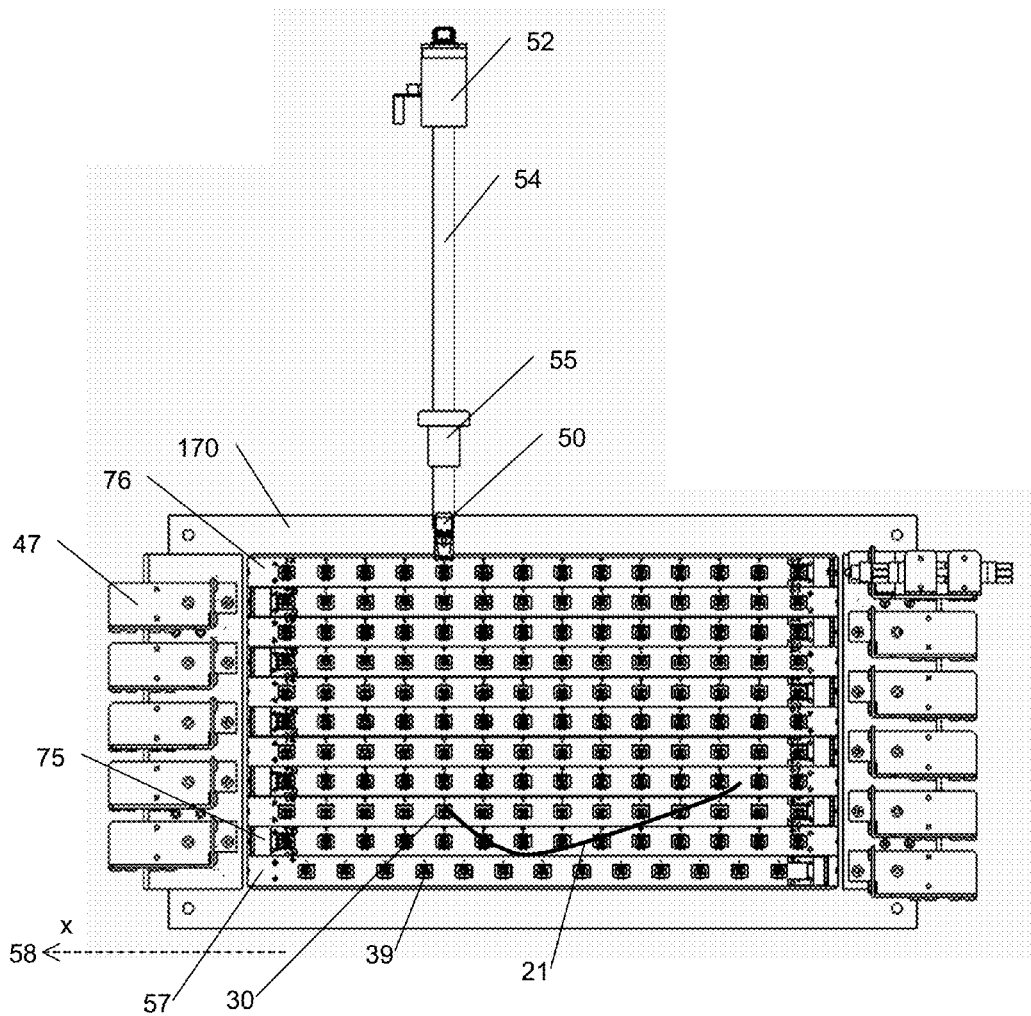
FIG. 5A and FIG. 5B illustrate an interior view of the array of input terminals, with robotic gripper traveling between columns of terminals and rows of terminals shuffling during reconfiguration.

In a particular embodiment shown in partial view in FIG. 5A, the inner surface of the optical cross-connect switch's 100 front panel is populated with a substantially regular arrangement of connector terminals 170 comprised of union adapters 30 mounted to independently moveable panels 46 to which patchcords originating from transmission and test equipment are inserted at the opposite, outer surface (not visible from this perspective). For clarity, only one flexible fiber optic circuit 21 inserted into union adapter 30 is illustrated. In this particular example, the array of spaced-apart input terminals 170 are arranged in a series of 10 independent rows with 14 columns each, wherein each row is able to independently translate between three positions in the direction of row axis 58. One or more additional translatable rows 57 of docking ports 39 is provided. These ports may be situated below the bottom most row of input terminal array 170 as shown here, or may be placed at an intermediate row within the stack.

The non-interfering translation of a particular fiber optic circuit 21 between this array of input terminals 170 is accomplished at relatively high speeds (~1 minute) by the coordinated movement of the gripper 50 up and down the columns and independent shuffling of each row of input connectors 30 by a half column spacing in one of three positions parallel to the x axis 58.

While this example illustrates a cross-connect apparatus fully loaded with flexible circuit modules 40, in general, the switch may be partially populated to provide spare capacity. Fiber lines are added by first parking the gripper and robotics outside of the fiber interconnect volume. Immediately thereafter, flexible circuit modules 40 may be added on a row-by-row basis by stacking modules above the previously installed circuit modules 40. Alternatively, if a circuit module at an intermediate location within the stack is to be replaced, the circuits attached to the corresponding front panel row may be moved to the row of temporary docking ports and those circuits originating from the flexible circuit modules may be returned to its corresponding front panel row.

Once this is complete, the entire module may be removed, enabling the upper circuit modules 40 to be lowered one position to fill the gap and allowing a replacement circuit module to be added at the top of the stack. Fiber connections to this new module are completed by exchanging the temporary input connections made at docking terminals with the replacement module terminals and routing the outputs of the circuit modules to either the output port array 180 or splice trays.

Reconfiguration Procedure

Figure 5B:
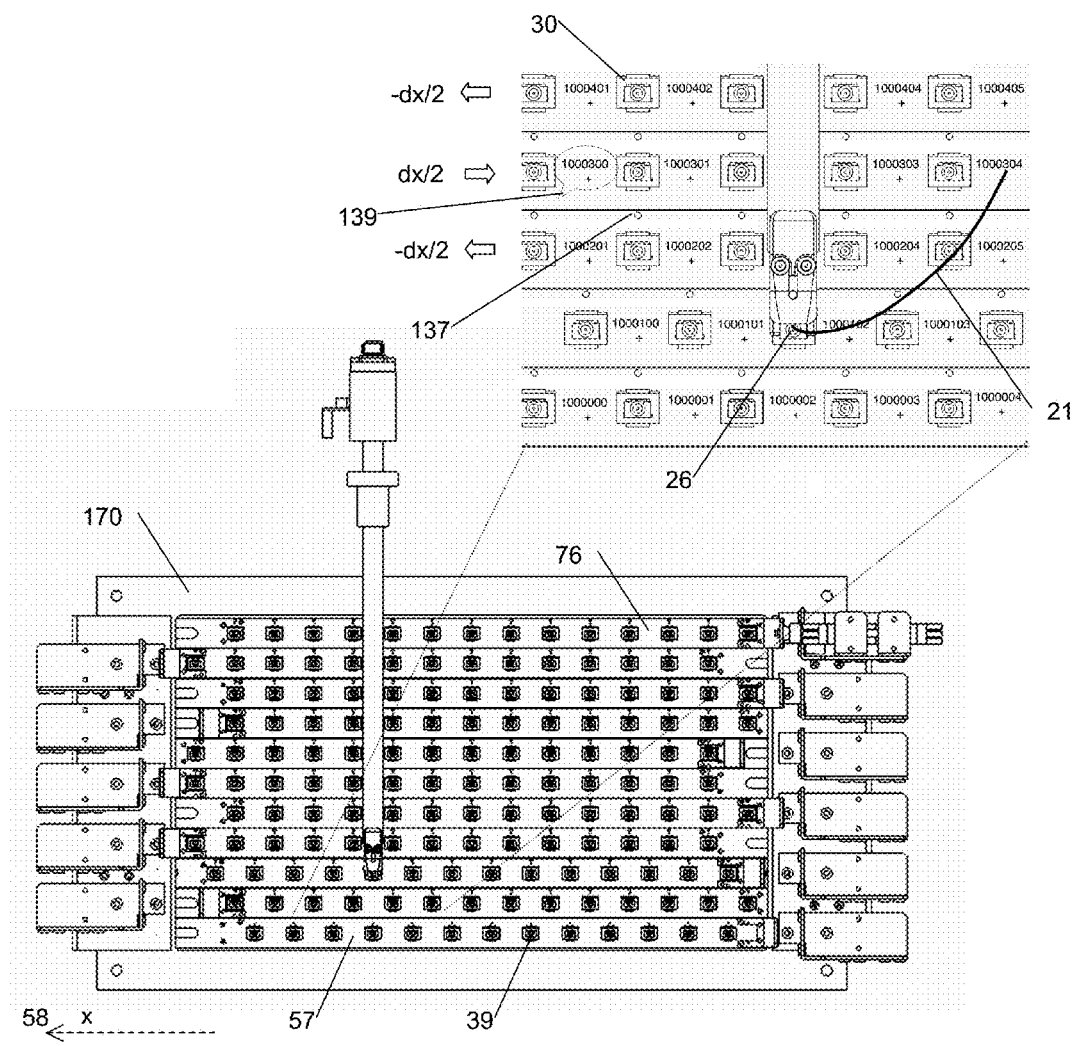

The reconfiguration of fiber lines within the cross-connect requires coordinated and timed motion of various elements to prevent entanglement. Initially, the gripper 50 is extended above the active switch volume 108 and each row of input terminals is in horizontal alignment (FIG. 5A). Reconfiguration of a particular flexible circuit 21 is accomplished by a column by column sequence of translations, each comprised of a series of vertical (y) and horizontal (x,z) translations of gripper 50 and coordinated shuffling of input rows 46 by +/−half a column spacing parallel to the x axis 58, and by the movement of gripper 50 into one of the free columnar zones created by such shuffling (FIG. 5B). Fine positioning of gripper 50 relative to terminal receptacles 39 is achieved by a vision alignment system utilizing the gripper camera's 59 video signal, in which the center of indicia 137 located adjacent each terminal are identified within a video frame by pattern matching algorithms to stored images of indicia under similar lighting conditions. The indicia 137 center is tracked in real time as a feedback signal corrects the position of the gripper 50, such that the fiber connector 26 attached thereto is precisely aligned and inserted into terminal receptacle 39.

In addition, unique input port identifiers 139, either a barcode or numeric identifier printed on (e.g., screen printed, pad printed, laser marked or engraved) or attached to (e.g., a printed label) the interior surface of each row, can be read by an optical character recognition (OCR) or barcode reading algorithm using the images provided by the gripper camera 59 to automatically determine the value of the unique identifiers 139, and use this value to unambiguously determine, either directly or through a look-up table procedure, the location of the gripper within the interstitial gap of the columns of connectors. This enables the cross-connect controller 70 to reestablish positional bearings and resume the reconfiguration process, should it be interrupted by a potential failure of power, software or hardware.

Rows are displaced with a polarity that prevents physical interference of surrounding fiber lines with moving fiber line 21. The polarity of each row's shift is dictated by control algorithms to ensure that any particular circuit 21 travels below those intervening circuits originating from a higher level and above all those intervening circuits originating from a lower level. In general, shuffling rearrangement occurs each time the connector 26 passes to the next column, either over the top-most row 76 or below the bottom-most row 75 of input terminal array 170. Movement of each row 46 is actuated by one or more solenoids, linear actuators 47, or a combination thereof.

In a particular example, the gripper 50 prepares to disengage a software selectable fiber circuit 21 first by initial coarse alignment utilizing control of stepper motor counts relative to optical limit and/or home switches, followed by a servo alignment based on gripper mini-camera feedback and pattern matching to indicia referencing the position of each terminal receptacle 30 within the input array 170. Once the gripper is in alignment in x and y, it is lowered a fixed distance to mechanically engage the target connector body 26 and withdrawn in z with sufficient force to pull the mechanically latching connector out of its mating receptacle.

In one scenario, the connector 26 retained by gripper is then translated down the column and, utilizing a similar pattern matching alignment technique, the connector is inserted into docking port 39 residing at the bottom most row 57 of the switch. The gripper 50, utilizing passive spring engagement element(s), is only able to engage the connector body by downward, vertical approach and only able to disengage the connector body by upward, vertical approach. Therefore, the gripper 50 releases the connector 26 presently retained in an input terminal receptacle by ascending back up the column to the top of active switch volume 108 to disengage the latching mechanism between the gripper and connector. The gripper then travels parallel to the row axis 58 to the next intermediate column located between the initial column and the destination column.

The above process is potentially repeated for each intermediate column. The gripper 50 descends into the first intermediate column, disengages the connector 26 from the docking receptacle 39, and ascends up and out of this column with the connector and flexible circuit 21 attached thereto. The gripper 50 then translates parallel to the rows to a second intermediate column located between the first intermediate column and the destination column. The rows shuffle once again according to the particular port mapping, and the gripper 50 with connector 26 descends into the column and inserts the connector into a different bottom-most docking port 39'. The process continues in a similar fashion until the connector 26 and fiber line 21 have passed through each column of terminals, or zones, to reach its destination. The end of the interconnect line typically follows a weaving trajectory through the neighboring lines to prevent entanglement.

In a further example, the fiber end-face of connectors may be automatically processed by cleaning module 408 during the switching cycle to ensure repeated low-loss fiber optic connections free of contaminants on the delicate end-face. The cleaning system utilizes consumable cleaning fabric on spools, pressurized air, ultrasound and/or wet chemical means.

In a particular embodiment (FIG. 6B), cleaning fabric is provided in a tape form 84 and retained on spool cartridges 83-1, 83-2 within a slide-in tray module 82 located below the bottom-most row of the input terminal array 170. Dispensing of unused cleaning tape is controlled by motor(s) 86-1 and 86-2. Once cleaning tape is consumed, cleaning module 408 can translate out of switch along slide 87 to eject used cleaning cartridges and insert replacement tape. Cleaning of connector 26 is achieved by contacting fiber endface to tape 84 supported by elastomeric backing 85 and by relative movement of endface relative to tape.

Flexible Circuit Modules

Modularity is achieved by adding multi-fiber circuit modules 40 on a row-by-row basis above those already installed to the lower portion of cross-connect. The footprint of the cross-connect is independent of the number of ports within limits. In a particular embodiment, the flexible circuit modules 40 include a corresponding row 46 of the input connector array 170 with its multiplicity of flexible circuits 21 pre-attached thereto for ease of installation. The installation of additional circuits then requires a relatively simple process in which the actuator 54 and gripper 50 is fully extended above switch volume 108, so that one or more circuit modules 40 including translatable front plates 46 holding connectors 30 can be installed by sliding in from the rear of the switch 120.

Physical interference between flexible circuit elements 21 is eliminated by moving the connector 26 along a deterministic trajectory based on the locations of all intervening circuit elements 21. Moreover, it is also necessary that the flexible fiber circuits 21 within the switch volume 108 follow a substantially linear path under slight tension to prevent physical interference with other circuits. The multiplicity of flexible fiber optic circuits 21 attached to the input connector array 170 pass through low friction, strain relieving spacing guides 45 extending from switch backbone 41 to an arrangement of fiber take-up spools 42 adjacent to the switch backbone 41 and disposed in a substantially modular arrangement. Spools 42 retain excess fiber optic cable lengths while maintaining greater than a minimum radius of curvature and maintaining a slight tension on the flexible fiber optic circuits 21 within the interconnect volume 108.

Figure 6A:
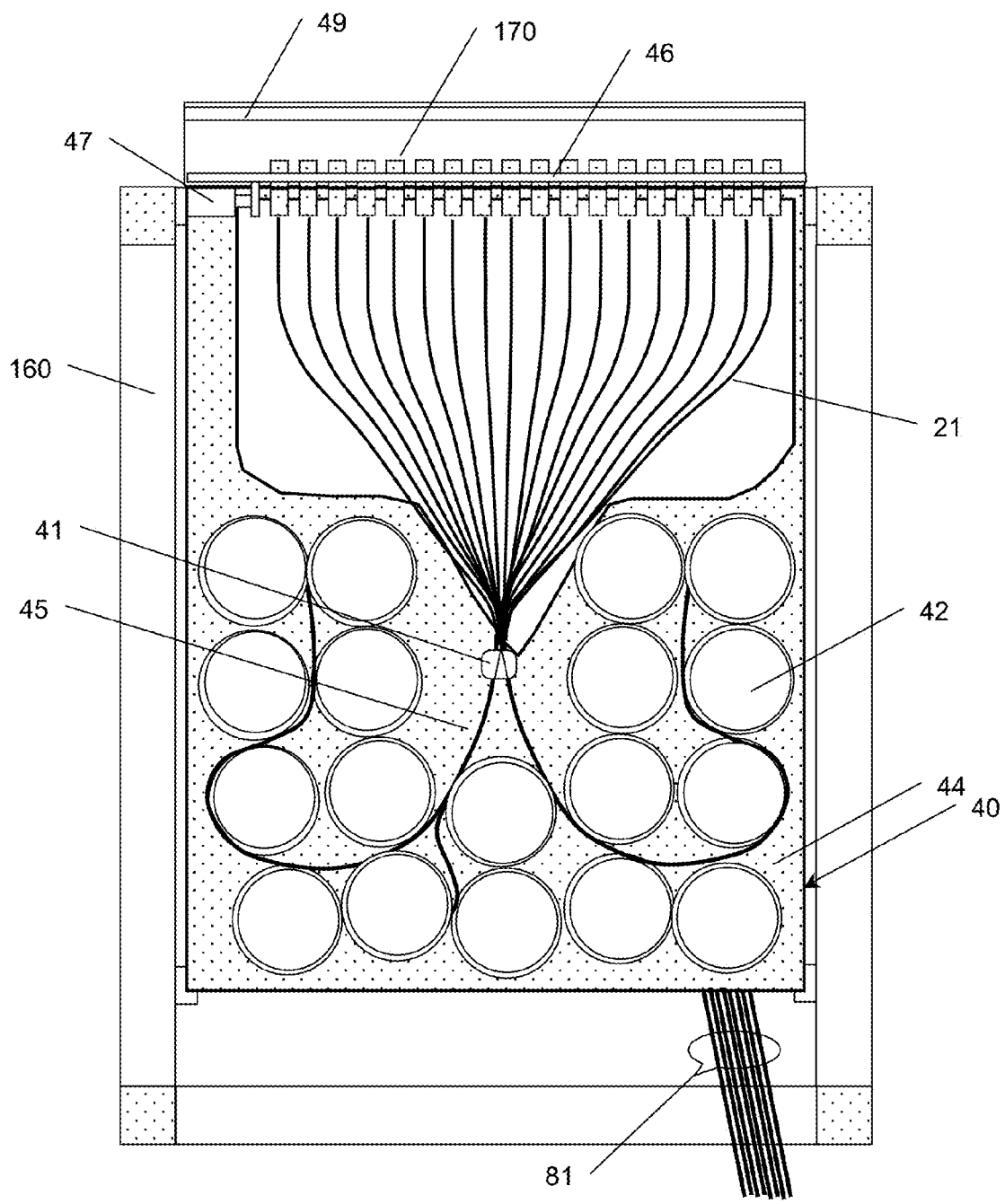
FIG. 6A illustrates a fiber optic flexible circuit module comprised of multiple circuits and retractable cable units and FIG. 6B illustrates an automated fiber end-face cleaner module.
Figure 6B:
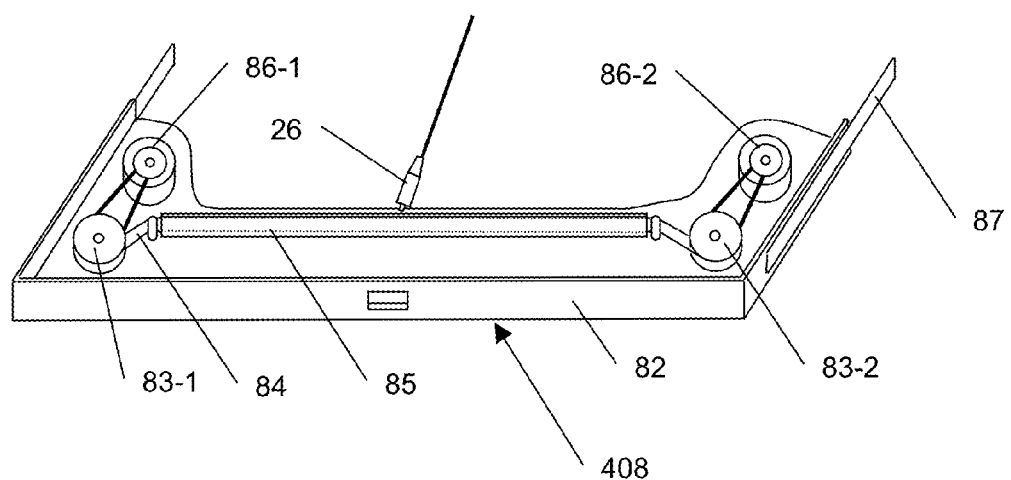

In a particular embodiment illustrated in top view in FIG. 6A, an arrangement of spools 42 for fiber retention reside in circular pockets on a common substrate 44 and guides 45 for fiber circuits 21 pass there between. Retraction of any particular flexible circuit 21 is accomplished by an internal power spring within each spool, which transfers torque to the take-up spool 42 and maintains a required tension value on the spring-reinforced fiber optic circuit 21. In an alternate embodiment, rotation of the take-up spool 42 is achieved by a motorized means using a shared retraction motor drive unit and clutch mechanism to transfer a torque to each spool. Such tensioning reduces slack cable within the interconnect volume.

The fiber circuits 21 extend under slight tension from the take-up spools 42, thereby releasing only the circuit length required for the particular circuit to follow a substantially linear path between switch backbone 41 and the two-dimensional array of interface ports 170, while retaining excess length on spool 42. The required length of extended fiber circuit 21 depends on the location of the fiber's termination at the front plane as well as the particular circuit location at the switch backbone 41. The length of flexible fiber optic circuit 21 is typically 0.25 to 3 meters for a 1000 port switch.

In a particular example, eighteen retractable fiber optic spools 42 are distributed across the rear portion of circuit module 40. The circuit module is low profile with a typical height of 18.0 mm, width of 500.0 mm and depth of 750.0 mm. The spools have a typical outer diameter of 25.0 to 90.0 mm. Eighteen independent flexible fiber optic circuits 21 extend from spools into the branching low friction fiber guides 45. The guides 45 route flexible circuits 21 from the spools 42 to a segment of the switch backbone 41 and are fabricated, for example, of Teflon (PTFE) or other low surface friction tubes (e.g., polyethylene, PFA) or by injection molded guides coated with a suitable low friction film.

Selected fiber outputs 81 can potentially be connected to other fiber outputs 81 by splicing, for example. This enables input ports to be connected to other input ports as well as connected to output ports by looping back the outputs. Similarly, input ports can be connected through external jumper cables so that output ports can be connected to other output ports as well.

In an additional example, fiber outputs 81 may be connected to fiber optic splitters such as 1×2, 1×16 or 1×32 splitters that are integrated within the circuit module 40. The multiple fiber outputs can converge into a single output by configuring the system with fiber optic combiners; alternately, the fiber outputs can be further split to produce additional outputs. For example, outputs can be duplicated by incorporating 1×2 splitters to offer a protection circuit path. In an alternate example, a single feeder fiber can be attached to a fiber output of an automated cross-connect within a fiber distribution hub. The fiber output is then split into, say, 16 outputs by a passive fiber optic splitter within the circuit module 40. The 16 outputs can then interconnected to any terminals of the input connector array 170. This implementation is particularly valuable for remote fiber distribution hubs in passive optical networks. The cross-connect outputs or inputs can additionally be provided with fast 1×2 switches to offer switchable protection circuits paths for fast service restoration. Thermo-optic switches, for example, provide sub-ms switching times.

Flexible Circuit Elements

Figure 7A:
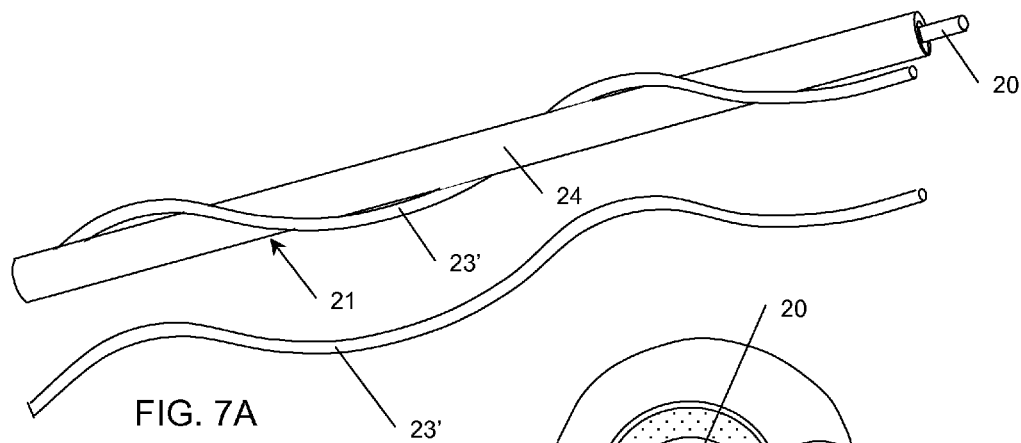
FIG. 7A details a portion of a flexible fiber circuit element including an integral, outer conductive stiffening member.

In a further aspect of this invention, we disclose flexible fiber optic circuit structures 21 comprised of one or more optical fiber elements 20 and one or more spring elements 23 longitudinally adjacent to one another and arranged in a fashion that prevents excessive bending of the optical fiber elements 20 when the flexible circuit 21 is tensioned. In a particular embodiment (FIG. 7A), the flexible fiber circuit 21 is comprised of a acrylate coated, loose tube or tight buffer optical fiber 20 loosely wound with a straight segment of spring wire 23 or passing through the center of a loosely spiraled stainless steel spring 23'. The forming of the steel spring 23' into a loose spiral with an inner diameter of 1 mm and a longitudinal spacing per turn of about 50 mm retains the central optical fiber and provides stiffness and strain relief while minimizing the potential for micro-bends within the optical fiber 20. The typical spring wire diameter is 0.010 to 0.015 and the spring material undergoes a spring-temper or hard-temper process to increase its yield stress. Typical optical fiber 20 outer diameters, including a buffer or loose tube, are 0.25 to 1.5 mm.

In the example for which the spring element 23' is external to jacketed fiber 20, the spring element 23' is advantageously coated with a low friction fluoropolymer (e.g., PTFE) or polymer film 25 to facilitate the longitudinal sliding of spring element 23' relative fiber element 20, and also to facilitate the sliding of flexible circuit 21 relative to other flexible circuits. Moreover, the film 25 provides an electrically insulating jacket that prevents electrical contact between adjacent flexible circuit elements 21. The jacket may be selectively stripped in certain regions of the wire to expose the conductor and enable electrical contact. These electrical elements are advantageous in several implementations of electronic port identification as described in later sections. The spring 23' and fiber 20 elements may be attached at one or more spaced-apart locations along the length of the flexible circuit 21. It is advantageous that the spring element 23' experiences the tension and fiber element 20, being slightly longer in length, not be subjected to a tensile force.

Figure 7B:
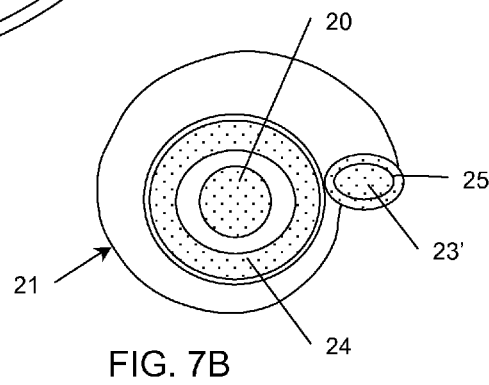
FIG. 7B is the corresponding cross-sectional view, FIG. 7C details a portion of a flexible fiber circuit element including an integral internal conductive stiffening member.
Figure 7C:
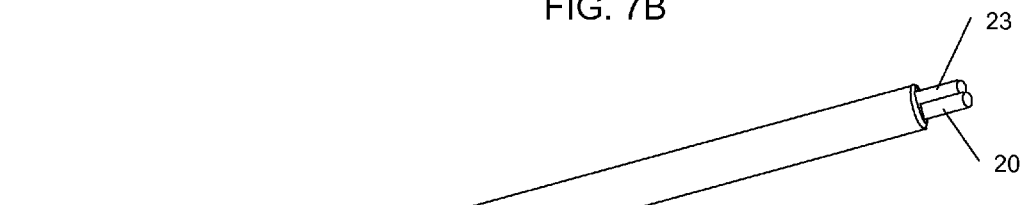
FIG. 7D is the corresponding cross-sectional view.
Figure 7D:
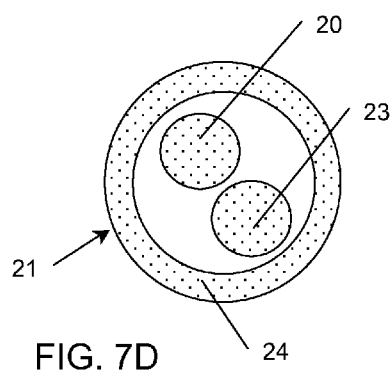

In a further aspect of the invention (FIG. 7B), both the spring 23 and optical fiber 20 are retained within a common loose tube sleeve 24 whose inner diameter is sized to accept one or more spring elements 23 and one or more fiber elements 20. Suitable materials for the sleeve 24 include materials with low surface friction characteristics such as fluoropolymers (i.e., PTFE) with inner diameter of 0.600 mm to 0.750 mm and outer diameter of 0.9 to 1.0 mm. Thick-walled tubing itself can serve as a stiffening element, potentially obviating the need for a portion of or the entire metal spring element. Typical acrylate or polyimide coated silica optical fiber 20 is 0.250 mm in diameter and spring element 23 is 0.250 mm diameter spring tempered steel wire.

In a particular example, flexible fiber optic circuits 21 utilize optical fibers 20 which are coated, buffered or within a loose tube/tight buffer and longitudinally adjacent to an elastic stiffening element 23 which maintains a minimum bend radius throughout the range of motion occurring during fiber circuit reconfiguration.

In a further example, the optical fiber 20 with a waveguide core is loosely twisted about a wire spring 23 of spring-tempered or hard-tempered stainless steel, with about 1 full twist per 2-10 cm. The typical wire diameter is 0.250 to 0.350 mm and the typical fiber diameter is 0.6 to 0.9 mm for tight-buffered or loose-tube fiber.

In an alternate example, optical fiber circuits 21 are intermittently attached to spring 23. Typical spacing between attachment points is 5 cm. Adhesive may be in the form of self-adhesive die cut shapes or precisely dispensed adhesive drops. As the fiber circuit is reconfigured, the fiber 20 and spring 23 are free to separate while maintaining at least a minimum local radius of curvature on the optical fiber.

In an alternate example, a loose tube buffer sleeve 24 surrounding the optical fiber 20 and wire spring 23 will allow the spring and fiber to freely piston within the tube's lumen as the combined element is reconfigured. The spring is attached to connector body 26 at the proximal end and the fiber and spring are free to longitudinally slide within the buffer tube. The buffer tube may be 0.5 to 0.9 mm in diameter and fabricated of hytrel or fluoropolymer such as PTFE (Teflon), for example.

In a further example, the flexible fiber optic circuit may include a longitudinally varying stiffening element that provides variation in stiffness along the circuit. In a particular implementation, a small diameter (e.g., 250 microns) stiffening member runs along the entire length of the fiber and an additional stiffening member (e.g., 350 micron diameter) augments the stiffness at the proximal end of the circuit. Alternatively, a wire element with longitudinal variations in diameter may be utilized.

Figure 14A:
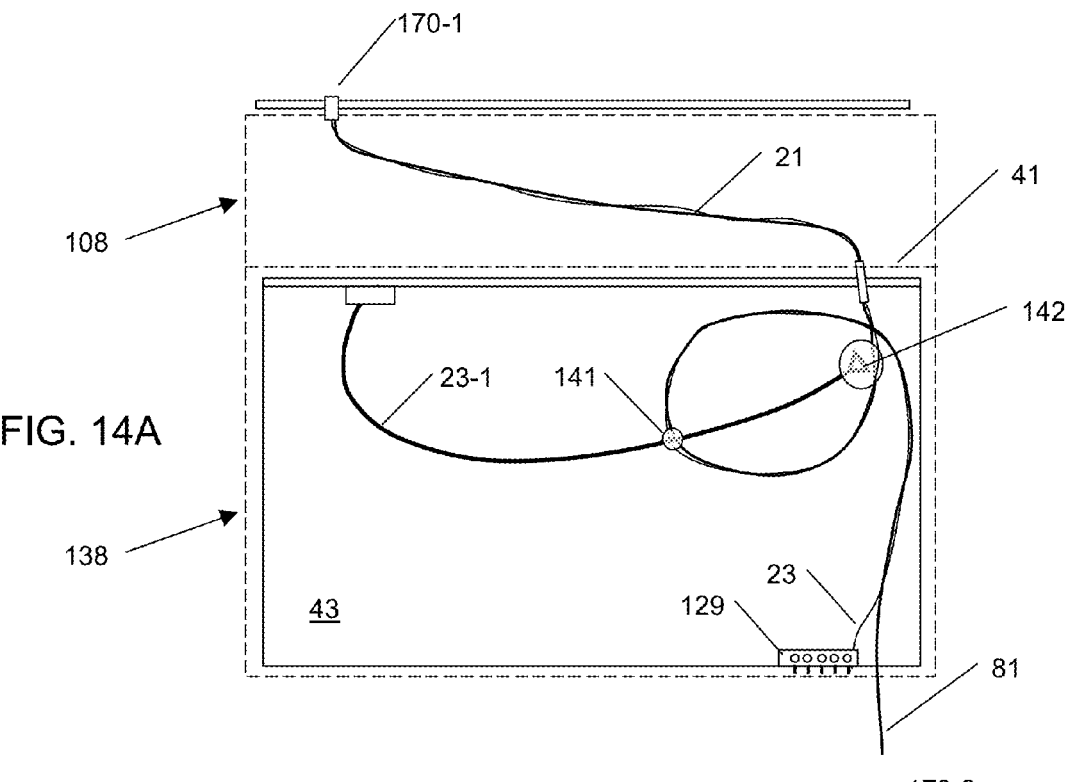
FIGS. 14A and 14B illustrate an example method of fiber tensioning utilizing a passive spring element.

In these examples, the flexible fiber optic circuit follows a substantially linear path. This path of circuit 21 is comprised of a straight-line segment and includes spaced-apart arc segments of limited length with greater than a minimum bend radius at the terminal array and at the intermediate port array (as shown in FIG. 14A, for example).

Take-Up Spools for Slack Retention

Figure 8A:
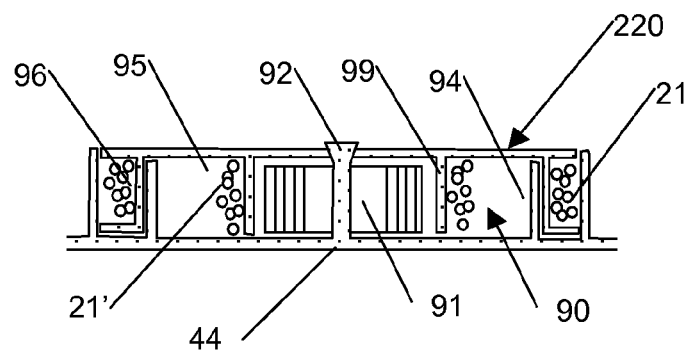
FIG. 8 illustrates an individual fiber tensioning spool in cross sectional view (FIG. 8A) and top view (FIG. 8B)
Figure 8B:
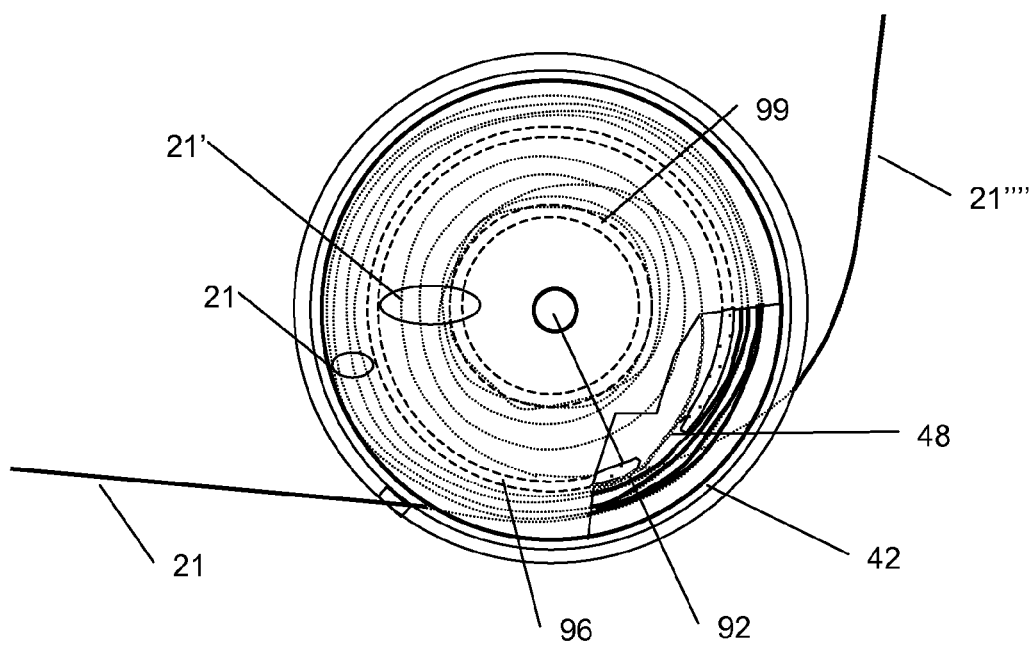

In a further aspect of the invention (FIG. 8), slack fiber management and fiber tensioning are provided by rotating take-up spools 42. The proximal end of fiber circuit 21 is terminated in connector body 26 attached to a port 30 of input terminal array 170. The intermediate section of circuit 21 behind the fiber backbone 41 is wound onto a mandrel section 96 of rotating spool 42 with a diameter greater than 25 mm or the minimum bend radius of the particular fiber. The fiber exits the spool section and follows a transition channel 48 through mandrel wall 96 within spool element to enter a rotary interface 90 fiber circuit segment comprised of a multiple turns of fiber circuit 21 about a mandrel feature 99 extending from bottom side of spool 42. The flexible circuit 21 or equivalently, the composite optical fiber/spring structure, thereby maintains a substantially multilayer spiral arrangement constrained within an annular cavity bounded at its inner diameter by the annular mandrel wall 99, whose radius is greater than the minimum bend radius of optical fiber 20, and bounded along the outer diameter by a circular wall 94 extending from the base 44 of module 40. As the spool 42 rotates, the average winding diameter of flexible circuit 21' within the annular cavity 95 either decreases or increases.

This low profile, retractable fiber optic device 210 therefore retains excess lengths of flexible fiber optic circuits 21 on a spool 42 which is free to undergo a limited number of rotations, the number limited by the length of the spiraled flexible circuit 21 within the all-fiber rotary interface 90. Such retractable devices 210 have been previously disclosed by Kewitsch in U.S. Pat. No. 7,315,681, entitled "Fiber optic rotary coupling and devices". The retractable device comprises a take-up spool 42 including a first mandrel wall 96 about which the flexible circuit 21 is wound, an annular rotary interface cavity 95 that accommodates a finite number of rotations of the spool 42, and a central power spring 91 attached to inner shaft 92 to transfer torque onto the spool, thereby tensioning the fiber. In an alternate embodiment, the fiber take-up spool 42 is powered by a motor unit.

FIG. 9 schematically details in cross section the rotary interface portion 90 of the retraction device 210 in the fully wound (9A) and unwound (9B) configurations. This drawing illustrates a structure which couples fiber between the rotating take-up spool and the fixed circuit module 40 without stressing the fiber circuit. This structure is similar to a coiled spring of extended height along an axis of rotation with an optical fiber further coiled longitudinally about the spring element, where one end of spring is free to rotate relative to the other end of spring. In the fully wound configuration, the flexible circuit section 21' accumulates in the vicinity of the inner diameter 99 and in the fully unwound configuration the same flexible circuit section 21' accumulates along the outer diameter 94. The annular volume provided for the flexible circuit segment 21' is adequate to allow this spiral segment to wind and unwind under a finite number of rotations of the take-up spool 42, while subjecting the internal optical fiber 20 to minimal bending stress as it is carried by spring element. The take-up spool 42 is typically able to undergo 5 to 10 full rotations. The proximal end of circuit segment 21" is attached to rotating spool 42, about which a variable length of circuit segment 21 winds. The distal end of the flexible fiber optic circuit 21''' exits at the outer diameter of the rotary interface 90, is fixed in length and routed to appropriate fixed output ports as an individual fiber optic element 20. In a particular example, the spring element 23 is separated from the fiber element 20 at some location before the distal end of circuit 21 for connection to electronic monitoring circuitry. The torque to rotate the take-up spool about mandrel 92 is provided by a power spring 91 or by the spring element associated with the fiber circuit 21.

The length of the wound circuit element 21' within rotary interface 90 is of fixed length between 0.5 and 6 meters. The distal end of circuit 21''' is fixed in length (typically 2 meters) and fixedly routed to either an output port connector 30 or splice tray 72.

Figure 10A:
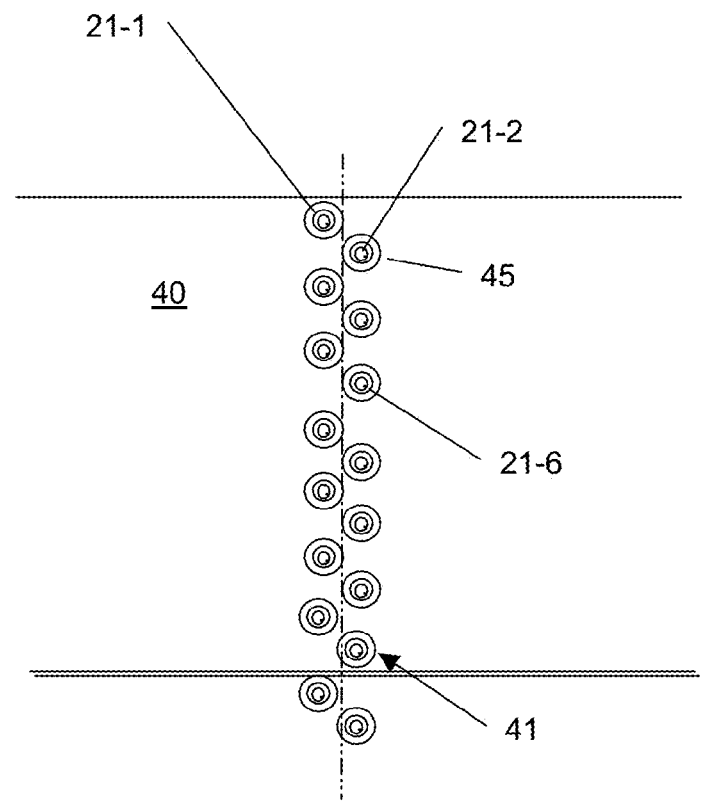
FIGS. 10A and 10B detail the configuration of substantially vertically arrayed fiber guides exiting a section of the switch backbone in end-on and perspective views, respectively.
Figure 10B:
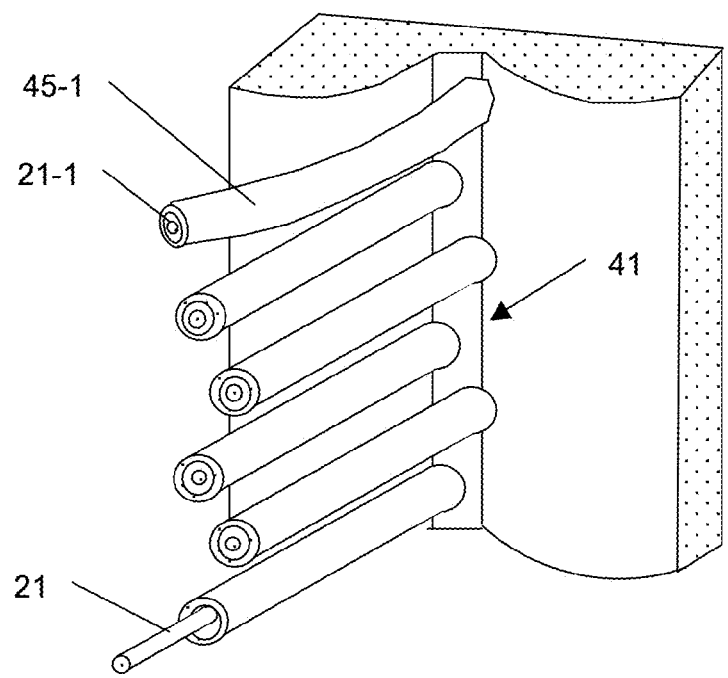

In a further aspect of the invention, the centers of flexible circuits 21 pass through conduits 45, which lie at or in the vicinity of the centerline of the switch backbone 41 segment of flexible circuit module 40. FIGS. 10A and 10B detail a portion of the backbone with the flexible conduits 45 extending there from. The flexible conduits 45 further serve as strain relief and prevent excessive bending of the circuit elements 21-1, 21-2, . . . that pass through as they exit the rigid backbone 41. The flexible conduits 45 will partially bend to provide a gradual transition to the nominally straight-line paths of the flexible circuits 21 within switch interconnect volume 108. Typical inner diameters of the flexible conduits 45 are in the range of 1.2 to 2.0 mm with a wall thickness of 0.125 to 0.500 mm.

High-Reliability Optical Connections

The optical performance of the automated patch-panel in accordance with the invention is equivalent to the highest performance possible for manual patch-panels because the optical fiber is interrupted by only a single connector interface 30 per port. In contrast, switch technologies of the prior art require additional connector interfaces per port to facilitate interconnection to external patch cords. The connector interfaces 30 utilized herein provides low loss and low back reflection by passive alignment of optical fibers terminated in polished ferrules with precise fiber optic core concentricity. The fiber-ferrule end faces are polished according to APC (angled physical contact), UPC (ultra-physical contact) or PC (physical contact) standards. Opposing fibers are mated by inserting the polished ferrules into opposite ends of a precision split sleeve until they touch. The compliant split sleeve achieves precise core alignment of the waveguide cores within the fiber. Physical contact connectors with ceramic split sleeves, under ideal conditions, have lifetimes exceeding 1000 to 5000 re-matings. The use of ceramic rather than metallic split sleeves helps to prevent abrasion and formation of free particulates during repeated insertion.

Physical contact connectors, by virtue of the optical contact between radiused ferrule end faces and wear on the connector and adapter housings, can begin to degrade after 1000's of mating cycles. The durability can be substantially increased by maintaining a high level of cleanliness within the switch volume, providing automatic fiber end-face cleaning capabilities and by reducing particulate shedding during insertion of the connector by utilizing mating receptacles with ceramic sleeves and potentially metal housings. High optical performance for an essentially unlimited number of switching cycles (e.g., >1,000,000 mating cycles per port) is achieved by use of the field-replaceable protective connector cartridges 35 with lifetimes of >500 mating/demating cycles per cartridge, and by the use of front panel union adapters 30 that include internal fiber stubs. The design and use of such protective fiber optic union adapters 30 and male-to-female connector cartridges 35 have been previously disclosed in U.S. patent application Ser. Nos. 11/865,731 and 11/307,688 filed by Kewitsch. The number of re-connection cycles per port is optionally stored within memory to alert the user to replace a particular protective connector cartridge 35 and/or union adapter 30.

Disposable connector interface units 30 and 35 reduce the up-front cost and complexity of optical switches while achieving optical connectivity performance equivalent to that of standard manual patch panels. Typical optical loss is <0.25 dB because only one connection (those front panel ports 170) per circuit is required and the typical return loss is >50 dB.

The patch panel connector interfaces 30 utilize PC, UPC or APC terminations and MU, LC, SC, MTRJ and/or MPO style connectors.

Figure 11A:
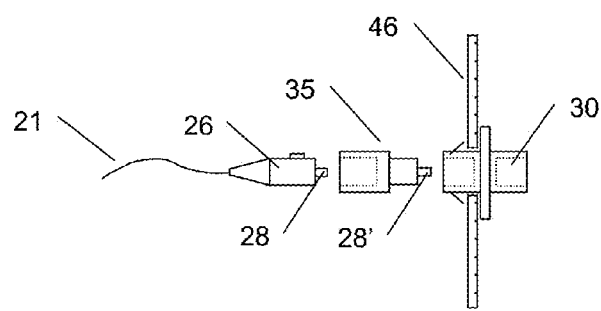
FIGS. 11A through 11E depict protected, sacrificial and removable fiber optic connector interfaces in various states of usage.
Figure 11B:
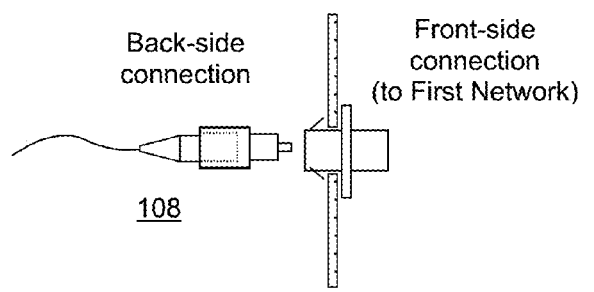
Figure 11C:
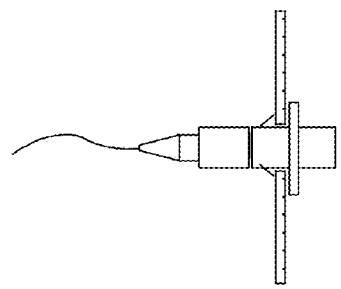
Figure 11D:
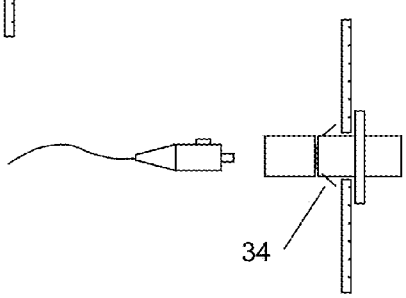

FIGS. 11A through 11E illustrate the protective male-to-female interface adapter 35 and union adapter 30 under various cross-connect installation conditions. FIG. 11A is an exploded view of the connector 26, adapter 35 and union 30 attached to a front panel 46. The adapter 35 includes an internal fiber stub/ferrule 28' that physically isolates the flexible circuit's 21 connector 26 from repeated mating as the switch is reconfigured. This sacrificial adapter element 35 prevents damage to the polished ferrule tip 28 of connector 26. The ferrule tip 28 of protective adapter 35 experiences wear-out and can be replaced from the front panel 46 of the cross-connect switch 100.

Figure 11E:
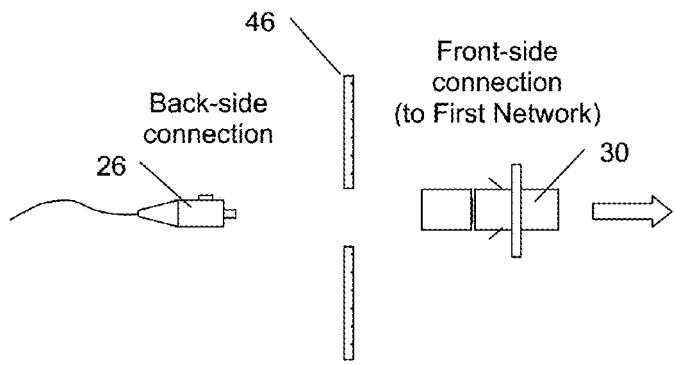

After installation of a connector receptacle (FIG. 11C), the spring-clips 34 on connector receptacle 30 firmly engage the receptacle to the front panel 46. When the receptacle 30 requires replacement, the receptacle is removed from its cut-out in the front panel (FIG. 11E). During this replacement procedure it is necessary to maintain cleanliness within the internal switching volume 108. This can be maintained by providing a fan with a high efficiency particulate filter (HEPA) 250 to produce a slight positive pressure inside the switch interconnect volume 108 during the connector replacement.

In a further aspect of the invention, it is of potential value that each port of the cross-connect switch 100 have a non-transmissive state (>30 dB loss) in addition to the transmissive state (<0.5 dB loss). In a particular example, this is accomplished by providing a number of docking ports 39 equal to the number of input terminals 30, to which circuits may be physically attached while remaining optically disconnected. Alternately, there are advantages in providing this functionality in a fiber optic union adapter 30'' which provides two latched mechanical states when interfaced with standard fiber optic connectors 26, such as the SC, LC and MU types. For example, as the connector 26 (FIG. 12A) is longitudinally inserted into the union adapter 30'' and first engages the latch 29 (FIG. 12B), it enters a first mechanically latching state corresponding to a non-transmissive or optically disconnected state. This state is characterized by an air gap 136 between the opposed ferrules 128 which produces a substantial insertion loss (>30 dB). By inserting the connector 26 further in the longitudinal direction (FIG. 12C), the connector 26 enters a second mechanically latching state corresponding to a transmissive or optically connected state, in which the opposed ferrules 28 are physically contacted for low loss.

In an additional embodiment of this invention, a fiber optic adapter subassembly 61, with integrated optical power monitoring, such as those disclosed in U.S. Pat. No. 7,289,197 to Kewitsch, may be utilized at either the input or output array of terminals to monitor the optical power passing through each port (FIG. 13). This type of optical detector utilizes a patterned transmissive film such as ITO formed on the polished endface 28'' of a fiber stub, for example, the resistance of which is measured by electronics 62. The optical power readings are converted to electrical signals from these adapters that may be interfaced with controller 70 by way of electrical interconnections 69 and/or used to activate light emitting diodes 63 (LED's) adjacent the connector receptacle. The state of the LED indicates whether the optical fiber attached to receptacle 30 is carrying live traffic or is dark.

These LED signals, or live-fiber indicator lights, help to prevent technicians from erroneously removing those fiber optic patchcords carrying live traffic from among the multiplicity of surrounding fiber optic cables (not shown here for clarity) attached to the front of patch-panel 79. This live-fiber indicator feature ensures that upon disconnect of a fiber, network operations are not compromised, optical damage to the polished fiber endface of disengaged connectors is prevented, and potential safety hazards associated with the optical power escaping from the end of a live fiber is mitigated.

EXAMPLE

Multilayer Flexible Circuit Structures

Figure 14B:
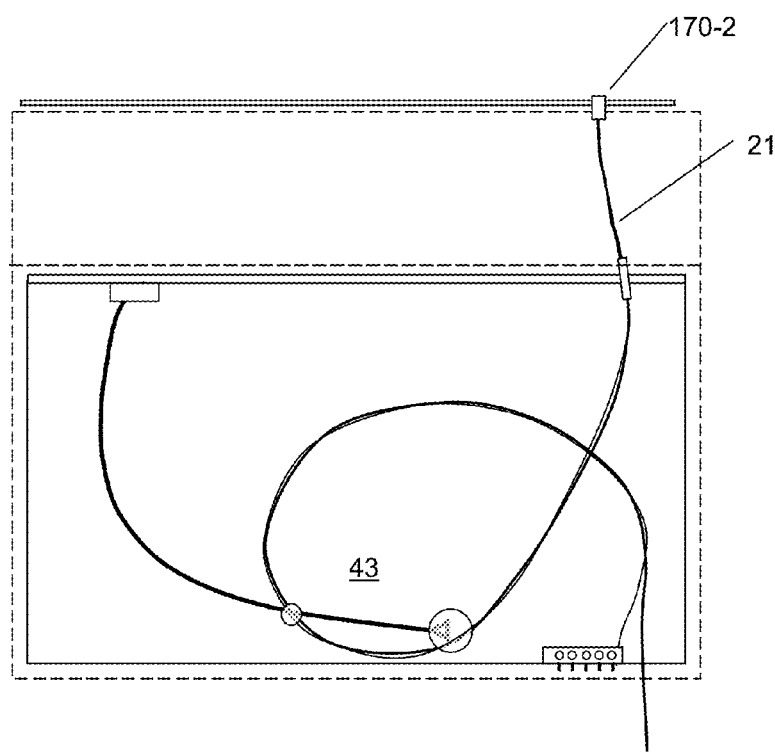

In a further example (FIGS. 14A and 14B), the flexible fiber optic circuit line 21 is attached behind the backbone 41 and within the circuit module 40 to a substantially non-parallel second spring element 23-3 whose stiffness is substantially greater than spring element 23 within circuit 21. Attachment is achieved by use of adhesive attachment elements 141 and 142, such as self-adhesive Teflon film. When the proximal end of circuit 21 is fully extended to reach the most distant port located at 170-1, the second spring element 23-1 is bent to its minimum radius of curvature to produce the largest tension force on circuit 21. This tension force is by design adequate to retract the circuit 21 while not being excessive as to over bend the circuit 21 at locations 170-1 and 170-2. To enable electrical traceability of the flexible fiber circuits, the spring element 23 is terminated in an electrical terminal block 129 to interface with switch control system 70 electronics.

In a particular example, spring elements 23, 23-1 are fabricated of spring tempered stainless steel and/or carbon steel. Interleaved with spring elements is a low surface friction separation film, such as 0.002-inch thick PTFE material. This film provides not only low friction but also separates the multiple flexible circuits so that they can move independently. This film is also of sufficiently light weight that the stack of such film does not add sufficient weight on top of the bottom most layer and prevent free motion of the bottom most flexible circuit. More specifically, five layers of substantially planar flexible circuits, each surrounded on top and bottom by sheets of low surface friction film, form a vertical stack wherein vertical support of the circuits by a rigid metal or plastic tray (e.g., 0.025 thick aluminum) is provided approximately every five layers to prevent collapse and interference of the multiple layers under gravity.

Figures 15A, 15B:
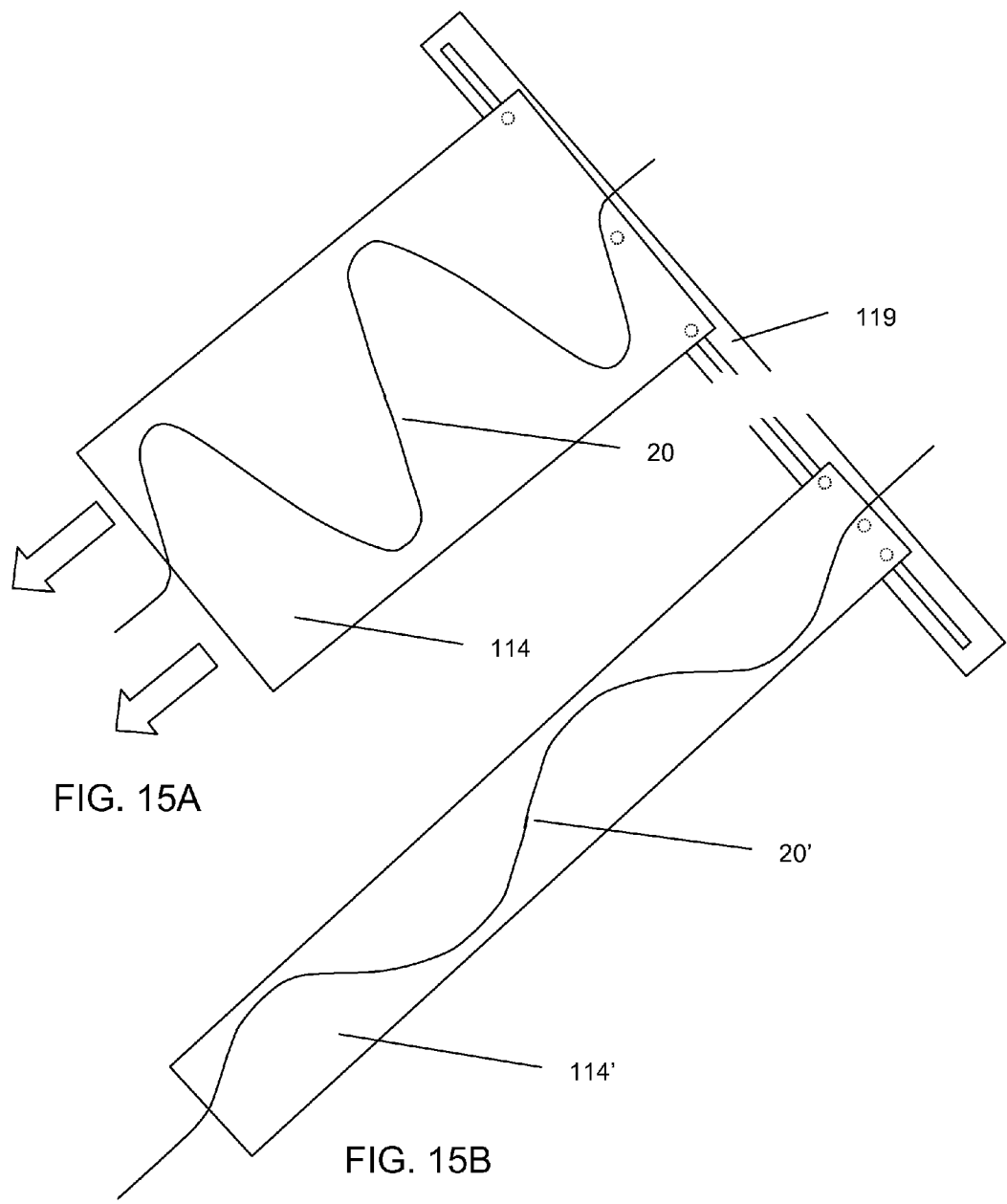
FIG. 15 illustrates a fiber tensioning approach utilizing an optical fiber integral with an elastic substrate, in a retracted (FIG. 15A) and extended (FIG. 15B) configuration.

In a further aspect of the invention (FIG. 15), the retraction force may be provided by a flexible, elastic substrate 114 to which the fiber 20 is attached. By pulling on one end of flexible substrate 114, its length is increased, thereby stretching or partially unfolding the path of fiber 20' on deformed substrate 114' in a manner that produces at least a minimum bend radius. Suitable materials for the flexible substrate 114 include thin rubber or nylon sheets or woven structures exhibiting high elasticity and low creep.

In an additional aspect of the invention, the retraction force may be provided by a coiled extension spring structure, to which the fiber is intermittently attached, such that the optical fiber follows a path exhibiting greater than its minimum radius of curvature.

EXAMPLE

Automated Patch-Panels in Telecommunications Central Office

Figure 16:
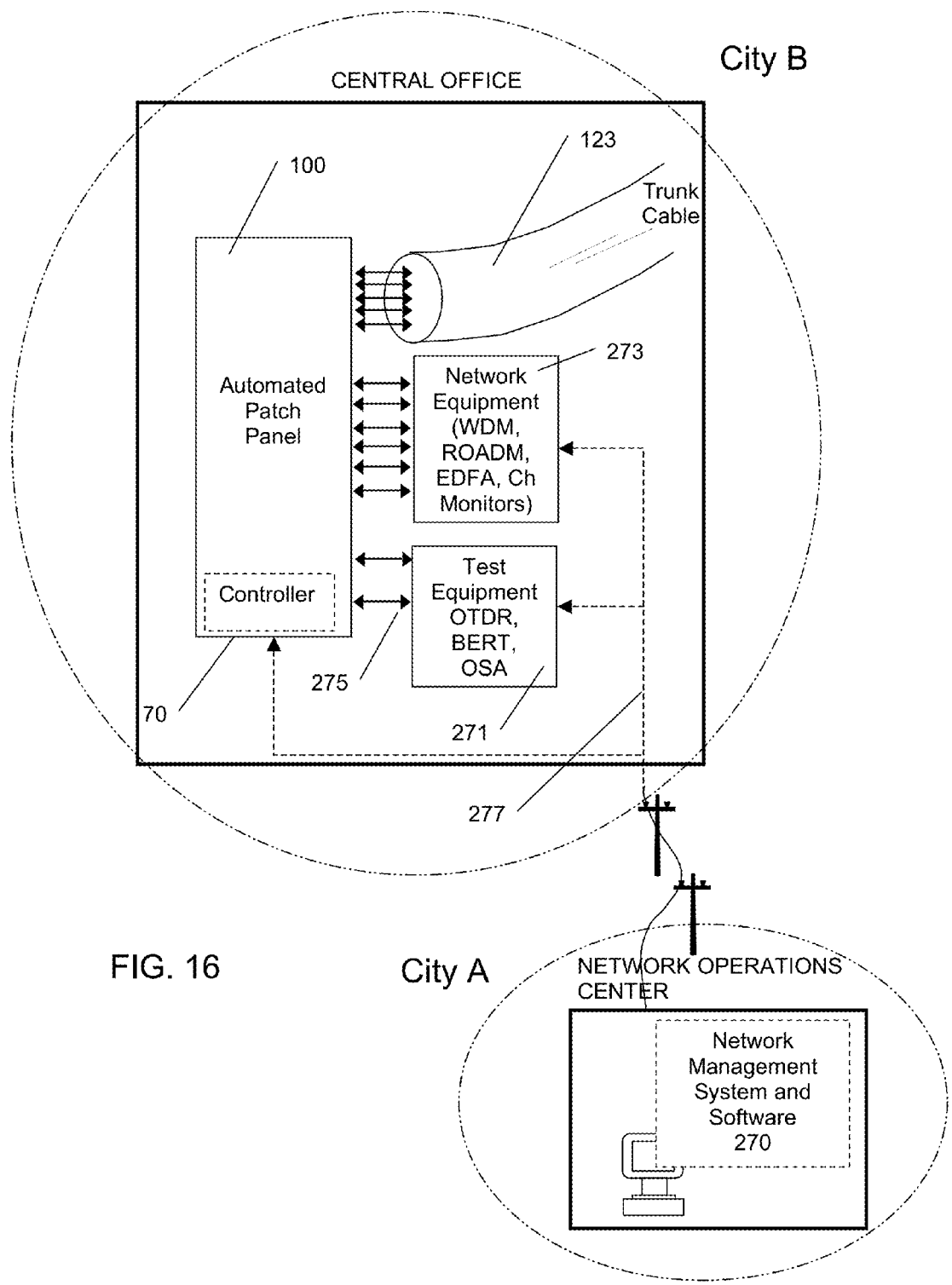
FIG. 16 is a block diagram of the automated optical cross-connect switch in communication with various transmission and test devices within a typical central office and controlled remotely from a distant network operations center.

In accordance with the invention, the automated fiber optic patch-panel system 100 disclosed herein enables a remote Network Operations Center in city A with network management systems and software 270 to control a distant patch-panel in city B through its controller 70 attached to network interface 277 (FIG. 16). The patch-panel, attached to a second network through trunk cable 123, enables test equipment 271 such as optical time domain reflectometers (OTDRs), bit error rate testers (BERTs), and optical spectrum analyzers (OSAs) to be connected to the patch-panel using static patch cords 275, and thereby share test equipment among the many optical links serviced by patch-panel. In addition, network transmission equipment 273 from a first network, such as wavelength division multiplexers (WDMs), reconfigurable optical add/drop multiplexers (ROADMs), Erbium doped fiber amplifiers (EDFAs) and channel monitors are patched-in to the input ports of the automated patch-panel. This enables the network to be remotely reconfigured and tested by the network management system software 270.

EXAMPLE

Internal Electronic Status Monitoring and Error Reporting

In accordance with this invention, the reconfiguration of the optical cross-connect switch first requires knowledge of the positions of all connectors 30 of flexible fiber optic elements 21 at connector array 170. The mapping can be based on switch port maps stored in a database in the memory of controller 70. The mapping is continually updated as the switch ports are reconfigured. An automated fiber optic patch-panel 100 in accordance with the invention may include electrical tracing elements within flexible fiber optic circuits 21 to trace the location of each flexible circuit 21 across the array of ports 170. For example, an electrical voltage signal is launched down at least one of the flexible optical circuit elements 21 by making direct or indirect electrical connection to a conductive element, for example, the conductive spring member 23 within the flexible optical circuit 21.

Figure 17A:
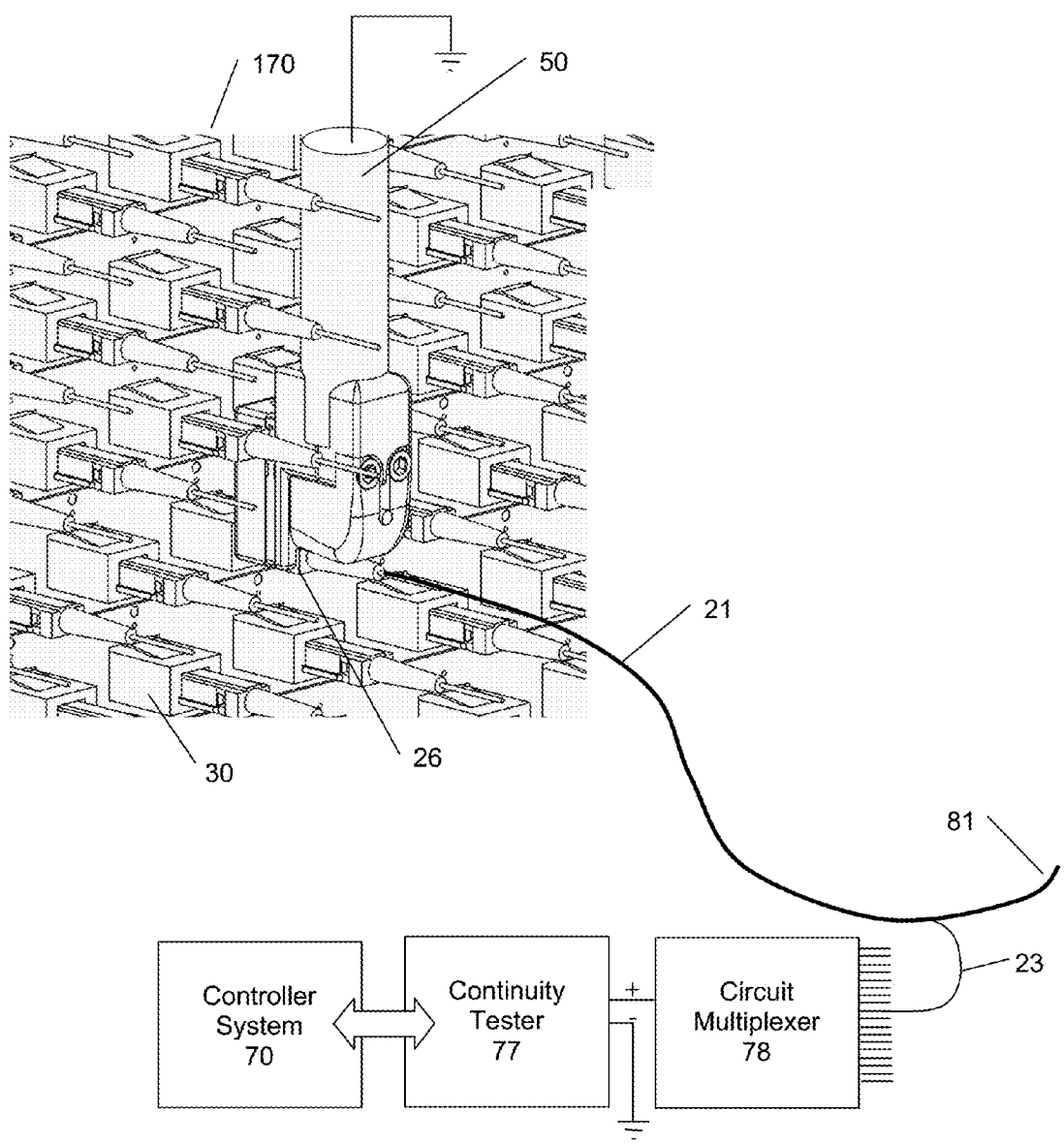
FIG. 17A illustrates a connector gripper with integral electronic connector identifier functionality and FIG. 17B details a tone detector probe with enhanced spatial resolution to identify individual internal interconnections in the presence of closely spaced neighboring interconnections.

In a particular aspect of the invention, the gripper 50 makes direct electrical contact with fiber element 21 when the gripper engages the connector body 26 (FIG. 17A). A continuity tester 77 switched to the conductive element 23 of any fiber circuit 21 by use of circuit multiplexer 78 ascertains which fiber element is attached to which input terminal 30 of array 170. The techniques of continuity testing and voltage tone tracing may utilize one or two conductors per fiber optic circuit 21. Continuity is established with only one conductor per fiber if a common return path is provided. In the voltage mode of tone tracing (in contrast to current mode), a radio frequency or audible frequency voltage tone is sent down one conductor and the ground reference is provided by a common ground, such as shielding and/or enclosures.

More particularly, to determine fiber connections based on a continuity test, the gripper 50 makes physical and electrical contact with a particular connector 26 and its electrically conductive element. By measuring the resistance between the other end of the fiber circuit and the gripper, the identity of the circuit and whether it is engaged or disengaged from the gripper may be determined. A voltage may be applied to each conductive element 23 of fiber circuit 21 of the cross-connect in a sequential fashion, by electrically switching between conductive elements 23. By repeating this process for all ports, the entire port mapping can be ascertained.

In an alternate embodiment, flexible circuit 21 elements include the spring element 23 located outside of the optical fiber's 20 sleeve, and the electrical insulation layer 25 on spring element 23 in vicinity of connector body 26 is removed. This enables a direct electrical contact and continuity test to be made between the gripper 50 and the particular flexible fiber optic circuit 21 being electrically contacted.

Figure 17B:
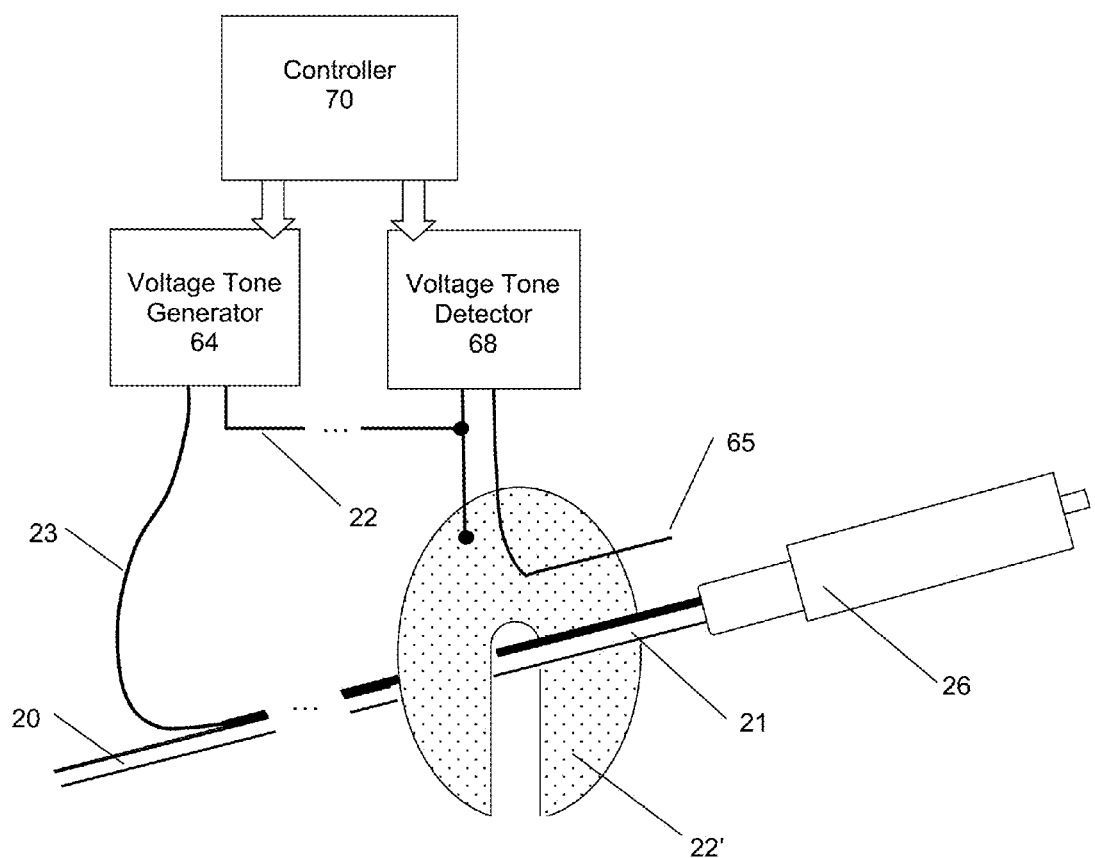

Alternatively, the fiber optic circuit element 21 is individually and independently excited by a voltage or current tone produced by a tone generator 64 interfaced with controller 70 (FIG. 17B). Such tones may be sinusoidal in nature and lie within the frequency range of kHz to MHz, typically 1 to 10 kHz, to facilitate a wireless determination of the configuration of optical circuits 21. Back-end termination points at the distal ends of flexible fiber optic circuit elements 21, located through the switch backbone 41 and beyond the exit point from flexible optical circuit stack 40, are attached to independent electrical conductors which interface to an electronic switch matrix and tone generator 64. A unique voltage tone may then be switched onto any one of the particular circuits 21.

Alternately, the gripper may further include a voltage probe 65 (FIG. 17B). By positioning the gripper 50 in the vicinity of any connector 26, the controller 70 directs the tone generator 64 to launch a tone down each conductive element 23 of fiber circuit 21 of the cross-connect in a sequential fashion, by electrically switching between conductive elements 23 excited by the tone generator 64. By repeating this process for all ports, the port configuration can be ascertained.

The voltage probe 65 must have sufficient spatial resolution to unambiguously identify which connector 26 is attached to the particular port under test in the presence of closely spaced neighboring connectors. For the voltage probe design of FIG. 17B, the flexible circuit 21 under test is partially inserted into the voltage probe unit such that it passes through a slot within the ground plane 22'. The ground plane 22' localizes the electromagnetic radiation which is detected by the voltage probe's antenna. The ground plane is attached to both the voltage tone detector circuit 68 and the voltage tone generator circuit 64 by way of a common ground wire 22. The voltage tone generator circuit 64 is attached to the flexible circuit's 21 conductor element 20 to excite the particular circuit 21 with a voltage tone.

In a further example, an electrical voltage tone is launched down any of the flexible optical circuit elements 21 by making direct or indirect electrical connection to the conductive element, for example the spring member(s) 23 within the flexible optical circuit 21. Thereby, the circuit element is individually and independently excited by a voltage or current tone produced by the tone generator. The tone generator functionality may be incorporated into the reader 615 or may be a separate module. Such tones are oscillatory in form and lie within the frequency range of kHz to MHz, typically 1 to 100 kHz. A unique voltage tone may be switched onto any one of the particular fiber optic elements 23, the frequency and amplitude of which are detected by an array of antennas 67 distributed among the two-dimensional array of ports 30.

In a further example, the gripper 50 includes a downward directed light source and photodetector or camera to check for the presence of any improperly placed fiber optic circuits 21 within the column or zone 101. This collision avoidance feature would then provide an alert and a fault indicator. In this fashion, proper operating characteristics can be confirmed during the lifetime of the switch.

EXAMPLE

RFID Port Monitoring

Figure 18:
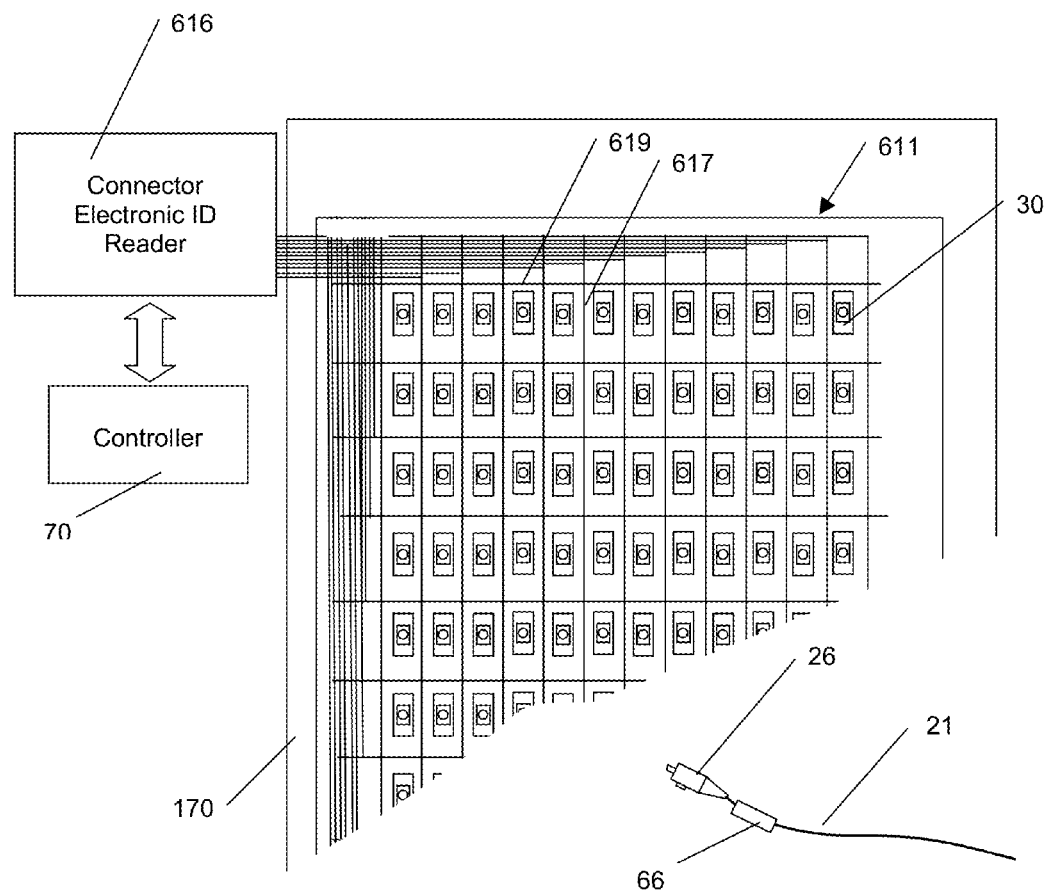
FIG. 18 illustrates a portion of the interior side of the switch front panel and a system for electronically monitoring the port configuration of the switch utilizing an array of RFID tags.

In a further example (FIG. 18), each flexible fiber optic element 21 is associated with a unique RFID identifier tag 66 whose physical location may be ascertained by electrically scanning the two-dimensional array 170 of connectors 26. For example, this identifier may be in the form of a radio frequency identification (RFID) tag 66 with a unique serial number. The RFID tag 66 is attached to each flexible fiber optic circuit 21 in the vicinity of the fiber optic connector body 26. Each tag 66 includes a unique identifier associated with a particular fiber optic switch port through a port map, which is stored in memory. When the connector 26 is attached to a particular connector receptacle/port 30, its tag produces the strongest electronic signature when read by the set of electrodes 619, 617 which locally encircle the particular receptacle 30 to which it is attached. Particular pairs of electrodes which transmit the RF excitation and tag read signal are sequentially excited by an electrical multiplexer attached to tag reader circuit 615. Electrodes are patterned on a flexible electrical circuit 611, for example, formed on a polyimide film and connected to electronic connector reader 615. The reader may include an RFID reader circuit that generates the excitation signal to activate the particular tag and electrical switches which select the particular combination of electrode(s) nearest the particular connector 26.

In a further example, patchcords incorporating conductive elements may be connected between the switch 100 input/output ports and transmission equipment such as line cards, optical amplifiers, routers and demultiplexers. The conductive elements of these patchcords are in communication with the tag reader circuit 615 and switch controller 70. By attaching RFID tags on this transmission equipment, in a physical location adjacent to or on the connector receptacles on the transmission equipment, these tags can be read remotely by tag reader circuit 615 through the conductive elements of the patchcords. These patchcords serve to extend the traceability of connections from the switch 100 out to the equipment attached thereto. The switch controller 70, interfaced to the Operations Support Systems (OSS), enables an inventory of physical fiber optic connections to be ascertained and updated as needed.

EXAMPLE

Power Monitoring

In addition, the optical power transmitted through any particular optical fiber may be monitored by use of a shared, non-invasive optical power monitor head integrated within the end of the gripper 50, for example (FIG. 19). When the optical power monitor head guides the fiber 20 into a shaped-channel containing deflection element 134 to produce a micro-bend 133, a small amount of light is coupled out of fiber 20 onto the photodiode element 135. The clamping element 134 may include narrow slots that enable the spring element 23 to preferentially pass and separate from fiber element 20. The micro-bend 133 is produced in optical fiber 20 alone and thereby the spring element 23 does not interfere in the detection of out-coupled light. For the particular fiber, coating and jacket type used in the flexible circuit construction, the optical signal within the fiber can be inferred from the power level of the out-coupled light and thereby calibrated. Cross-connect switches with substantial numbers of ports (>100's) benefit from the ability to share a single detector 135 across an entire array of ports.

Typically, optical power is measured at either the proximal end of fiber near the input terminal array 170 as in the above example, or alternately at the distal end of the fiber 81 exiting flexible circuit stack 40. At this location, fibers 20 are separated from spring elements 23 and are preferentially oriented along a substantially linear array to facilitate independent physical probing of any fiber 20.

In an alternate embodiment, tap-integrated photodetectors, such as those commercially supplied by Santec, JDS Uniphase, etc., can be attached, fusion spliced or connected to one or more fibers 81 within the optical switch to monitor optical power passing through the fiber and in communication with controller 70 to report back optical power readings through the user interface. These tap-integrated photodetectors monitor a small amount of power while the majority of light passes through, having a typical insertion loss of 0.5 dB. Single fiber photodetectors can be provided individually, or arrays of photodetectors can be provided in a single package.

The optical power readings are typically reported back through a Simple Network Management Protocol (SNMP) software agent to the network's Operational Support Systems (OSS). The OSS is a software system which monitors, manages and controls the large number of network elements comprising the communications and/or computing network.

EXAMPLE

Interposed Array of Docking Ports

In a further example of the cross-connect system, a single three-axis actuator with statically positioned input terminals may also be used to reconfigure any flexible circuit in a no-blocking fashion by incorporation of an array of connector holders interposed between input array of connector receptacles which serve as temporary docking ports. Such docking ports may be substantially similar to a half-section of a transversely divided union adapter. This approach offers the potential to eliminate the need for lateral displacement of the connector rows at the input array 170.

In this particular example, the docking ports are disposed in a regular, spaced-apart pattern intermediate and between columns and rows of the input terminal array. Moreover, in this example, contrasting with previous examples, the positions of input terminals are fixed, i.e., they do not require shuffling on a row-by-row basis as in previous embodiments. To move the connector across the column, the gripper must place the connector into a temporary holding or docking port, which frees the gripper to exit the column and enter/descend into an adjacent column, where it disengages the connector from the docking port and continues on with the next incremental translation step. The docking ports on either side of the connector column allow the gripper to shift the connector to the midpoint with next column, the extract the gripper from this column and insert it back into this next column where it can reengage connector and continue to the next move.

EXAMPLE

Multiple Linear Actuation Columns

Figure 20:
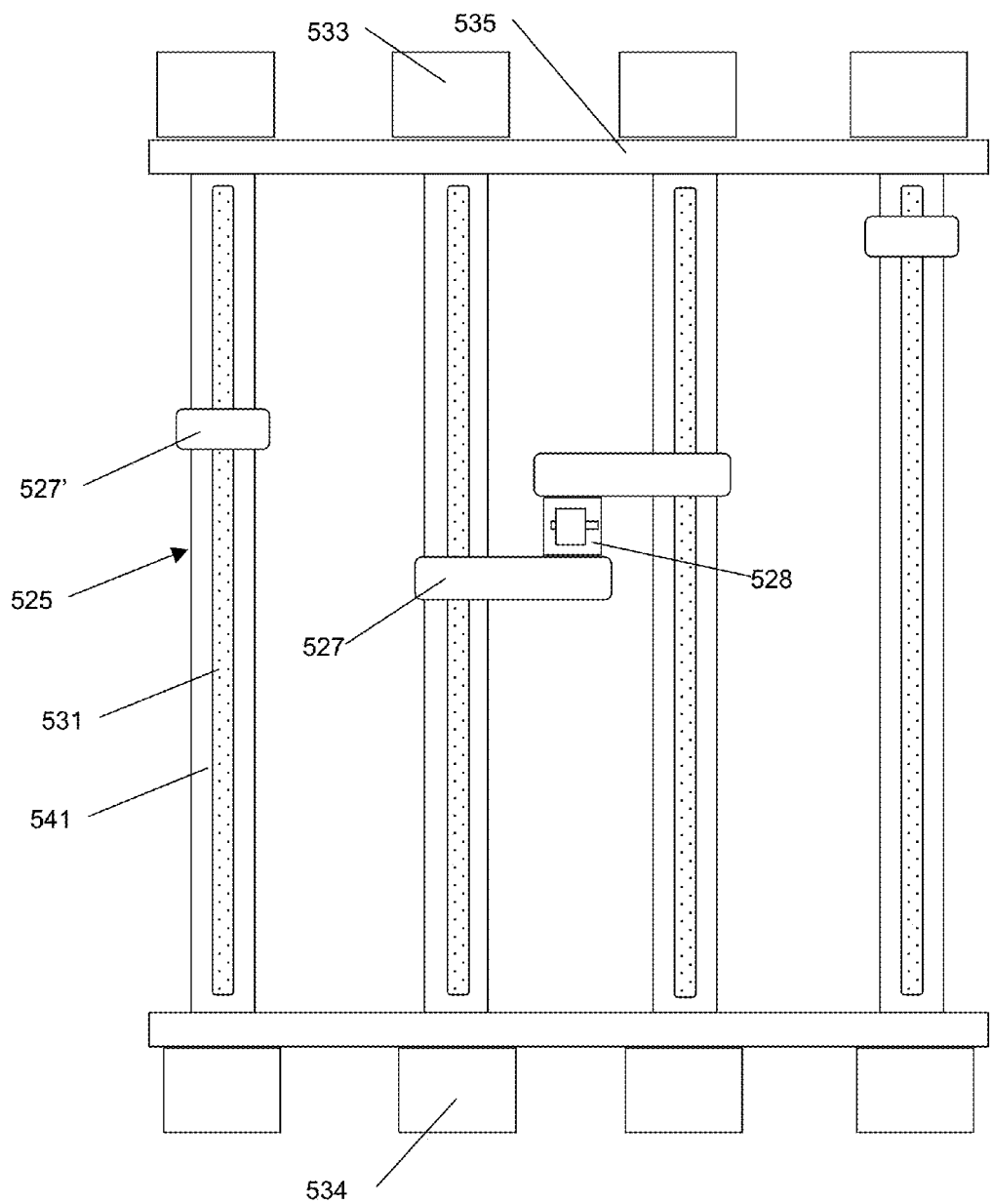
FIG. 20 illustrates a side view of a series of parallel translation elevators for transporting connectors across the array of terminals.

In an alternate example, one dedicated actuator per connector column is utilized. FIG. 20 schematically illustrates a side view of the approach, comprised of actuators interposed between all or a subset of the input terminal connector columns. Actuators 525 utilize, for example, motorized lead screws or ball screws 531 which raise or lower rotatable platforms 527. Motors 534 attached to outer sleeve of actuator and substantially surrounding ball screw 531 produce rotation of platforms 527. Actuators may remain within columnar interstitial spaces, or they may ascend vertically to exit the switch active volume.

Reconfiguration of fiber optic connectors 26 is achieved by multiple linear/rotary actuators with independent grippers. In this example, a fiber optic connector 26 and floating carrier 528 are shuffled between parallel and synchronized linear/rotary actuators 525-1, 525-2, 525-3. The carrier 528 is held in alternation by grippers 525-1, 525-2, 525-3.

Figure 21:
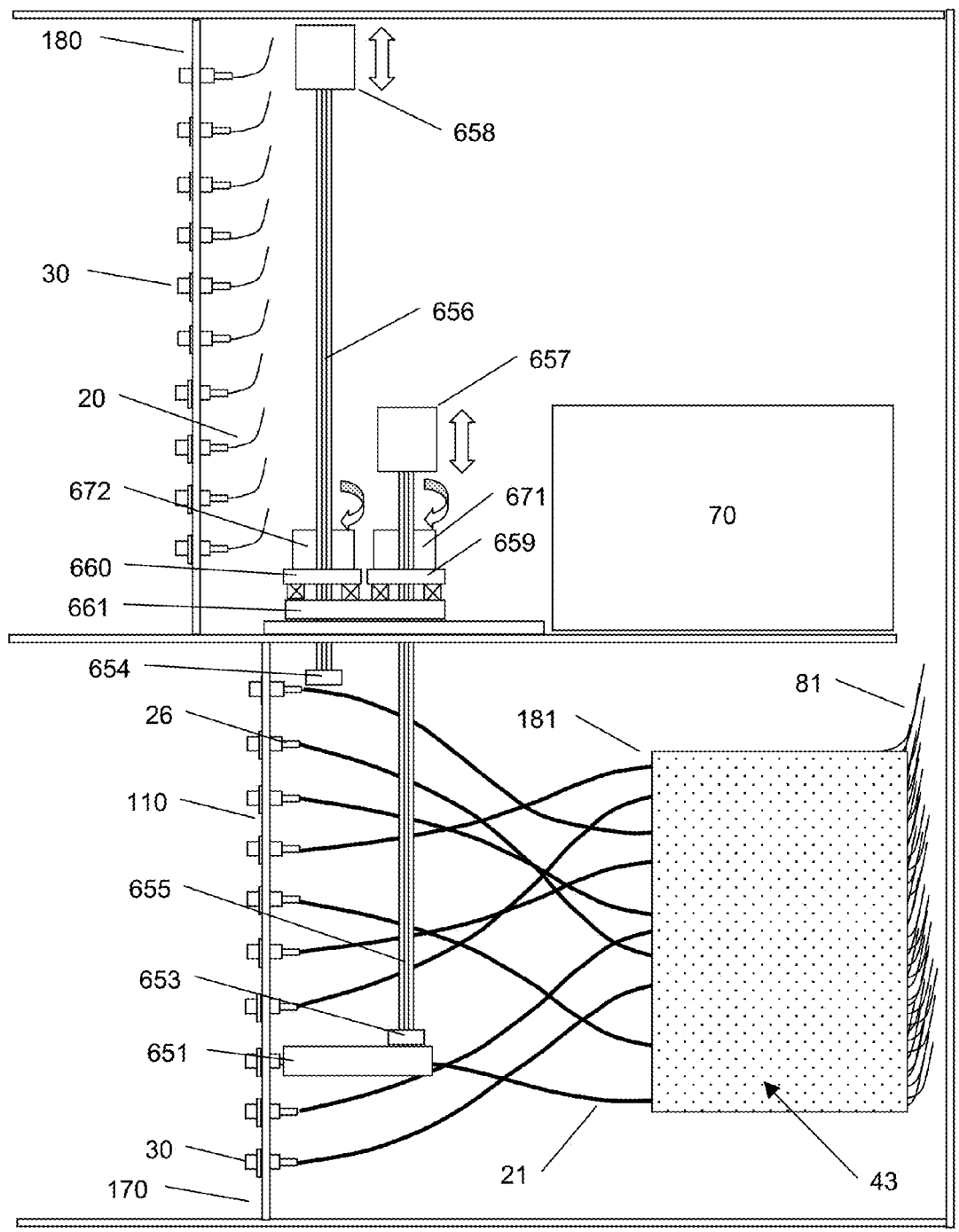
FIG. 21 illustrates a partial cutaway, side view of an automated patch-panel system utilizing a pair of alternating robotic gripper units.

A related actuation implementation is illustrated in FIG. 21. The static optical output ports 180 occupy an upper section of the switch 100 volume and the reconfigurable input terminals 170 occupy a lower section of the switch volume. One or more grippers retained at the ends of translatable linear actuators descend and maneuver between columns of connectors in a sequence of steps to engage a particular fiber connector receptacle, remove it from a connector receptacle and move the fiber connector across the input array of fiber ports without interfering the substantial numbers of surrounding circuits. Vertical movement through the array is achieved by raising or lowering the particular gripper holding the connector. Vertical motion occurs within the space between columns of connectors parallel to the one dimensional switch backbone. Therefore, vertical motion up or down multiple rows may be achieved in a continuous fashion.

In a particular embodiment, a pair of independently movable grippers 653, 654 extend into the interconnect volume, pass down through the clear access regions between columns of receptacles 30 populated with connectors 26, and latch onto a floating connector carrier 651 that transports a connector 26 from one port to another. The linear actuators 655 and 656 raise and lower grippers 653 and 654. Motors 671 and 672 provide rotation of the linear actuators 655 and 656 by +/−90 degrees, thereby orienting elongated grippers so that they may pass between columns without interfering with adjacent flexible fiber optic circuits 21 attached thereto. Grippers 653 and 654 rotate back 90 degrees once they reach the desired level and re-attach to carriage 651. The actuators 656 and 655, in their fully extended positions, extend into the free space behind upper set of switch ports 30'. The fibers 20 emanating from these ports are routed around the actuators and interface the fibers within multilayer circuit stack 40.

In a further example, the speed of the optical switch is increased by incorporating fast 1×2 optical switches before one or more of the input terminals and after one or more of the output ports. These optical switches may fiber-coupled and based on a magnetooptic, thermooptic or electrooptic response, for example, with switching speeds ranging from 50 ms to <1 ns. Switching between two cross connect configurations can be achieved without interruption of optical signals by synchronized bypass switching of a pair of 1×2 optical switches to switch between two cross-connect circuits.

Generalized Cross-Connect Systems

The optical cross-connect switch apparatus and systems described herein are based on unique geometric arrangements of physical interconnections and reconfiguration algorithms to transform these physical interconnections in a non-blocking and ordered manner. The following sections disclose the fundamental mathematical aspects and topology of this interconnect system.

In this invention, the fiber strand interconnection volume lies between two planes spaced apart by a distance L. The first plane coincides with an input terminal array and the second plane coincides with an intermediate array. Only the connections made to input terminal array are reconfigurable. Three classes of all-fiber interconnect geometries are of particular interest: those interlinking (1) a two-dimensional array of input terminals and two-dimensional array of intermediate ports, (2) a two-dimensional array of input terminals and one-dimensional array of intermediate ports, and (3) a one-dimensional array of input terminals and one-dimensional array of intermediate ports. The input terminals generally include reconfigurable connectors which mate with connector receptacles and the intermediate ports consist of an array of fiber guides at switch backbone 41 through which the fiber lines pass under tension to the modular tensioning and slack elements 40.

The group of fiber interconnections are described in terms of a Braid Group, with an associated algebra well suited to represent the various geometrical relationships between interconnect strands making-up a braid. Each fiber line or circuit bridging the input and intermediate planes is mathematically equivalent to a strand joining two points. The cross-connect switch volume is comprised of large numbers of strands whose geometric relationships are dynamic. Techniques to avoid knotting of these strands is based on their crossing characteristics in relation to other strands. One would like to develop an interconnection topology and reconfiguration algorithm to take one end of a particular strand at the input plane and maneuver its endpoint such that the strand passes through the interconnect volume without entangling other strands.

Figure 22A:
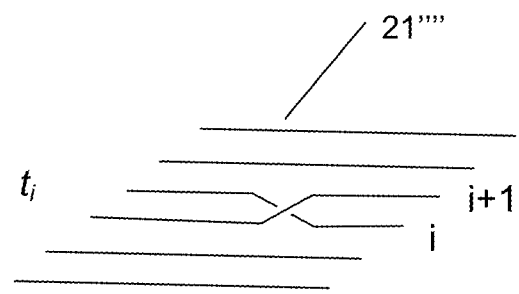
FIG. 22A and FIG. 22B are diagrams of a braid generator with FIG. 22A representing a crossing point and FIG. 22B representing a knot.

The set of N switch interconnections characterizing a particular switch state is represented by an N-stranded braid. The braid generator $t_i$ is defined over the braid group and represents the physical crossing of a strand at position i over a strand at position i+1 (FIG. 22A). For example, a braid group of n strands 21'''' may be denoted by $B_n = (t_i, \ldots t_n)$. A particular braid element of this group is described by a product of $t_i$'s, where the terms in the product are ordered from right to left to correspond to crossings arranged from right to left along each strand 21''''. The subscript i refers not to a physical strand but to position within the braid.

Figure 22B:
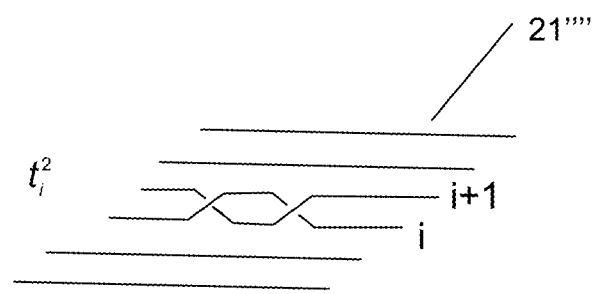

Based on the properties of braid groups, two crossings commute only if they do not operate on the same strand. That is, $t_i t_j = t_j t_i$ if $|i-j| > 1$. Therefore, the usual notion of commutativity under multiplication does not apply to the braid generator. A knot occurs when one strand fully wraps around another and is represented by a generator $t_i^2$ (FIG. 22B). One strand simply passing over another (represented by $t_i$) does not represent a knot, because strands can be thought of as lying in different layers, one layer on top of another. In general, a strand including the generator $t_i^x$, where $x > 1$, would exhibit a knot.

Figure 23:
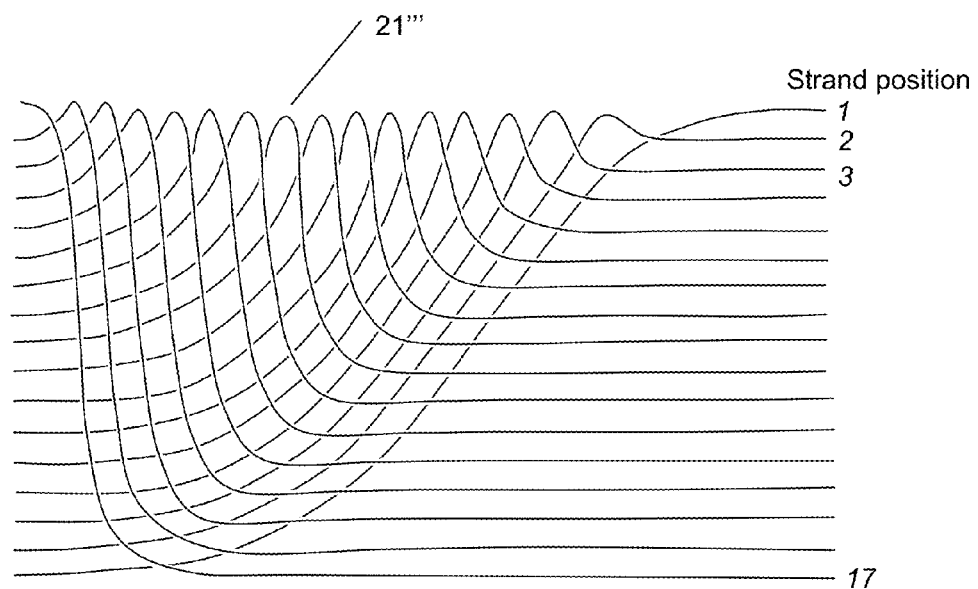
FIG. 23 is a braid diagram of a non-repeating negative braid representative of a non-tangled arrangement of interconnection circuits.

It is a requirement of all-fiber cross-connect systems that interconnections remain knot-free. Such interconnections correspond to braids comprised of strands with $|x| <= 1$ and are conventionally called positive ($x > 0$) or negative ($x < 0$) non-repeating braids (positive if the braid only has positive crossings, that is, the front strands have a positive slope). To prevent physical entanglement within the switch interconnect volume, it is necessary that each strand be described by generators $t_i^x$ with $|x| <= 1$. An example of a negative, non-repeating braid is given by $(t_1^{-1} t_2^{-1} K\ t_{16}^{-1})(t_1^{-1} t_2^{-1} K\ t_{15}^{-1}) K\ (t_1^{-1} t_2^{-1}) t_1^{-1}$ and illustrated in FIG. 23. While this braid includes the product of a number of generators $t_i^{-1}$ on the same strand position i, it does not include $t_i^x$ with $|x| > 1$ because of non-commutativity. Therefore, each strand 21'''' can be thought of as residing in its own layer, which can be individually peeled away from other layers.

Geometry 1: 2-D Array to 2-D Array

In a first cross-connect switch geometry, physical fiber interconnections 21'''' join the terminals of a two-dimensional input array 170 and a two-dimensional intermediate array 181. Assume there are a columns by b rows at both the input array and the intermediate array. In general, the number of rows and columns can be dissimilar; in fact, it may be advantageous for some applications that the input array to have a larger number of terminals than the intermediate array has ports. There may be additional docking ports at the input array, for example. Moreover, consider the case in which all circuits have the same fixed length 1, which is greater than the spacing L between the two arrays.

A fiber optic connection at the front input terminal array is reconfigured by physically translating its proximal endpoint within the interstitial regions 108' between the arrayed interconnections of the input terminals. This endpoint should remain close to the plane of the input array because interstitial gaps between interconnects exist here and they allow physical access for a pick-and-place actuator, for example, to extend and reconfigure endpoints. On the other hand, the interconnects' distal endpoints attach to the intermediate array and their configurations remain fixed. There is generally not an unobstructed path for an actuator to move from the input array to the intermediate array through the intervening interconnect volume, so all reconfiguration is performed in proximity to the input array.

Figure 24:
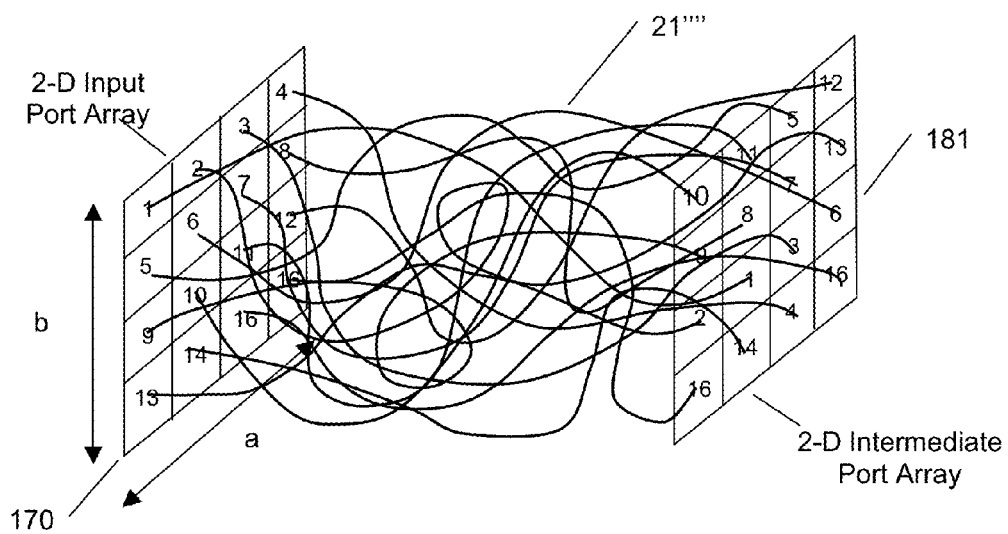
FIG. 24 illustrates an arrangement of strands interconnecting a 2-D array of ports to another spaced-apart 2-D array of ports.

Fiber interconnects represented by an N-stranded braid can realize an infinite number of configurations. If the interconnect paths 21'''' are spatially indeterminate, as would be the case when the length of the strand is greater than the straight-line path, the knotting of strands is possible (FIG. 24). This particular illustration corresponds to a 16×16 cross-connect. Excess interconnect lengths within the volume result in indeterminate crossing points, potential knotting and excessively sharp bending of interconnects.

Figure 25:
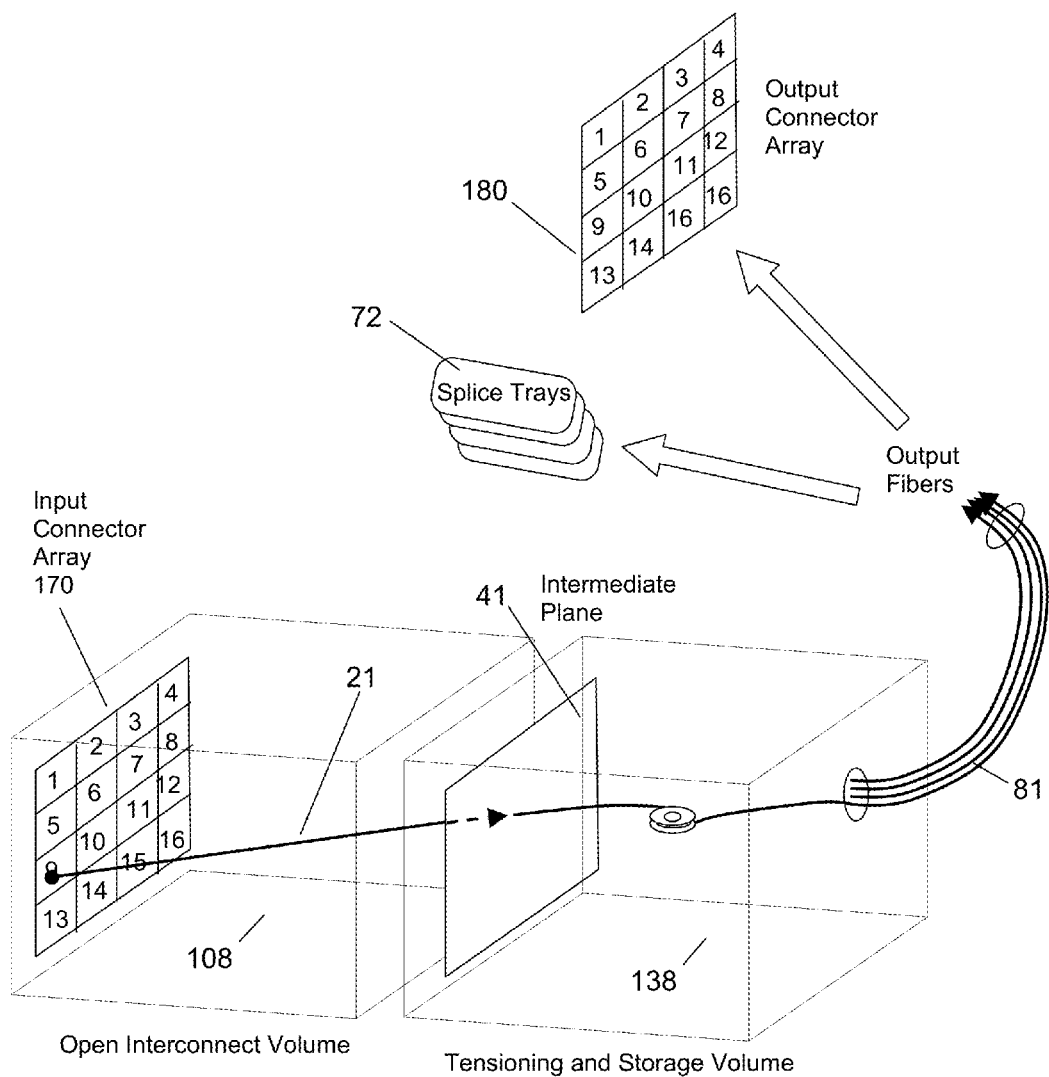
FIG. 25 illustrates the spatial relationships between fiber interconnect volume and fiber tensioning/storage volume of optical cross-connect.
Figure 26A:
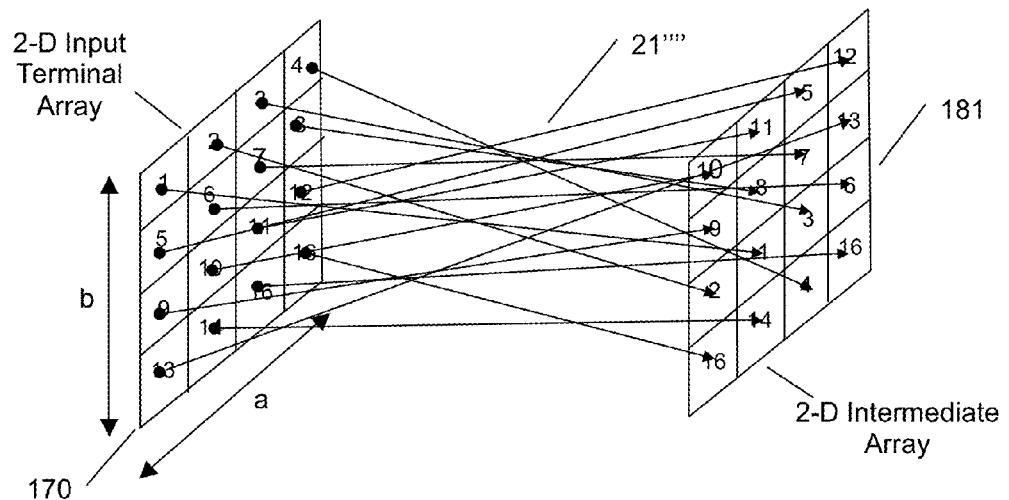
FIG. 26A and FIG. 26B are perspective and top views, respectively, of an arrangement of interconnections comprised of strands following straight-line, shortest distance interconnections.
Figure 26B:
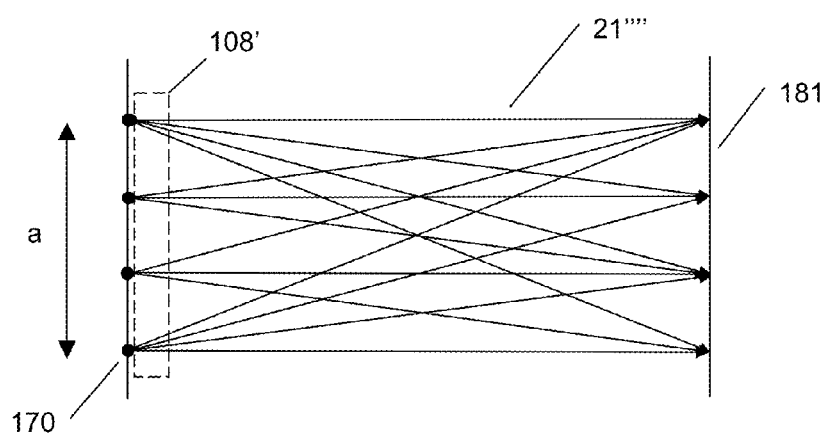

Least-path, variable length interconnects must be maintained to prevent knotting. To manage these excess fiber lengths, the tensioning and storage volume 138 with flexible circuit modules 40 is provided, located opposite the intermediate plane and adjacent to the strand volume 108 (FIG. 25). Each interconnect state is then comprised of only straight-line strands 21'''' joining the input 170 and intermediate 181 arrays, as shown in FIGS. 26A and 26B. We assume the fiber interconnections have infinitesimal thicknesses so that deviations from linear paths at potential crossing points have a negligible effect on the interconnection trajectory. Mathematically, this set of interconnections belongs to the group of positive (or negative) non-repeating braids. The sign of the braids is dictated by an initial ordering convention, which must be maintained during all subsequent reconfigurations. For positive braids, the strand i passes over the strand i+1 when viewed from the side, as in FIG. 22A.

Figure 27:
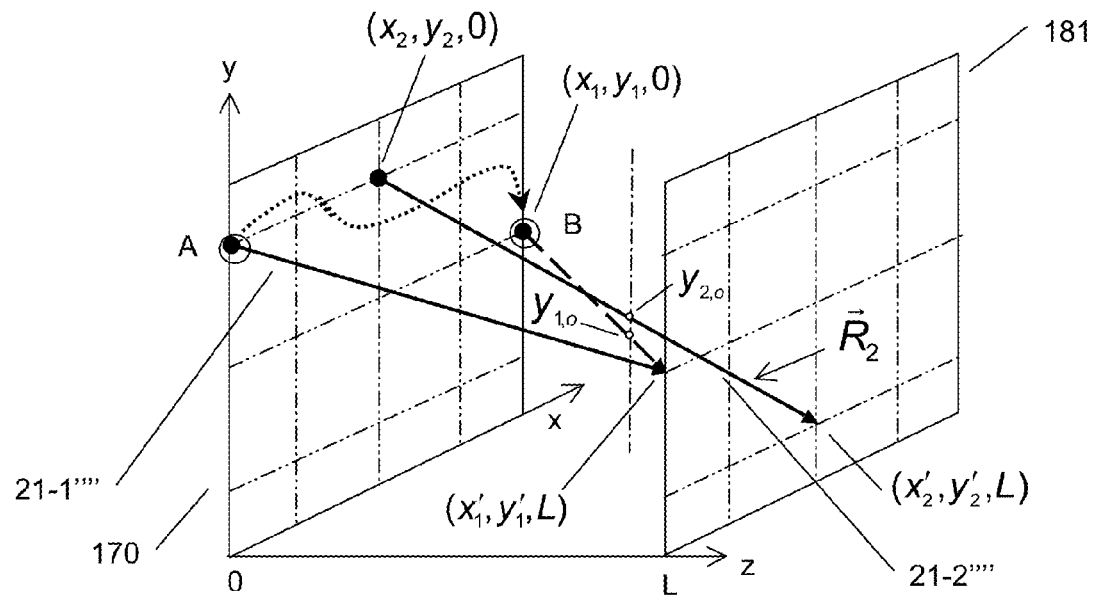
FIG. 27 illustrates an example trajectory to reconfigure an interconnect while avoiding the entanglement of strands.

Assuming each interconnect follows a straight-line path, there is a deterministic algorithm to move the endpoint of one strand through the interconnect volume to a new state, such that the strand and all others trace straight-line paths in the final state. An example reconfiguration from an initial port A to a final port B, following a path shown as a dotted line in the vicinity of the input array, is illustrated in FIG. 27. To simplify this analysis, only one intervening strand is shown.

To ensure that the strand 21-1'''' corresponding to the vector $\vec{R}_1$ still follows a straight-line path after translating to destination port B, its moveable end must pass above or below intervening interconnections in a calculated fashion through the shared volume. The moves are based on computations taking account of the locations of all other strands. The endpoints of an intervening strand 21-2'''' joining the point ($x_2$, $y_2$,0) within the input plane and the point ($x'_2$,$y'_2$,L) of the intermediate plane define a vector $\vec{R}_2$, the equations of which, parameterized here in s, are given by:

$$\vec{R}_2 = (X_2, Y_2, Z_2) \quad (1)$$

$$X_2 = x_2 + s(x_2 - x'_2), \quad (2)$$

$$Y_2 = y_2 + s(y_2 - y'_2) \quad (3)$$

$$Z_2 = -sL \quad (4)$$

Similarly, the endpoints ($x_1$,$y_1$,0) and ($x'_1$,$y'_1$,L) define a vector $\vec{R}_1$ corresponding to strand 1:

$$\vec{R}_1 = (X_1, Y_1, Z_1) \quad (5)$$

$$X_1 = x_1 + s(x_1 - X'_1), \quad (6)$$

$$Y_1 = y_1 + s(y_1 - y'_1), \quad (7)$$

$$Z_1 = -sL \quad (8)$$

Strand 1 must follow a path through the volume such that its final state is a straight-line, disentangled from other strands. This path is determined by solving for ($Y_{1o}$,$Y_{2o}$), which are the relative elevations of strands 1 and 2 respectively, when strand 1 is at its destination terminal and when the vertical (y) projection of strands 1 and 2 cross, so that $X_1=X_2$ and $Z_1=Z_2$. When the X-positions are equal, the parameter $s_o$ is given by:

$$s_o = \frac{(x_1 - x_2)}{(x_2 - x_1 - x'_2 + x'_1)}, \quad (9)$$

so that the elevations of each strand at this location are given by:

$$y_{1o} = y_1 + s_o(y_1 - y'_1), \quad (10)$$

$$y_{2o} = y_2 + s_o(y_2 - y'_2), \quad (11)$$

The requirement to reconfigure strands while preventing entanglement is then dictated by the following conditional relations: if $y_{1o} \geq y_{2o}$, strand 1 passes above strand 2, and if $y_{1o} < y_{2o}$, strand 1 passes below strand 2. This ensures that after reconfiguration and for strands of infinitesimal thickness, strand 1 follows a straight-line path unencumbered by strand 2. By induction, applying this condition to all other intervening strands would ensure that strand 1 follows a straight-line path throughout the entire interconnect volume, for any number of intervening strands.

Figure 28:
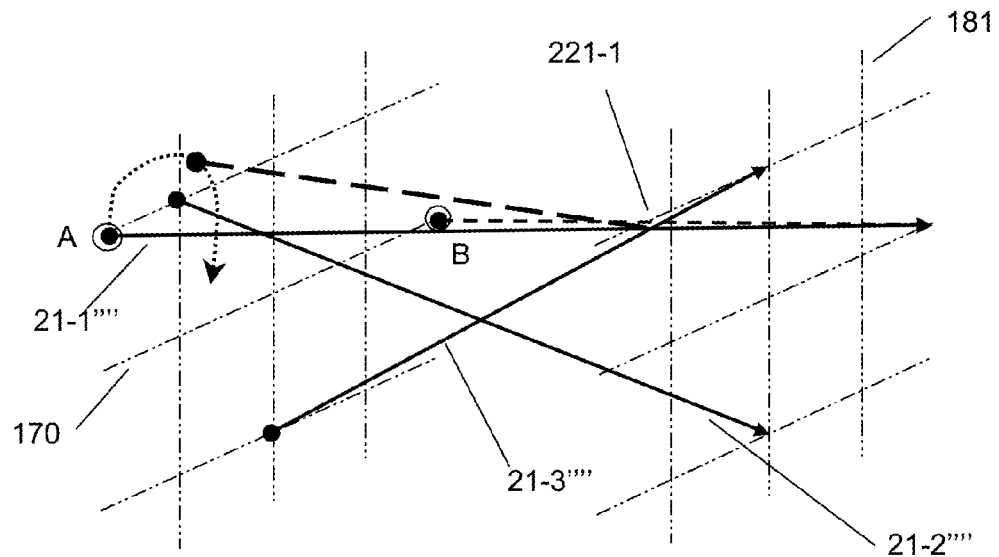
FIG. 28 illustrates an example arrangement of strands exhibiting physical interference during the reconfiguration process.

FIG. 28 illustrates a further example of circuit reconfiguration for two rather than one intervening strand. In this situation, the input end of strand 1 must move above strand 2 to satisfy the above condition and follow a straight-line to the destination terminal. While this algorithm ensures that the final state is a straight-line, it does not guarantee that the strand follows a straight-line in those intermediate states passed through during reconfiguration. The locations of other intervening strands may place conflicting requirements on such reconfiguration. Physical interference with intermediate strands such as 3 can occur during the intermediate states, and as a result, the location of intermediate strands will be perturbed. Strand 1 21-1'''' may "kink" 221-1 due to interference with strand 3 21-3'''' while passing over strand 2 21-2''''. For substantial numbers of strands, the number and degree of kinks may be significant. The amount of perturbation will depend on the force balance between interacting strands. Therefore, the intermediate configuration of strands is not obvious and must be solved self-consistently for each intermediate state based on the knowledge of the tension in all strands.

In practice, it is difficult to precisely control the tension for large numbers of interconnections. Tensioning is produced, for example, by spring-loaded take-up spools that retain excess interconnect lengths and keep the strands taut through the intermediate ports. Each strand may experience different tension depending on its extended length and the degree of wear and friction. Considering these practical concerns, it is not possible to prove unequivocally that tangling or excessive bending of the strands will not occur during repeated reconfiguration.

For straight-line interconnections, the length/of strands connecting ports ranges between bounds according to: $L^2 \leq l^2 \leq (adx)^2 + (bdy)^2 + L^2$. The non-straight-line paths during intermediate reconfiguration states may require a non-negligible additional length during reconfiguration. The system of 2-D to 1-D arrays of interconnects described next overcomes these various limitations.

Geometry 2: 2-D Array to 1-D Array

The geometric "order" of strands within the interconnect volume is increased by interconnecting the 2-D input array of terminals 170 to a 1-D intermediate array of ports at backbone 41. By "order" we refer to the partitioning of the switch volume into smaller columnar regions that are physically independent of one another. Arbitrary interconnections are reconfigured by crossing through each independent, orthogonal zone in a sequential fashion. For this geometry, straight-line interconnections are maintained even during reconfiguration. The input array consists of a columns by b rows and the intermediate array consists of n=a·b rows.

Figure 29A:
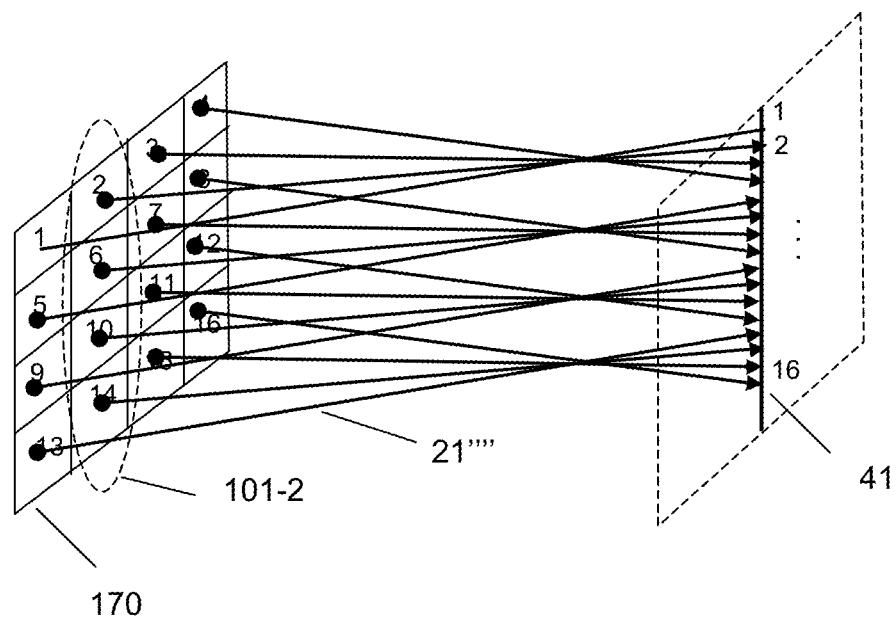
FIG. 29A and FIG. 29B are perspective and top views, respectively, of an arrangement of strands joining a reconfigurable 2-D array to a fixed 1-D array of ports.
Figure 29B:
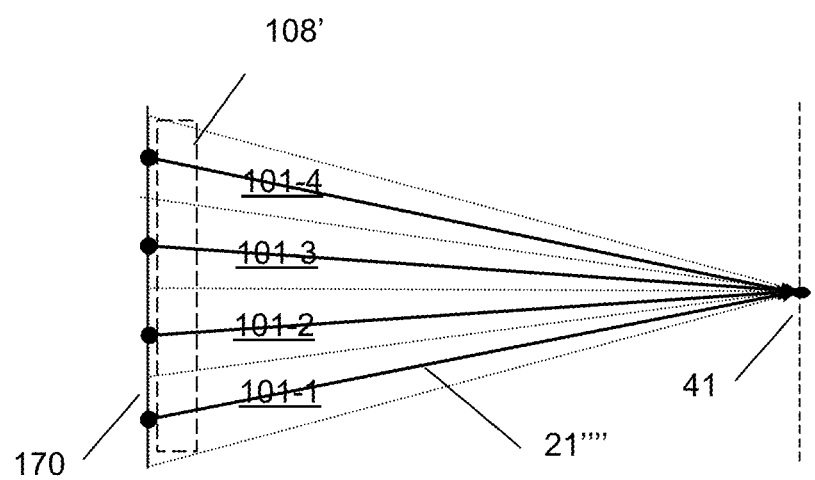

For example, the interconnect strands between a 4×4 terminal input array 170 and a 16×1 port intermediate array 41 is shown in FIGS. 29A and 29B. The strands 21"" follow straight-lines between the input terminals and intermediate ports. The mapping of the 2-D intermediate array in the earlier example to a 1-D array performs the mathematical equivalent of "combing" the interconnection braid. The interconnection geometry reduces to a deterministic arrangement that eliminates the potential for circuit interference by subdividing the braid into separate, independent subbraids or zones 101-1, 101-2, 101-3, 101-4 originating from each column of input terminals. That is, $B_n = (t_1, K\, t_n)$ reduces to the subbraid group $B_a = (t_1, K\, t_a)$, where a is the number of rows. The interconnections are inserted and maintained in the proper order such that each subbraid is non-repeating—any two of its strands cross at most one. The strands 21"" of the non-repeating braid are overlaid back to front without intertwining and effectively lie within separate layers, thus eliminating the tendency to tangle.

This cross-connect geometry has several unique advantages. Strands do not span more than one zone for any particular configuration or at any time during the reconfiguration. This eliminates the indeterminism afflicting the 2-D to 2-D interconnections. The algorithms to re-arrange any interconnect in a non-blocking fashion require knowledge of each interconnect's intermediate array row m and the sign of the braid. To move a strand n within column i to a column j, the subset of strands in column i lying between strand n and strand j must be identified, after which the proximal endpoint of this strand traces out a continuous path passing below the subset of strands with m>n and above the subset of strands with m<n.

A fiber optic cross-connect system including of a four-by-four terminal input array 170 that separates into zones 101-1, 101-2, 101-3 and 101-4 is shown schematically in the perspective view FIG. 29A and top view FIG. 29B. The two-dimensional array of self-tensioning circuits 21 mapped into a one-dimensional array or backbone 41 with substantially straight-line paths there between partitions the switch interconnect volume 108 into multiple independent, non-interfering zones 101. The fiber circuits 21 lie at the nominal centers of such zones. This imposition of topological order on the three-dimensional arrangement of arbitrary circuit connections results in the separation and retention of optical circuits 21 within substantially spaced-apart regions. The resulting geometrical placement of each circuit 21 enables any number of arbitrary terminal reconfigurations to remain non-blocking and interference-free for reconfiguration governed by a series of rules and actions, dependent in part on the knowledge of how the multiplicity of fiber circuits 21, labeled 1 . . . 16 at backbone 41, map to the rows and columns of input array 170.

The rules governing non-blocking circuit re-arrangement are as follows:

I. Fiber circuits 21 must follow substantially straight-line paths between the two-dimensional input terminal array 170 and the one-dimensional port backbone 41.
II. Fiber circuits 21 must span only one zone 101 for any particular configuration.
III. Each fiber circuit must be associated with unique "address" relating to its elevation at the fiber backbone 41.
IV. A fiber circuit must be inserted or removed from a column only in an ordered fashion based on each circuit's "address" within fiber backbone. Circuits within a particular zone may be thought of as occupying separate "layers" within the zone along vertical planes joining the input column and the backplane. These layers are ordered sequentially based on the "address" of the fiber circuit within, in either a positive or negative ordering.

The actions required to re-arrange any circuit in a non-blocking fashion are as follows:

Movement of a particular fiber circuit 21 across a column requires knowledge of each fiber circuit's "address" m and "order". To move a circuit n within column i to a column j, first identify which subset of circuits in column i lie between circuit n and column j, then move below the subset of fiber circuits with m>n and above the subset of fiber circuits with m<n on a column by column basis.

Reconfiguration of circuits laid out according to the geometry disclosed herein and following the rules outlined above can be achieved in a non-blocking and non-interfering fashion. Reconfiguration only requires knowledge of the particular state of switch at the time of reconfiguration and is independent of prior switch history. This rule-based algorithm remains valid for any number of switch reconfigurations.

Figure 30A:
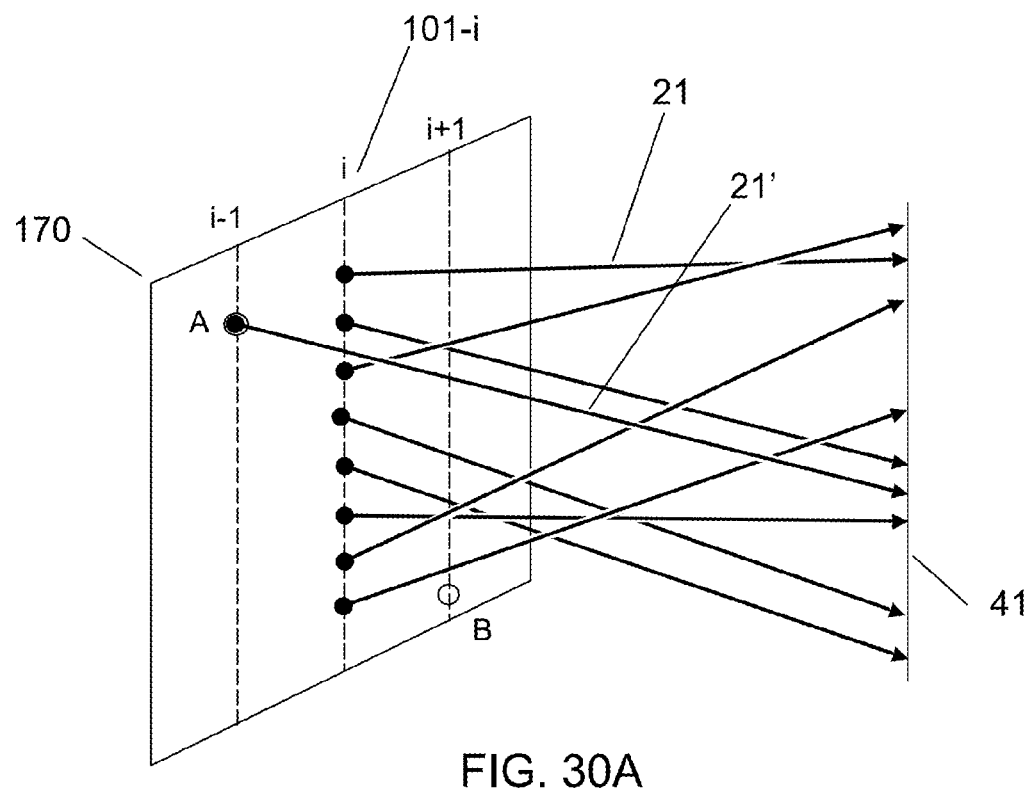
FIG. 30A and FIG. 30B illustrate an example of entanglement during reconfiguration when braid characteristics are not considered.
Figure 30B:
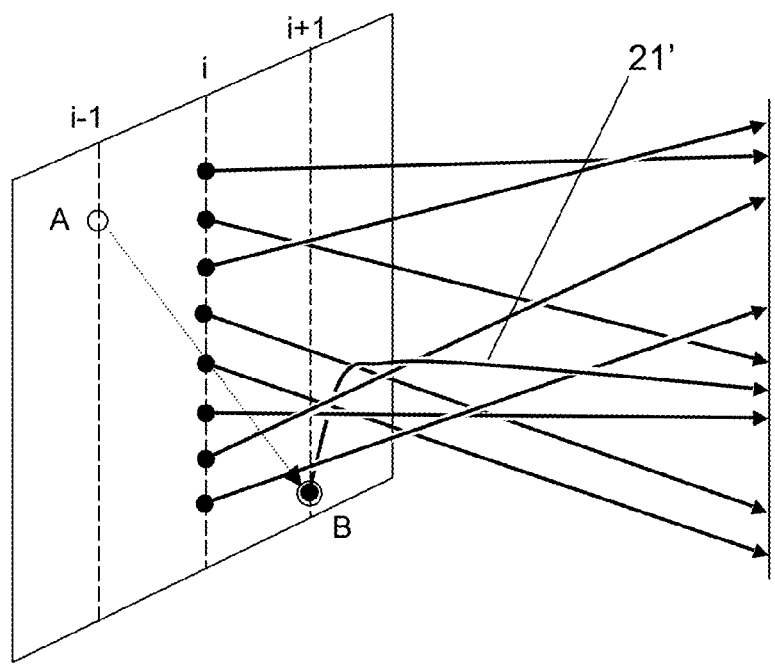

For illustration by way of a simplified example, the reconfiguration of a circuit which must pass from zone i−1 to zone i+1 by traversing an intermediate zone i (101-i) in a manner which avoids entanglement of circuits 21 is shown in FIG. 30A. In the initial configuration, the circuit 21' undergoing reconfiguration is initially attached to terminal A within zone i−1, and is to be moved to terminal B within zone i+1 of input array 170 in a non-blocking fashion. If the circuit 21' is reconfigured by moving it from terminal A to terminal B along a straight-line path lying substantially in a plane parallel to 170, as shown in FIG. 30B, the circuit 21' becomes physically entangled with the circuits of zone i. This entanglement will prevent subsequent reconfiguration through the knotted region. The proper path of circuit 21' to prevent physical entanglement is illustrated in FIG. 31A, wherein the circuit 21' passes below those circuits 21 originating from a higher level at the switch backbone 41 and above those circuits originating from a lower level at the switch backbone.

Figure 31A:
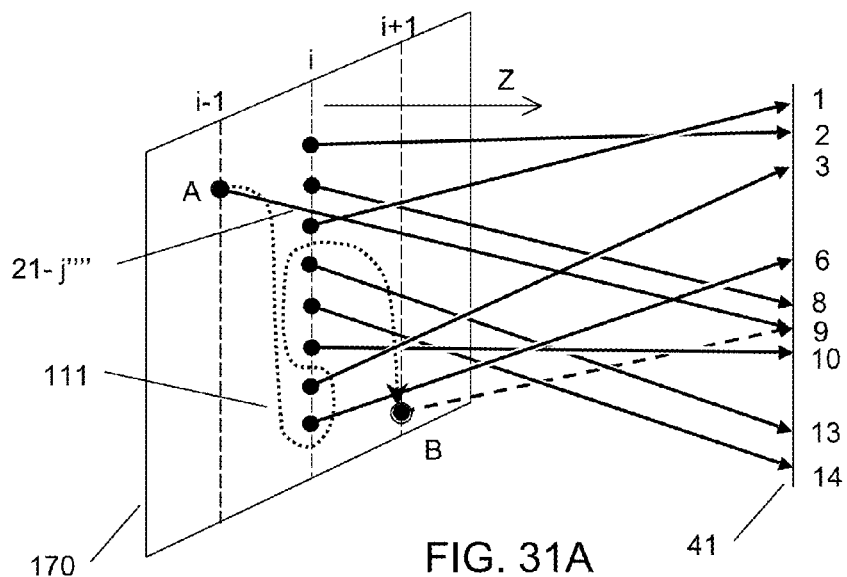
FIG. 31A illustrates a perspective view of the interconnect volume showing an example trajectory to reconfigure a strand without entanglement.

In the particular example illustrated in FIG. 31A, a strand passes from column i−1 to column i+1 by traversing an intermediate column i in a manner that avoids entanglement. If the strand were reconfigured by moving the end of strand i from a terminal A to a terminal B along a direct straight-line path in the plane parallel to input array, the strand 21-*j*'''' would likely become physically entangled with other strands of zone i. Entanglement prevents subsequent reconfiguration through the knotted region. A proper path 111 of the strand endpoint is represented by the dotted line in FIG. 31A, wherein the strand passes below those strands originating from a higher level at the switch backbone and above those strands originating from a lower level at the switch backbone.

Figures 31B, 31C:
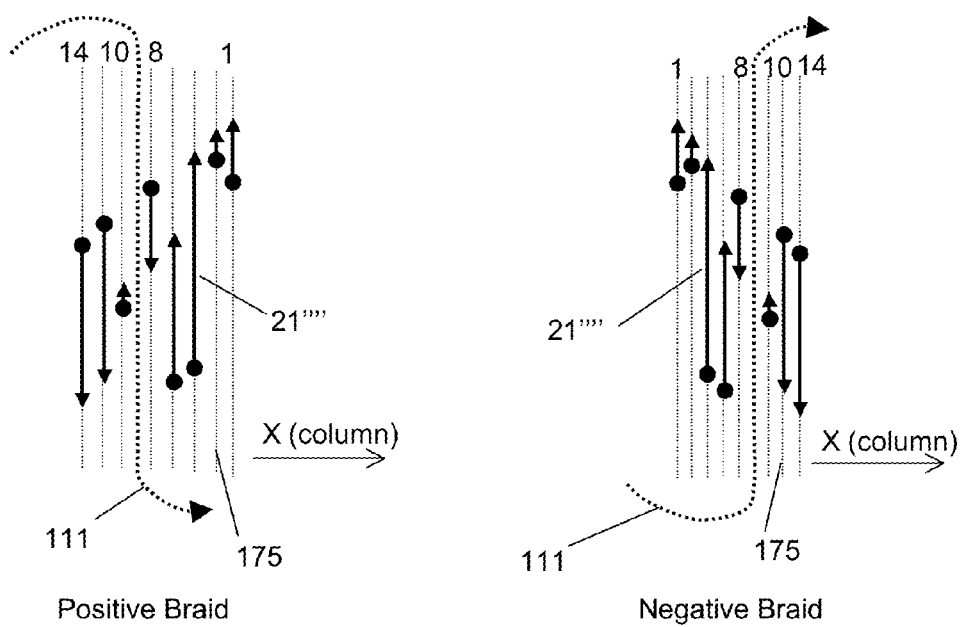
FIGS. 31B and 31C illustrate two proper ordering conventions for circuits residing within column i.

Since the strands within any column have a non-repeating braid structure, each strand 21'''' occupies its own layer 175 that can be individually peeled back from the others. FIGS. 31B and 31C illustrate end-on views of strands within the zone i. In this representation, the circuit j passes between these separate layers corresponding to strands 8 and 10. Such a path 111 does not cross nor entangle adjacent strands.

Placement of circuits within each column requires adherence to ordering conventions in accordance with Rule IV above. FIGS. 31B and 31C illustrate two alternative implementations of the ordering rule, corresponding to positive and negative braids, respectively. This figures are not-to-scale and represent an exploded view down the z axis of a particular zone 101-*i* in FIG. 31A to reveal the ordering of circuits 21 therein. A positive braid (FIG. 31B) or ordering rule requires that fiber circuits 21 be ordered from left to right within each zone 101 with increasing addresses (or elevations) at the one dimensional backbone. A negative braid (FIG. 31C) or ordering rule requires that fiber circuits 21 be ordered from left to right within each zone 101 with decreasing addresses (or elevations) at the one dimensional backbone 41. The trajectories to reconfigure circuits for these two different order conventions are different.

Figure 34A:
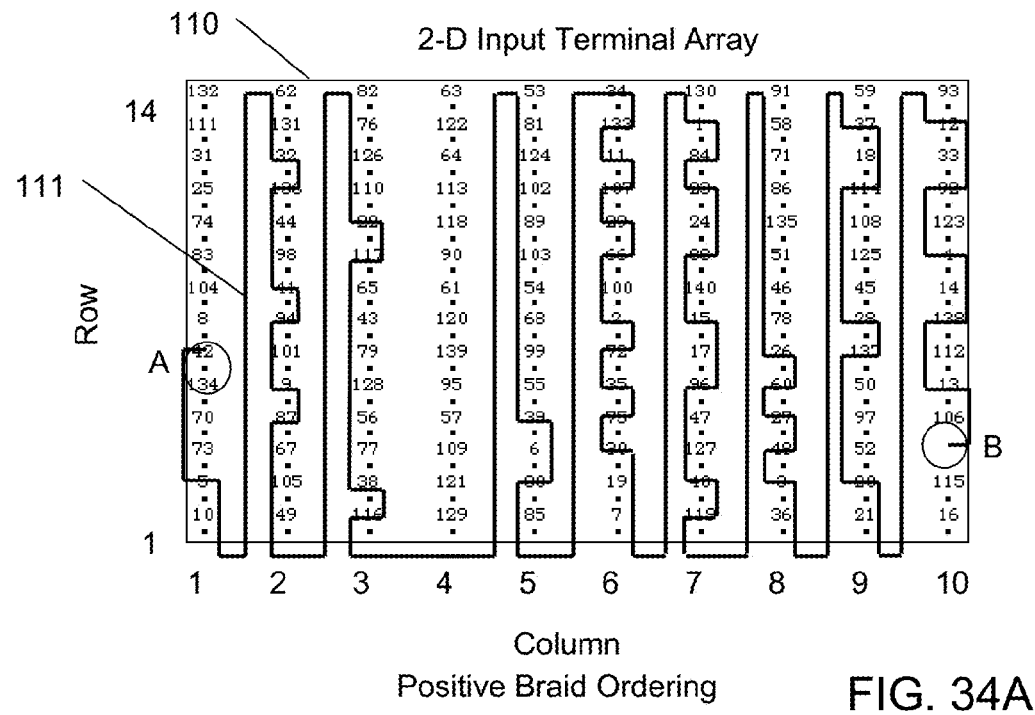
FIG. 34A illustrates an example reconfiguration trajectory to move an interconnect from port A to port B for positive braid ordering and FIG. 34B illustrates an example reconfiguration trajectory to move an interconnect from port A to port B for negative braid ordering.

FIG. 34A illustrates the terminal-map 110 and reconfiguration trajectory to move a circuit from a terminal A to a terminal B within the array of input terminals 170 in which the interconnections are ordered according to a positive braids. This terminal map 110 corresponds to a 10 column by 14-row array of terminals, wherein the numbers associated with each terminal correspond to the address of the particular circuit 21 attached thereto. Each fiber circuit 21 within the column originates from a different level of backbone 41 and is associated with an address used to determine the proper non-blocking trajectory for the circuit. In this particular example, each terminal has been randomly assigned a circuit. A first fiber circuit at terminal A (col,row)=(1,6) is to be switched to port B (10,4). A second circuit presently at port B is moved to a docking port (not shown) to vacate port B. As shown in FIG. 34A, to move the first circuit from left to right across this array of ports, it must pass through each column or zone 101-1, . . . in a sequential fashion without entangling any potentially crisscrossing circuits within the columns.

Figure 34B:
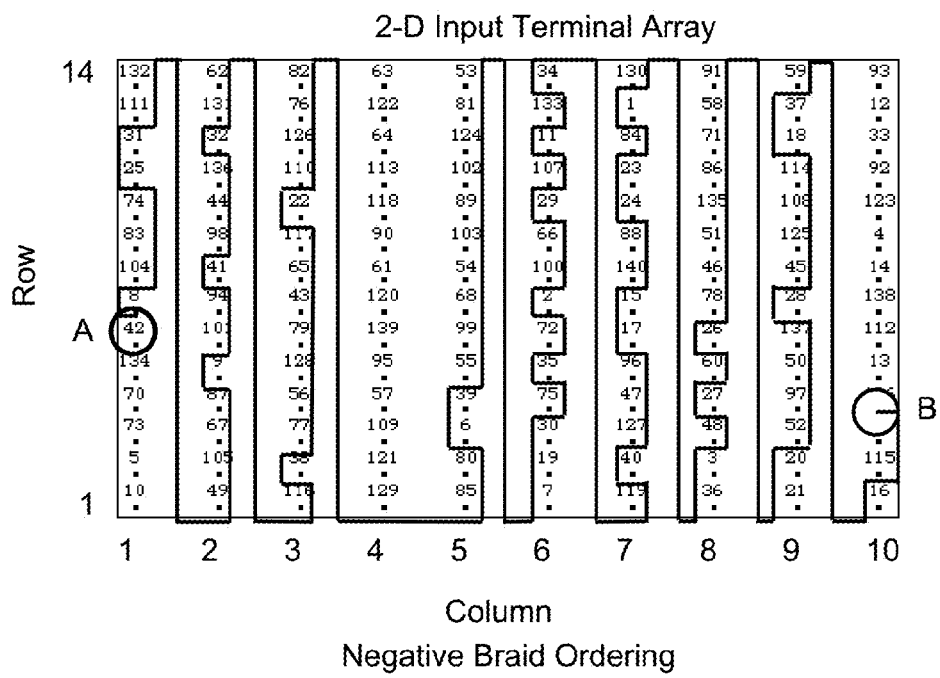

To trace out a non-interfering path through the array of fiber circuits, the particular circuit A must follow a path across the columns of connectors and their attached fibers, whereby fiber circuit A passes below those optical circuit elements which originate from higher levels at the backbone and pass above those elements which originate from lower levels. The path represented by FIG. 34B represents the relative motions of the various circuits. The actual trajectory is dependent on the particular actuation approach. In the particular embodiment of the invention utilizing shuffling connector rows 46, the path shown in FIG. 34B is actually comprised of both gripper 50 motion and independent sliding of each connector row 46 along the row axis 58. The gripper 50 actually translates up and down columns in a straight-line path, with the rows 46 shifting transversely to ensure that the particular fiber circuit 21 moves to the left or right of each other circuit within the column. In this example, the circuit moves according to a sequence of steps comprised of alternately descending into and ascending out of zones. The circuit must fully clear the first zone 101-1 before entering into a second zone 101-2. In the sense of FIG. 34B, it should be appreciated that there is equivalence between moving above or below a circuit and moving to the left or right of the same circuit, respectively.

The movable endpoint of circuit 21' is constrained to lie within a region substantially parallel to and in the vicinity of the plane of input terminal array 170. Within this region there exist open columnar volumes within which an actuator and gripper can extend without interfering with surrounding fiber circuits.

Alternately, FIG. 34B illustrates the reconfiguration trajectory for the same terminal map as FIG. 34A, in which the interconnections are filled and ordered as negative braids instead.

Figure 32A:
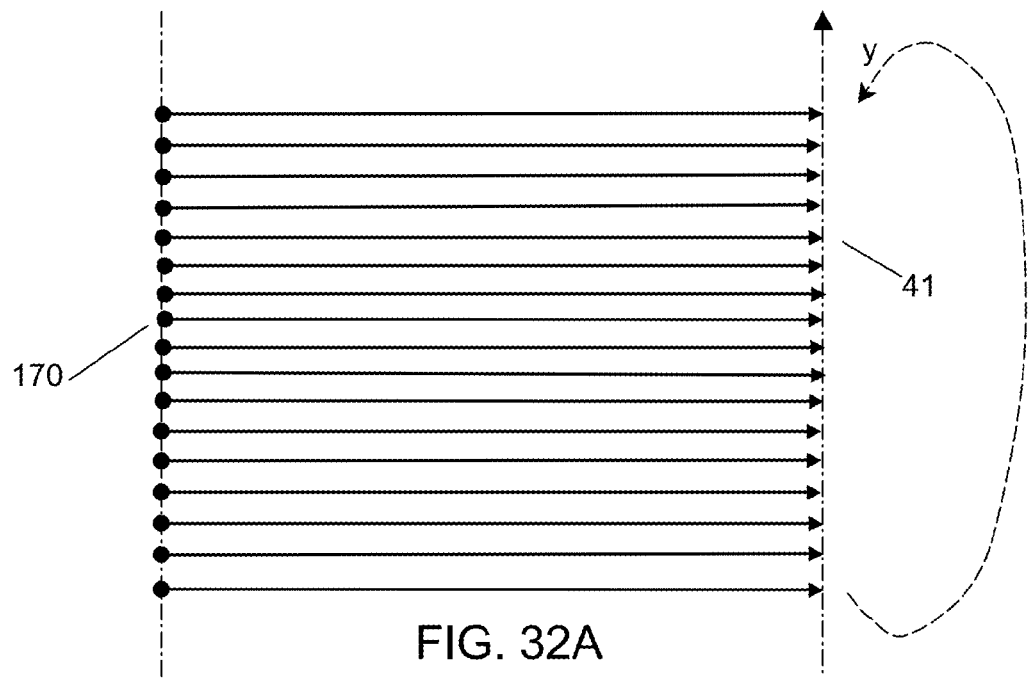
FIG. 32A illustrates the identity braid and FIG. 32B illustrates the identity braid in which the intermediate array has been inverted in y to twist the braid by 180 degrees.

Moreover, in accordance with Rule II above, the boundaries of flexible fiber circuits 21 within each column or zone 101 must remain within the boundaries of that zone. To illustrate this point, a side view of the particular zone 101-1 is shown in FIG. 32A. Those flexible circuits attached to a particular column of connector input terminals should occupy their particular wedge-shaped slice, regardless of their physical location at the backbone 41. The width of the slice should be adequate to enable all circuits to substantially remain within its wedge-shaped boundary for all potential flexible circuit configurations and is related to the column-to-column spacing.

Figure 32B:
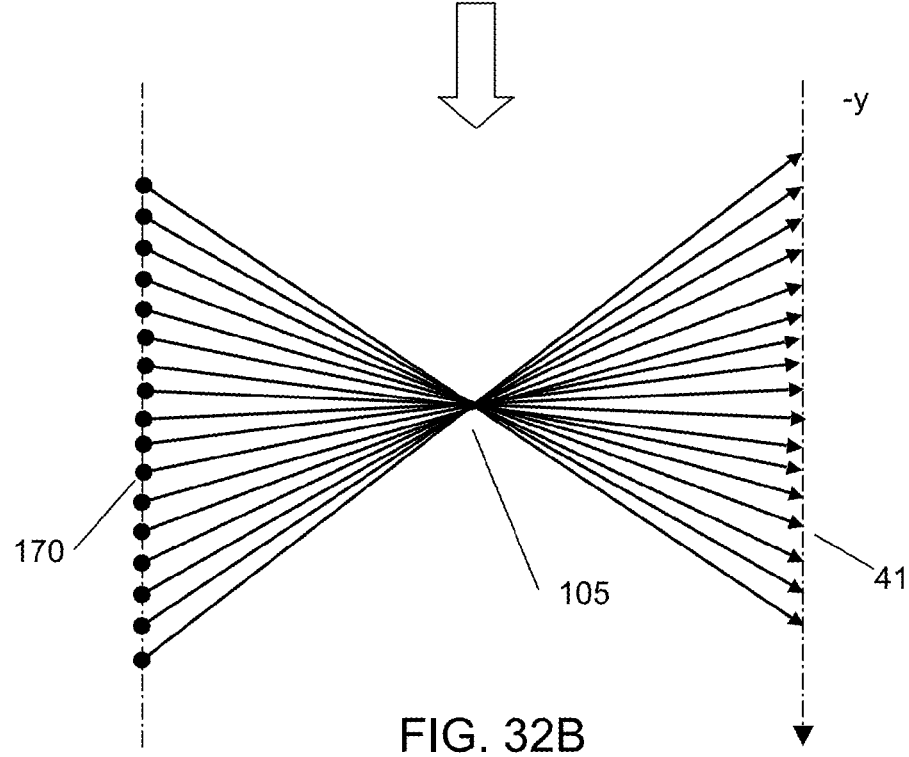

In practice, the greatest tendency for a fiber circuit 21 to extend into neighboring zone 101-2 is the configuration for which all circuits 21 within a zone 101-1 cross at the same point 105. The location of point 105 is midway between input array 170 and backbone 41. The width of the zone 101-1 at this location is equal to half the column-to-column spacing of input terminal array 170. The greatest density of fiber circuits within each wedge occurs for the particular configuration wherein the circuits from the linear backbone are mapped to vertically inverted positions as illustrated in FIG. 32B. In this case, the crossing point of all fiber circuits is concentrated at a single centrally located region 105 within the switch volume. The area of a substantially square bundle comprised of all flexible fiber optic circuits 21 crossing at this central location should fit within the volume defined by the boundaries of this wedge-shaped zone 101-1.

The density of circuits within region 105 can be reduced by diffusing-out the crossing points over a larger volume 105 that still remains within the substantially wedge-shaped boundaries of the particular zone. This is achieved, for example, by horizontally staggering the fiber guides or ports 45 at the switch backbone 41 while retaining the one-to-one mapping of each circuit 21 to its elevation at the backbone. Alternatively, the direction of the major axis of the switch backbone 41 can be made non-parallel to the axis of the input columns 101 to distribute crossing points over an expanded region of the zone. Alternately, the horizontal and/or vertical spacings of the input connector array 170 can be made irregular to add spatial disorder sufficient to expand region 105.

In a particular example, the horizontal spacing between adjacent columns of input connector terminals is 25 mm, each column is comprised of 100 rows or terminals, and the outer diameter of each flexible fiber optic circuit is 1 mm. Therefore, the cross sectional area of hexagonally close packed fiber optic circuits passing through the crossing point is less than or equal to 85 mm². For a substantially square cross-section, the dimensions of such a fiber bundle is about 9×9 mm. For a wedge-shaped zone, the width at its center is about 12.5 mm. Since the width of the fiber bundle (~9 mm) is less than the width of the particular zone (~12.5 mm), the density is below this maximum, as desired to prevent physical interference or blocking. In practice, the density of circuits would be lower since the crossing points are generally dispersed or uniformly distributed across the wedge-shaped region for random interconnections between ports.

Similarly, FIGS. 32A and 32B illustrate an additional sub-braid type germane to the analysis of entanglement. The upper diagram illustrates the identity braid E. Inversion of the y axis of the 1-D intermediate array generates the twisted braid shown in the lower diagram. Physically, this braid represents a cross-connect zone or column with highly mixed interconnects. The braid is nevertheless equivalent to the non-repeating braid represented in FIG. 22, where the crossing points have been translated along the strands to reveal the characteristic layering of non-repeating (non-tangled) braids.

Figure 33A:
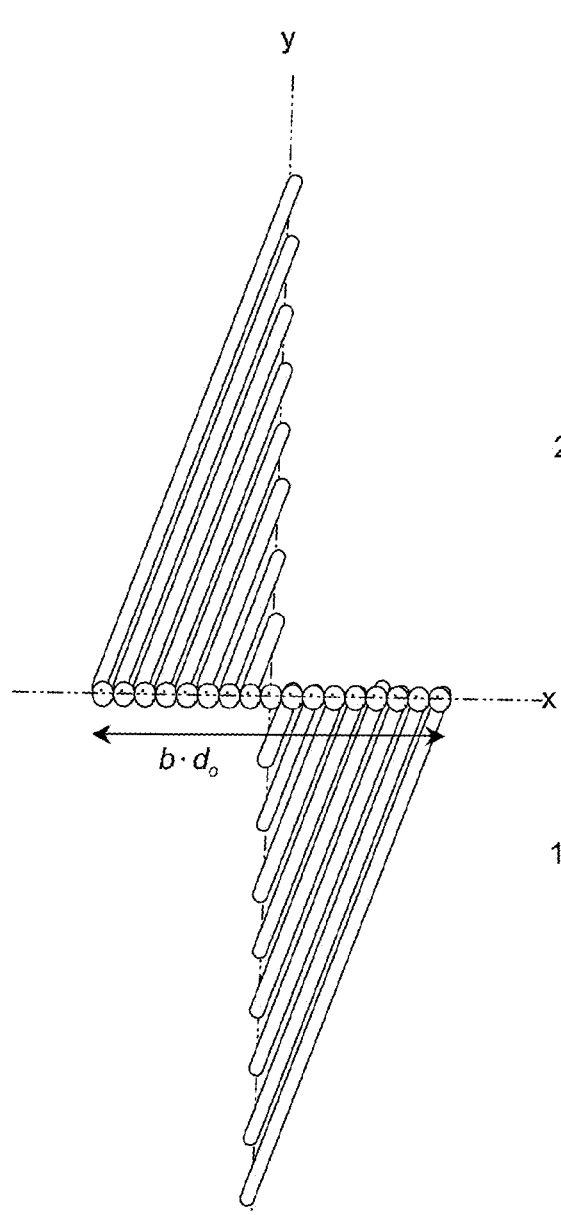
FIGS. 33A and 33B illustrate the width of a bundle of strands at the crossover point to determine the maximum interconnect density in accordance with the invention.
Figure 33B:
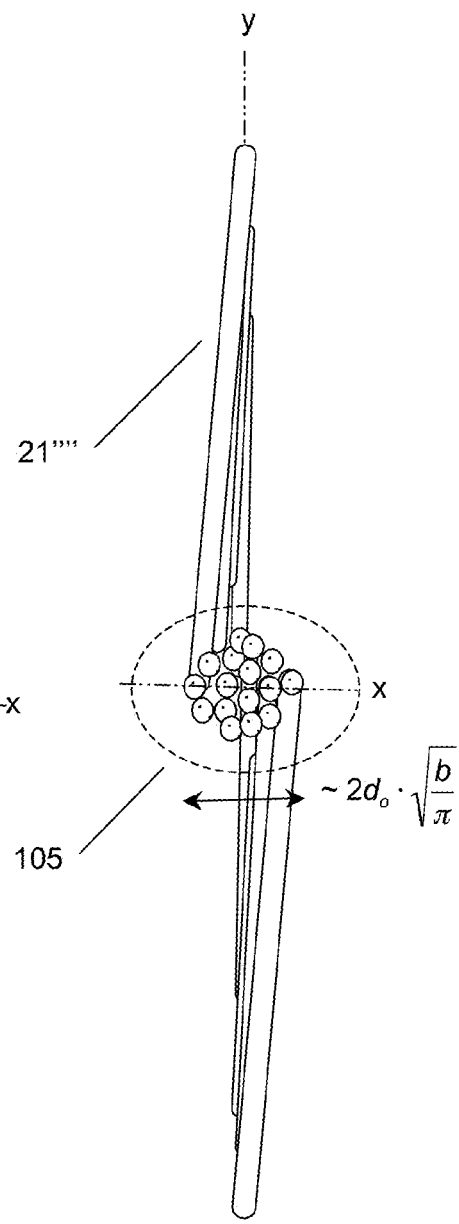

Until now, we have assumed that each strand has an infinitesimal thickness, or each layer is infinitesimally thin. However, the physical thickness is relevant to determine the ultimate density limit for disentangled interconnects and the maximum number of cross-connect ports achievable within a given volume. The braid of FIG. 32B is useful to this end because it produces the highest strand density within a localized volume 105 about the crossover point. The physical thickness of the crossover point depends on the physical diameter of the strands and can be stretched as wide as $b \cdot d_o$, where $d_o$ is the diameter of a strand and b is the number of rows of the input array (FIG. 33A). However, since each strand is under tension, the strands will reconfigure back into a bundle to achieve a least-path configuration as shown in FIG. 33B. The outer-most strands collapse onto the central axis to reduce their length. Assuming the strands form a loosely packed bunch with a circular perimeter, the diameter of the crossover is equal to $$D = 2d_o\sqrt{\frac{b}{\pi}}.$$

If all b interconnect subbraids are similarly ordered, the crossover points within each zone will be in alignment along a common line parallel to x. Therefore, the spacing between each subbraid at this line must be greater than or equal to D to prevent interference between subbraids. The number of strands is given by:

$$b = \pi\left(\frac{D}{2d_o}\right)^2.$$

For typical values (D=12.5 mm, $d_o$=0.6 mm), there may be up to b=340 strands per braid. Patch-panels typically have 12 to 18 columns of connectors per rack, so the cross-connect has the potential to scale up to about 6120×6120 connections based on this geometry.

The maximum time to reconfigure a port for this 2-D to 1-D array of interconnections is proportional to the length of the reconfiguration trajectory ~b·a=N. The numbers associated with the 2-D array of input terminals in the top figure correspond to the vertical addresses of each strand at the 1-D intermediate plane. The maximum reconfiguration time corresponds to the case in which a strand endpoint must travel up and down each column of the array. The reconfiguration algorithm computes a minimum length reconfiguration path, skipping those columns or strands that do not require unweaving, such as column 4 and much of column 5.

The volume of this switch system scales gracefully as N and the width and height of the input array are a·dx and b·dy, respectively. The vertical spacing of the N interconnects at the back plane is small since connectors are not required at this location. As a result, the vertical size of this switch implementation is limited by the size and spacing of the input array and is equivalent to manual patch-panels.

In this example, the interconnects maintain straight-line paths at all times and their length l is bounded by:

$$L^2 \le l^2 \le \left(\frac{a}{2}dx\right)^2 + (b\ dy)^2 + L^2.$$

This geometry minimizes the amount of fiber that must be retained on the tensioning take-up spools in comparison to Example 1. The interconnect structure that arises for this switch geometry also provides modularity, so that interconnections can be added and/or replaced. The system uses a series of stacked modules (corresponding to a block of interconnects) that can be added incrementally. The interconnect strands corresponding to a block of rows at the intermediate port array can be removed, even from the middle of the stack, without disrupting other interconnections. The resulting gap left after removing the block is collapsed vertically and a replacement block of interconnects can be re-inserted at the top of the stack.

Geometry 3: 1-D Array to 1-D Array

Figure 35A:
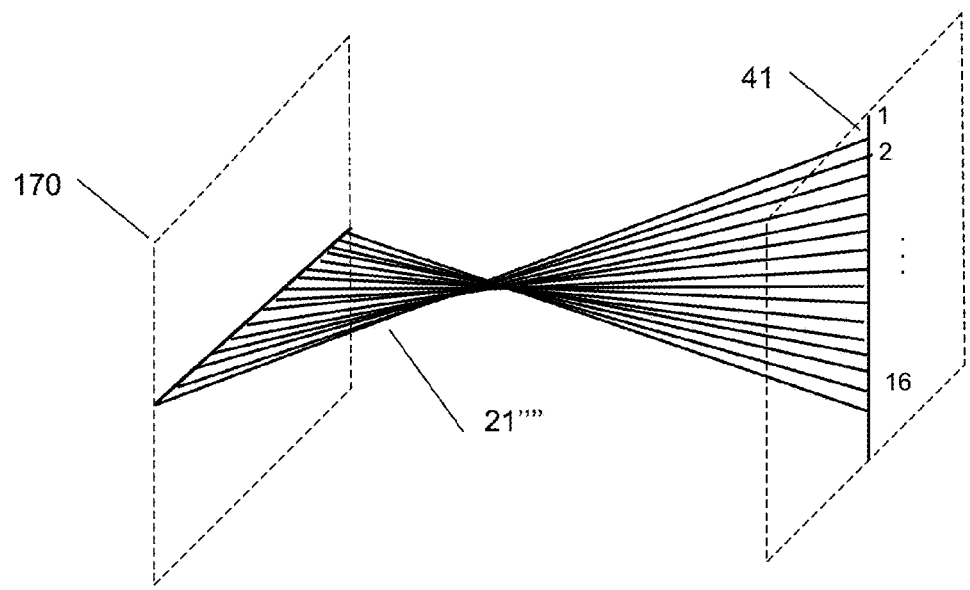
FIG. 35A illustrates an alternate interconnection geometry, wherein strands interconnect a 1-D array of input terminals and a 1-D array of intermediate ports for perpendicular arrays
Figure 35B:
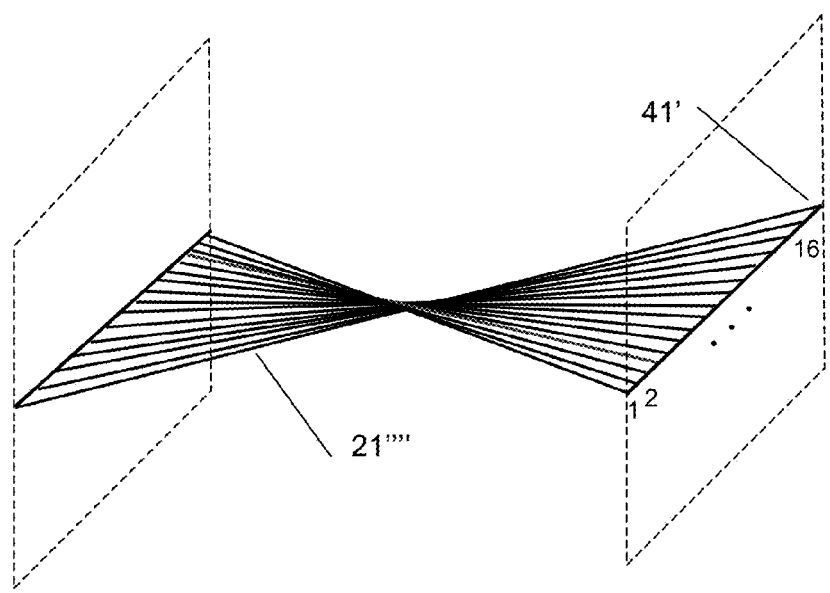
FIG. 35B illustrates an alternate interconnection geometry, wherein strands interconnect a 1-D array of input terminals and a 1-D array of intermediate ports for parallel arrays.

In an alternate all-fiber switch arrangement, the all-fiber cross-connect is structured such that interconnect strands bridge a one-dimensional array with N rows at the input plane 170 and a one-dimensional array 41 with N columns at the intermediate plane. This configuration retains the desirable non-tangled characteristics of the previous example, with each interconnect following a deterministic, straight-line path during and after reconfiguration. The one-dimensional arrays are oriented perpendicular 41 (FIG. 35A) or parallel 41' (FIG. 35B) to one another.

Figure 36:
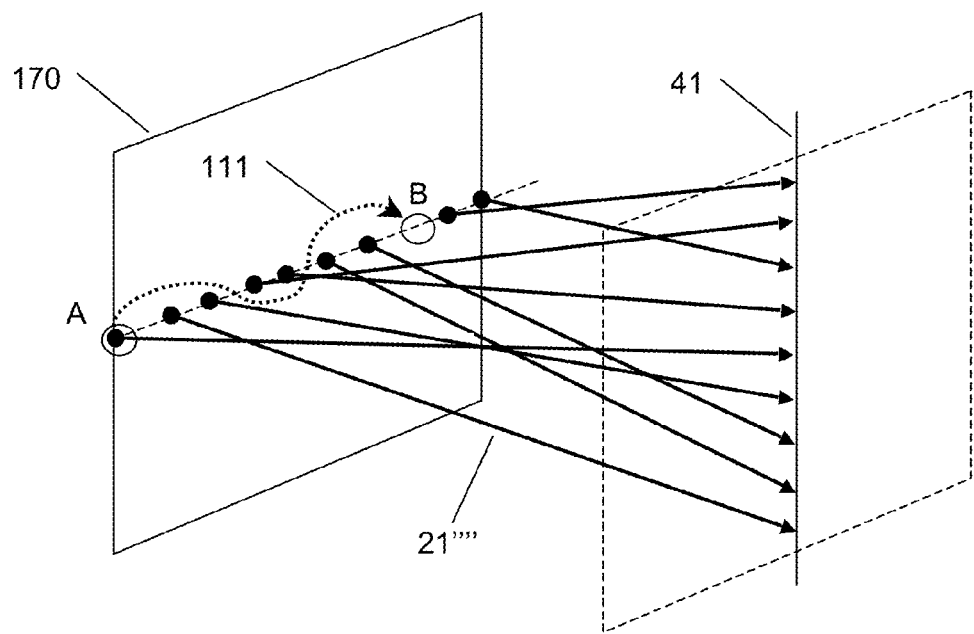
FIG. 36 illustrates an example reconfiguration path of the endpoint of one strand undergoing reconfiguration.

The reconfiguration algorithm for this geometry is similar to that of the previous example. For the arrangement in FIG. 35A, interconnects are reconfigured in accordance with their elevations at the intermediate array, passing above those interconnects originating from a lower level and below those interconnects originating from a higher level. An example reconfiguration is illustrated in FIG. 36, where the dotted line indicates the path 111 followed by the endpoint of the strand 21"".

Similarly, the two 1-D arrays can be oriented parallel to one another, with the strands ordered according to their locations at the intermediate 1-D array. The interconnects will have a tendency to form a thick bundle at the center of the interconnection region, similar to that illustrated in FIG. 33. The presence of a single, dense crossover 105 bundle requires minimization of surface friction between strands. This is a disadvantage compared to the 2-D to 1-D array example, for which the crossovers were less densely distributed.

The time to reconfigure a port is also proportional to N, the total number of ports. Ports can be added incrementally by concatenating interconnects and ports to the ends of the array. The minimum spacing for each reconfigurable port in the input array is typically 5 mm to allow adequate space for a fiber optic connector body. Therefore, within the footprint of manual patch-panels, this approach is practically limited to less than 500 ports.

In conclusion, the reconfigurable, all-fiber system of interconnection disclosed herein exhibit ideal optical characteristics and can be realized in various geometries. The optimal geometry to prevent entanglement utilizes a 2-D input terminal array and a 1-D intermediate port array. Various algorithms have been developed to reconfigure such interconnections in a completely arbitrary fashion and without limits.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A patch panel system of spatially reconfigurable, cross-connected strands for carrying a multiplicity of individual signals across an intervening gap between first and second planes with the strands defining a geometric braid within the gap, while the strands are individually held linear within the gap by tensioning means adjacent thereto, the geometric braid having a number of physically separate subbraids extending from a common extended, linear origin in a first plane and separating out at diverging angles to a second plane comprised of a multiplicity of columns of parallel, spaced apart terminals, comprising:

a multiplicity of individual strands within each subbraid, said strands being disposed in an ordered hierarchical relation and topologically equivalent to an ordered stack of separable layers, each strand residing within a layer of the stack and ordered such that all layers of the stack to one side of the individual layer are characterized by a higher relation, and all layers on the opposite side are characterized by a lower relation, whereby any individual strand of a first subbraid may pass through a second subbraid in a knot-free fashion by subdividing the second subbraid such that the individual strand passes through the stack of layers at a location separating those layers in lower relation and those layers in higher relation.

2. A system of cross-connected strands in accordance with claim 1, wherein each strand corresponds to an optical waveguide such as an optical fiber.

3. A system of cross-connected strands in accordance with claim 2, wherein each optical fiber is single mode and/or multimode bend insensitive fiber exhibiting less than 0.25 dB loss for a 360 degree bend of 10 mm diameter.

4. A system of cross-connected strands in accordance with claim 1, wherein the outer diameter of strands is less than or equal to 0.5 mm and typically 0.25 mm.

5. A system of cross-connected strands in accordance with claim 4, wherein strands in the first plane have a center-to-center spacing of 1.5 mm or less.

6. A system of cross-connected strands in accordance with claim 2, wherein each strand is terminated in the vicinity of the second plane with a polished fiber optic connector such as the standard LC, SC, MU or MPO connector.

7. A system of cross-connected strands in accordance with claim 1, wherein each strand corresponds to a radio frequency waveguide such as a coaxial cable.

8. A system of cross-connected strands in accordance with claim 1, wherein there are 10 to 48 subbraids per braid, and up to 100 strands per subbraid.

9. A system of cross-connected strands in accordance with claim 1, wherein the strands comprising each subbraid do not physically contact nor entangle other strands in adjacent braids.

10. A system of cross-connected strands in accordance with claim 1, wherein the diverging angles are less than 180 degrees.

* * * * *